(12) United States Patent
von Flotow et al.

(10) Patent No.: US 10,988,257 B2
(45) Date of Patent: Apr. 27, 2021

(54) AIRCRAFT-RETRIEVAL SYSTEM

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 480 days.

(21) Appl. No.: 15/966,356

(22) Filed: Apr. 30, 2018

(65) Prior Publication Data

US 2018/0327093 A1 Nov. 15, 2018

Related U.S. Application Data

(60) Provisional application No. 62/504,848, filed on May 11, 2017.

(51) Int. Cl.
| | |
|---|---|
| *B64D 5/00* | (2006.01) |
| *B64D 1/22* | (2006.01) |
| *B64C 27/14* | (2006.01) |
| *B64C 39/02* | (2006.01) |
| *B64C 27/10* | (2006.01) |

(52) U.S. Cl.
CPC ............. *B64D 5/00* (2013.01); *B64C 27/10* (2013.01); *B64C 27/14* (2013.01); *B64C 39/024* (2013.01); *B64D 1/22* (2013.01); *B64C 2201/021* (2013.01); *B64C 2201/024* (2013.01); *B64C 2201/027* (2013.01); *B64C 2201/082* (2013.01); *B64C 2201/128* (2013.01); *B64C 2201/145* (2013.01); *B64C 2201/146* (2013.01); *B64C 2201/182* (2013.01); *B64C 2201/206* (2013.01); *B64C 2211/00* (2013.01)

(58) Field of Classification Search
CPC .. B64D 5/00; B64D 1/22; B64C 27/10; B64C 27/14; B64C 39/024; B64C 2201/021; B64C 2201/024; B64C 2201/027
See application file for complete search history.

(56) References Cited

U.S. PATENT DOCUMENTS

| | | |
|---|---|---|
| 968,339 A | 8/1910 | Geraldson |
| 1,144,505 A | 6/1915 | Steffan |
| 1,306,860 A | 6/1919 | Smith |

(Continued)

FOREIGN PATENT DOCUMENTS

| | | |
|---|---|---|
| CA | 781808 | 4/1968 |
| CA | 839101 | 4/1970 |

(Continued)

OTHER PUBLICATIONS

"Trapeze" Wikipedia, Aug. 4, 2006, available at http://en.wikipedia.org/w/index.php?title=Trapeze&oldid=67584367.

(Continued)

*Primary Examiner* — Justin M Benedik
(74) *Attorney, Agent, or Firm* — Neal, Gerber & Eisenberg LLP

(57) ABSTRACT

The present disclosure provides various embodiments of an aircraft retrieval system including winch-equipped retrieval assembly that is removably attachable to a rotorcraft to facilitate retrieval of a fixed-wing aircraft from wing-borne flight.

21 Claims, 49 Drawing Sheets

(56) References Cited

U.S. PATENT DOCUMENTS

| | | | |
|---|---|---|---|
| 1,383,595 A | 7/1921 | Black | |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins, Jr. et al. | |
| 2,843,337 A | 7/1958 | Bennett | |
| 2,944,815 A | 7/1960 | Moyer | |
| 3,017,138 A | 1/1962 | Flint | |
| 3,029,049 A | 4/1962 | Melville | |
| 3,081,964 A * | 3/1963 | Quenzler | B64C 29/0033 244/7 R |
| 3,146,974 A | 9/1964 | Petoia | |
| 3,351,325 A | 11/1967 | Cotton | |
| 3,389,880 A | 6/1968 | Ferguson | |
| 3,785,316 A | 1/1974 | Leming et al. | |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,267,987 A * | 5/1981 | McDonnell | B64D 39/00 244/137.4 |
| 4,311,290 A | 1/1982 | Koper | |
| 4,523,729 A | 6/1985 | Frick | |
| 4,575,026 A | 3/1986 | Brittain et al. | |
| 4,680,962 A | 7/1987 | Durbin | |
| 4,753,400 A | 6/1988 | Reuter et al. | |
| 4,757,959 A | 7/1988 | Schroder et al. | |
| 4,790,497 A | 12/1988 | Yoffe | |
| 4,842,222 A | 6/1989 | Baird | |
| 5,000,398 A | 3/1991 | Rashev | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 5,806,795 A | 9/1998 | Ortelli | |
| 6,264,140 B1 | 7/2001 | McGeer et al. | |
| 6,824,102 B2 * | 11/2004 | Haggard | B64D 1/22 244/110 F |
| 6,874,729 B1 | 4/2005 | McDonnell | |
| 6,961,018 B2 | 11/2005 | Heppe et al. | |
| 7,000,883 B2 | 2/2006 | Mercadal et al. | |
| 7,028,947 B2 | 4/2006 | Burns | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,097,137 B2 | 8/2006 | McDonnell | |
| 7,104,495 B2 | 9/2006 | McGeer | |
| 7,114,680 B2 | 10/2006 | Dennis | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 | 5/2009 | Kelleher | |
| 7,543,780 B1 | 6/2009 | Marshall et al. | |
| 7,562,843 B2 | 7/2009 | Lipponen | |
| 7,578,467 B2 | 8/2009 | Goodrich | |
| 7,581,702 B2 | 9/2009 | Olson et al. | |
| 7,602,415 B2 | 10/2009 | von Flotow et al. | |
| 7,665,691 B2 | 2/2010 | Hanzlick et al. | |
| 7,712,702 B2 | 5/2010 | McGeer et al. | |
| 7,798,445 B2 | 9/2010 | Heppe et al. | |
| 7,806,366 B2 | 10/2010 | Jackson | |
| 7,876,359 B2 | 1/2011 | von Flotow et al. | |
| 7,883,059 B2 | 2/2011 | Kunz | |
| 7,954,758 B2 | 6/2011 | McGeer et al. | |
| 8,091,883 B2 | 1/2012 | von Flotow et al. | |
| 8,140,200 B2 | 3/2012 | Heppe et al. | |
| 8,162,256 B2 | 4/2012 | Goossen | |
| 8,172,177 B2 | 5/2012 | Lovell | |
| 8,226,039 B2 | 7/2012 | von Flotow et al. | |
| 8,231,083 B2 | 7/2012 | Kutzmann et al. | |
| 8,245,968 B2 | 8/2012 | McGeer et al. | |
| 8,276,844 B2 | 10/2012 | Kariv | |
| 8,292,215 B2 | 10/2012 | Olm et al. | |
| 8,313,057 B2 | 11/2012 | Rednikov | |
| 8,348,193 B2 | 1/2013 | McGeer et al. | |
| 8,405,723 B2 | 3/2013 | von Flotow et al. | |
| 8,453,966 B2 | 6/2013 | McGeer et al. | |
| 8,464,981 B2 | 6/2013 | Goldie et al. | |
| 8,573,536 B2 | 11/2013 | McGeer et al. | |
| 8,596,576 B1 | 12/2013 | McGeer et al. | |
| 8,672,264 B1 | 3/2014 | McGeer et al. | |
| 8,708,277 B1 | 4/2014 | McGeer et al. | |
| 8,708,278 B2 | 4/2014 | McGeer et al. | |
| 8,714,482 B2 | 5/2014 | McGeer et al. | |
| 8,740,134 B2 | 6/2014 | Suzuki | |
| 8,740,142 B2 | 6/2014 | McGeer et al. | |
| 8,857,754 B2 | 10/2014 | Ferrari et al. | |
| 8,944,373 B2 | 2/2015 | Dickson | |
| 8,950,698 B1 | 2/2015 | Rossi | |
| 8,955,800 B2 | 2/2015 | McGeer et al. | |
| 8,955,801 B2 | 2/2015 | McGeer et al. | |
| 9,004,402 B2 | 4/2015 | McGeer et al. | |
| 9,010,683 B2 | 4/2015 | Gundlach et al. | |
| 9,132,916 B2 | 9/2015 | Hanna et al. | |
| 9,193,481 B2 | 11/2015 | McGeer et al. | |
| 9,266,609 B1 | 2/2016 | Kunz | |
| 9,290,269 B2 * | 3/2016 | Walker | B64C 39/024 |
| 9,340,301 B2 | 5/2016 | Dickson et al. | |
| 9,359,075 B1 | 6/2016 | von Flotow et al. | |
| 9,434,481 B2 | 9/2016 | McGeer et al. | |
| 9,456,185 B2 | 9/2016 | Oakley et al. | |
| 9,475,575 B2 | 10/2016 | Rossi | |
| 9,527,604 B2 | 12/2016 | Melish et al. | |
| 9,637,245 B2 | 5/2017 | Yoffe | |
| 9,656,765 B2 * | 5/2017 | von Flotow | B64C 27/08 |
| 9,685,091 B2 | 6/2017 | Hayes | |
| 9,816,816 B2 | 11/2017 | Hayes | |
| 9,856,036 B2 | 1/2018 | Dickson et al. | |
| 9,896,222 B2 | 2/2018 | Kunz et al. | |
| 10,518,902 B2 | 12/2019 | Briggs et al. | |
| 2002/0100838 A1 * | 8/2002 | McGeer | B64C 25/68 244/116 |
| 2003/0222173 A1 | 12/2003 | McGeer et al. | |
| 2004/0256519 A1 | 12/2004 | Ellis et al. | |
| 2005/0017129 A1 | 1/2005 | McDonnell | |
| 2009/0224097 A1 | 9/2009 | Kariv | |
| 2010/0025528 A1 | 2/2010 | Jackson | |
| 2010/0295321 A1 * | 11/2010 | Bevirt | F03D 9/25 290/55 |
| 2012/0223182 A1 | 9/2012 | Gilchrist et al. | |
| 2014/0339355 A1 * | 11/2014 | Olm | B64C 27/08 244/17.23 |
| 2015/0129716 A1 | 5/2015 | Yoffe | |
| 2015/0314871 A1 | 11/2015 | von Flotow | |
| 2016/0023760 A1 | 1/2016 | Goodrich | |

(56) References Cited

U.S. PATENT DOCUMENTS

| | | | |
|---|---|---|---|
| 2016/0114906 A1 | 4/2016 | McGeer et al. | |
| 2016/0221683 A1 | 8/2016 | Roberts et al. | |
| 2016/0327945 A1* | 11/2016 | Davidson | G01S 19/071 |
| 2017/0036762 A1 | 2/2017 | Gamble et al. | |
| 2017/0072812 A1 | 3/2017 | Von Novak et al. | |
| 2017/0225784 A1* | 8/2017 | Hayes | B64D 5/00 |
| 2017/0274997 A1 | 9/2017 | von Flotow et al. | |
| 2017/0297738 A1 | 10/2017 | von Flotow et al. | |
| 2017/0369185 A1* | 12/2017 | Grubb | B64C 39/024 |
| 2018/0050823 A1 | 2/2018 | McGeer | |
| 2018/0327113 A1 | 11/2018 | Von Flotow et al. | |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |
| WO | WO 2014/204550 | 12/2014 |
| WO | WO 2016/167849 | 10/2016 |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (25 pp.).

Aerosonde hazard estimation, T. McGeer, 1994, (6 pp.).

Aerosonde Pacific reconnaissance: ready when you are!, T. McGeer, Pacific Northwest Weather Workshop, Mar. 2005, (15 pp.).

An Airspeed Vector Sensor for V/STOL Aircraft, E. J. Durbin and T. McGeer, Journal of Aircraft, vol. 19 No. 6, Jun. 1982, (7 pp).

AVIASTAR, "Bell QTR Quad Tiltrotor", Jul. 27, 2015 (3 pages).

Automated Launch, Recovery, and Refueling for Small Unmanned Aerial Vehicles, K. Mullens et al., 2004 (11 pp).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp).

Mini-RPV Recovery System Conceptual Study, Prepared for Eustis Directorate U.S. Army Air Mobility Research and Development Laboratory, Aug. 1977 (322 pages).

Quantitative Risk Management as a Regulatory Approach to Civil UAVs, T. McGeer, L. Newcombe, and J. Vagners, International Workshop on UAV Certification, Jun. 1999, (11 pp).

Regulatory Issues Involving Long-Range Weather Observation by Aerosonde Autonomous Aircraft, T. McGeer, Oct. 1998, (8 pp).

Rotary Action, description of scene of License to Kill, available at http://www.rotaryaction.com/pages/licetkil.html (2 pp).

Safety, Economy, Reliability and Regulatory Policy of Unmanned Aircraft, T. McGeer, Mar. 2007, (9 pp).

Skyhook (Harrier handling system); Harpoon Head Quarters; available at http://www.harpoondatabases.com/encyclopedia/Entry2979.aspx; printed Jun. 21, 2013 (3 pages).

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).

Wide-Scale Use of Long-Range Miniature Aerosondes Over the World's Oceans, T. McGeer and J. Vagners, 1999, (25 pp).

* cited by examiner

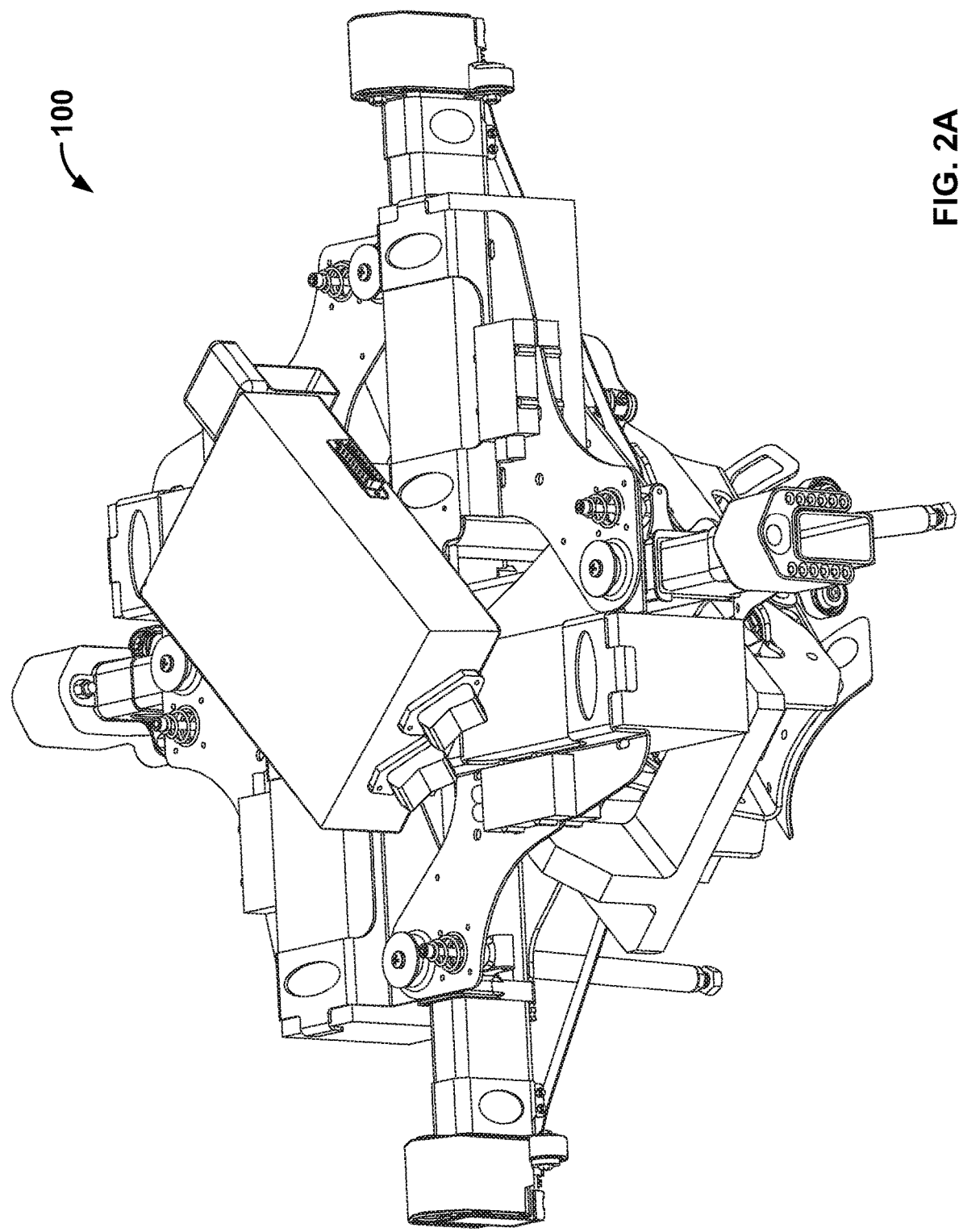

AIRCRAFT-RETRIEVAL SYSTEM

PRIORITY

This patent application claims priority to and the benefit of U.S. Provisional Patent Application No. 62/504,848, which was filed on May 11, 2017, the entire contents of which are incorporated herein by reference.

FIELD

The present disclosure relates to an aircraft-retrieval system for retrieving an aircraft from free flight. More particularly, the present disclosure relates to an aircraft-retrieval system for retrieving a fixed-wing aircraft from free flight using a winch-equipped retrieval assembly.

BACKGROUND

An aircraft capable of hover and/or of slow flight is typically not well-suited to long-distance, efficient cruising flight. Certain fixed-wing aircraft are capable of long-distance, efficient cruising flight, but typically require long runways for takeoff landing. When there isn't sufficient space for a runway, these fixed-wing aircraft may not be used, or must be alternatively launched. There is a need for aircraft-launch and/or retrieval systems and methods that eliminate the need for a runway to launch and/or retrieve a fixed-wing aircraft.

SUMMARY

The present disclosure provides various embodiments of an aircraft retrieval system including winch-equipped retrieval assembly that is removably attachable to a rotorcraft (such as but not limited to a multi-copter or a helicopter) to facilitate retrieval of a fixed-wing aircraft from wing-borne flight.

In one embodiment, the fixed-wing retrieval system includes a retrieval assembly, a flexible capture member, and a tensioning object. The retrieval assembly includes a base configured to be removably attached to a rotorcraft, a drum attached to and rotatable relative to the base, a motor operatively connected to the drum to rotate the drum, and multiple landing gear attached to the base. One end of the flexible capture member is attached to the drum and the flexible capture member is wound around the drum. The free end of the flexible capture member terminates in an attachment device. The tensioning object is attached to the attachment device.

In operation, an operator attaches the rotorcraft to the base of the retrieval assembly and remotely controls the rotorcraft to fly to a retrieval location. The operator remotely controls the motor to wind a first portion of the flexible capture member off of the drum. The operator remotely controls the rotorcraft to fly into the wind. The fixed-wing aircraft is controlled to contact and capture part of the first portion of the flexible capture member. Afterwards, the operator remotely controls the motor to rotate the drum to wind at least part of the first portion of the flexible capture member back onto the drum to draw the fixed-wing aircraft toward the rotorcraft in preparation for landing.

Additional features and advantages of the present disclosure are described in, and will be apparent from, the following Detailed Description and the Figures.

BRIEF DESCRIPTION OF THE FIGURES

FIG. 2A is a top perspective view of the hub module of the multicopter of FIG. 1A.

DETAILED DESCRIPTION

Figure 1A:
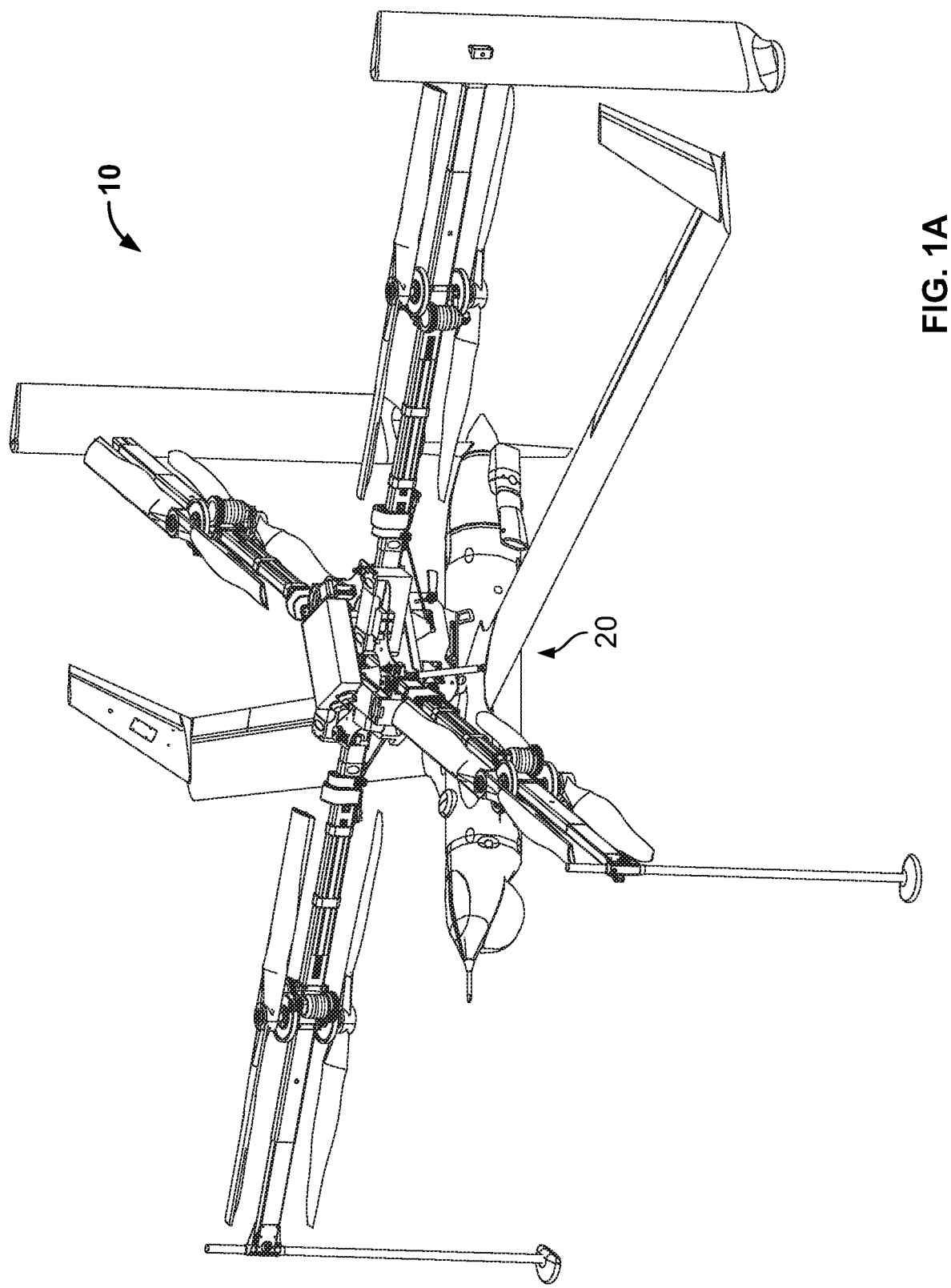
FIG. 1A is a top perspective view of one example embodiment of a rotorcraft of the present disclosure, and particularly in the form of a multicopter attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The rotorcraft-assisted launch and retrieval system of various embodiments of the present disclosure generally includes an example roto-craft in the form of an example eight-rotor modular multicopter attachable to (and detachable from) an example fixed-wing aircraft to facilitate launch of the fixed-wing aircraft into wing-borne flight and attachable to (and detachable from) a retrieval assembly to facilitate retrieval of the fixed-wing aircraft from wing-borne flight. In other embodiments, the rotorcraft may include any suitable quantity of rotors (such as but not limited to being in the form of a helicopter or a quadcopter).

Generally, to launch the fixed-wing aircraft 20 into wing-borne flight, an operator (or operators): (1) attaches the fixed-wing aircraft to a rotocraft such as a multicopter; (2) remotely controls the rotocraft to lift the fixed-wing aircraft to a desired pre-launch altitude and to accelerate the fixed-wing aircraft to a desired pre-launch speed; (3) remotely causes the fixed-wing aircraft to detach from the rotocraft, thereby releasing the fixed-wing aircraft into wing-borne flight; and (4) lands on a landing surface.

Generally, to retrieve the fixed-wing aircraft from wing-borne flight, the operator (or operators): (1) attaches the retrieval assembly to the rotocraft; (2) attaches a tensioning object to the free end of a flexible capture member wound around a drum of the retrieval assembly; (3) remotely controls the rotocraft to fly to a pre-capture altitude; (4) remotely controls a motor to rotate the drum to wind out a first portion of the flexible capture member from the drum; (5) remotely controls the rotocraft to fly until the fixed-wing aircraft contacts and captures the flexible capture member; (6) remotely controls the motor to rotate the drum to wind in the flexible capture member until the fixed-wing aircraft reaches the drum; and (7) remotely controls the rotocraft to land.

1. Example Multicopter Components

FIGS. 1A, 1B, 1C, 1D, 1E, 1F, and 1G show an example rotocraft in the form of an example multicopter 10 of the present disclosure. The multicopter 10 is modular in that it is assembled from (and can be disassembled into) a plurality of different modules or subassemblies. The multicopter is removably attachable to: (1) the fixed-wing aircraft 20 to facilitate launch of the fixed-wing aircraft 20 into wing-borne flight, and (2) the flexible capture member 5000 to facilitate retrieval of the fixed-wing aircraft 20 from wing-borne flight.

Figure 1B:
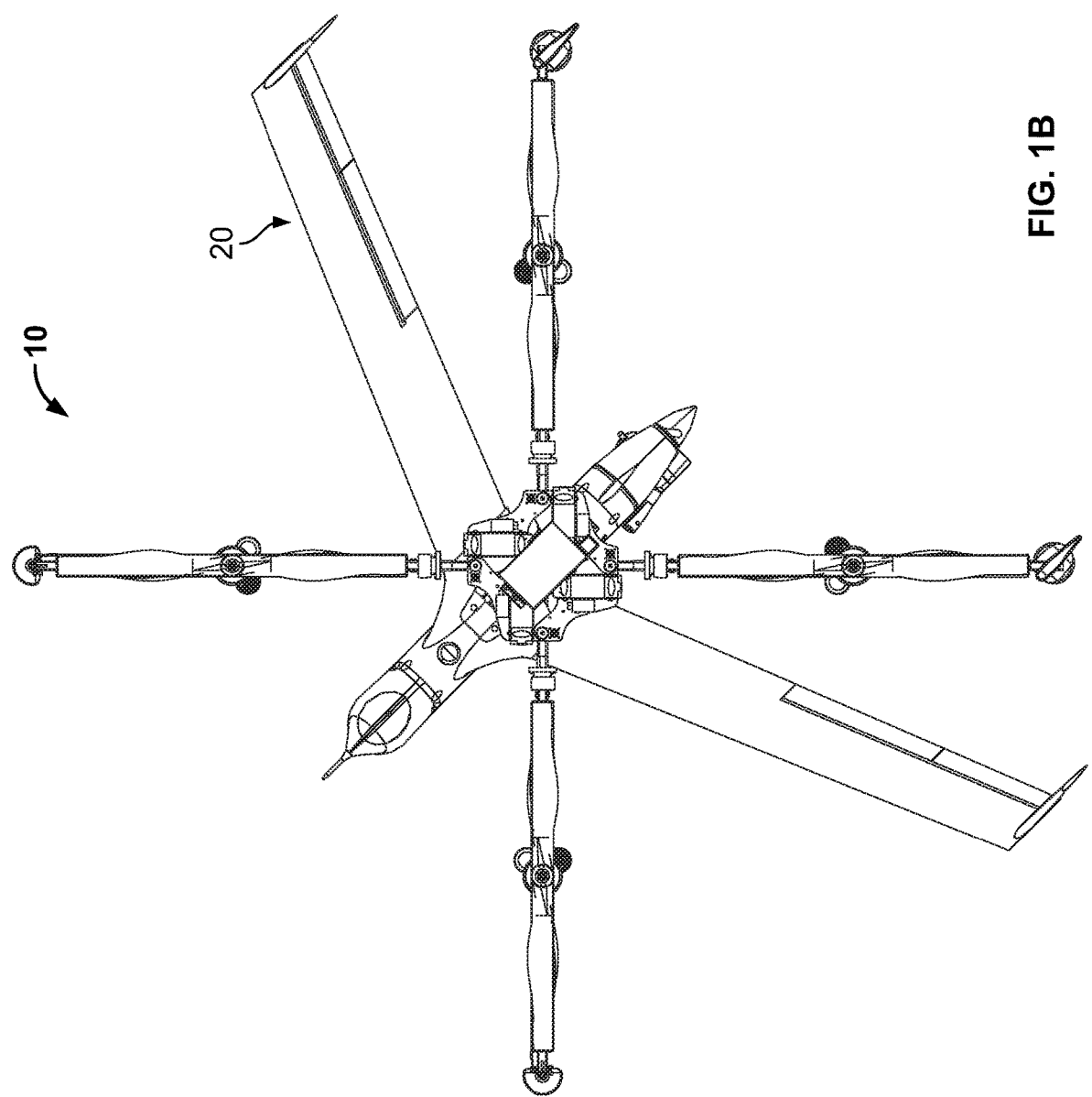
FIG. 1B is a top plan view of the multicopter and fixed-wing aircraft of FIG. 1A.
Figure 1C:
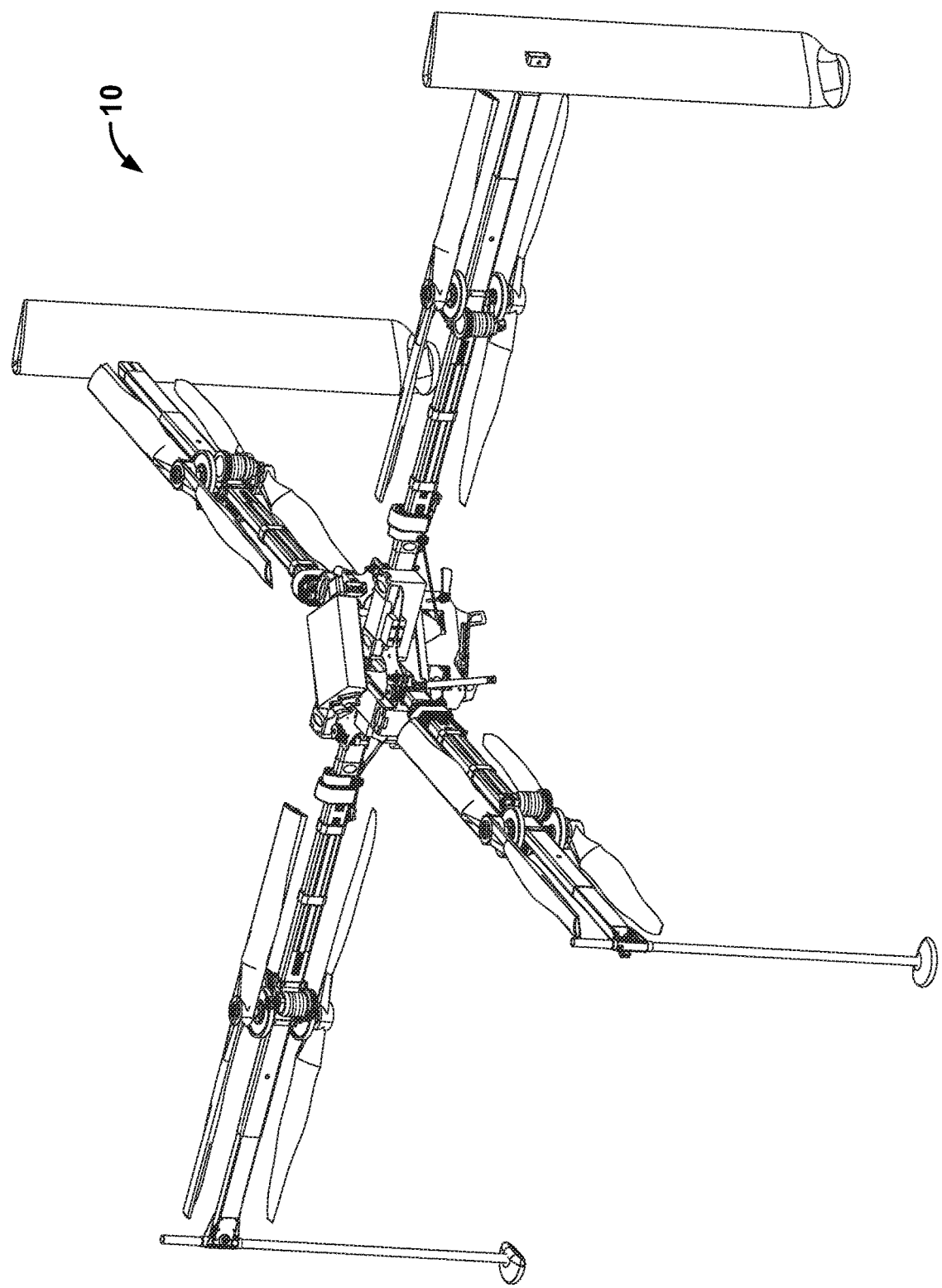
FIG. 1C is a top perspective view of the multicopter of FIG. 1A.
Figure 1D:
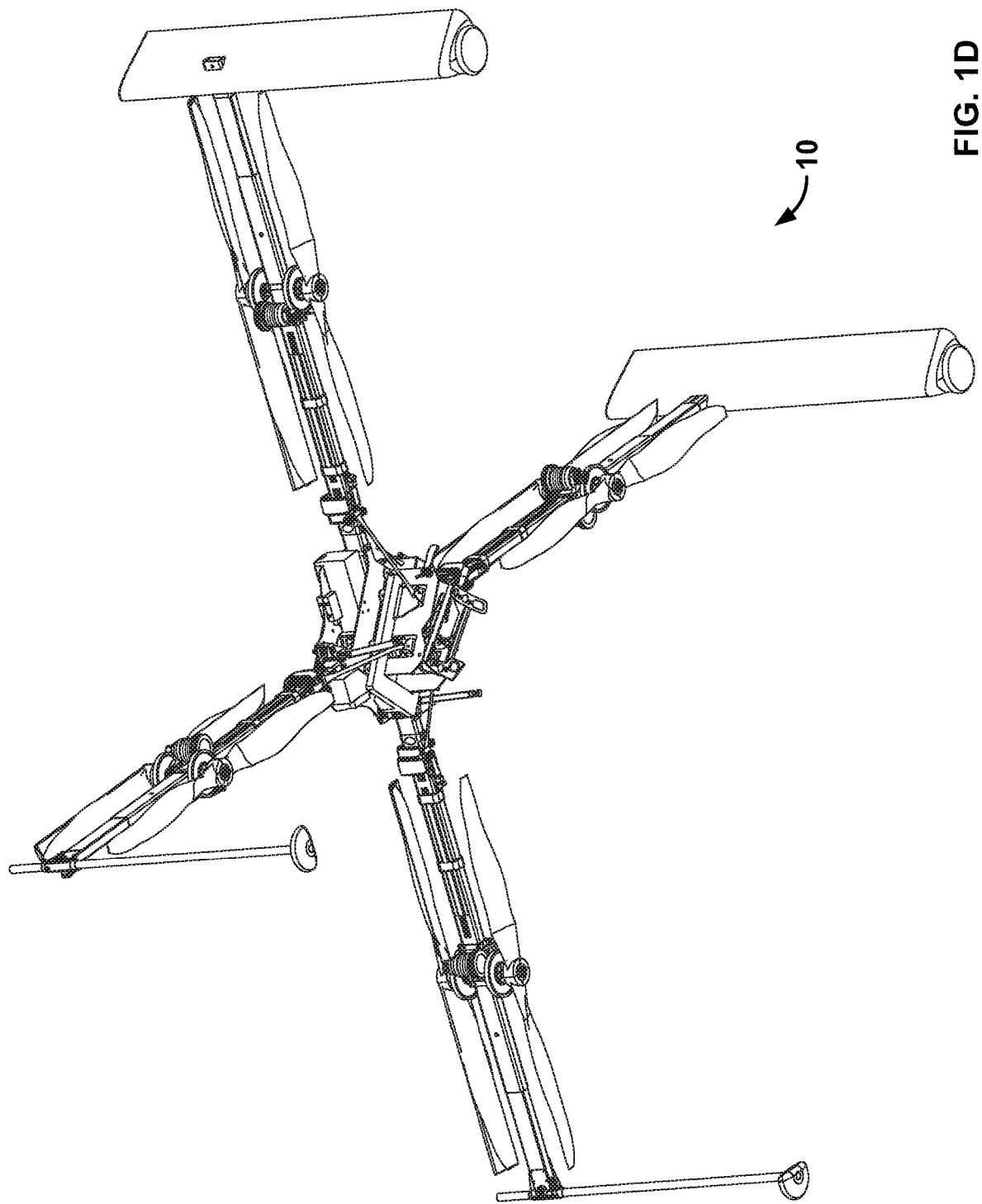
FIG. 1D is a bottom perspective view of the multicopter of FIG. 1A.
Figure 1E:
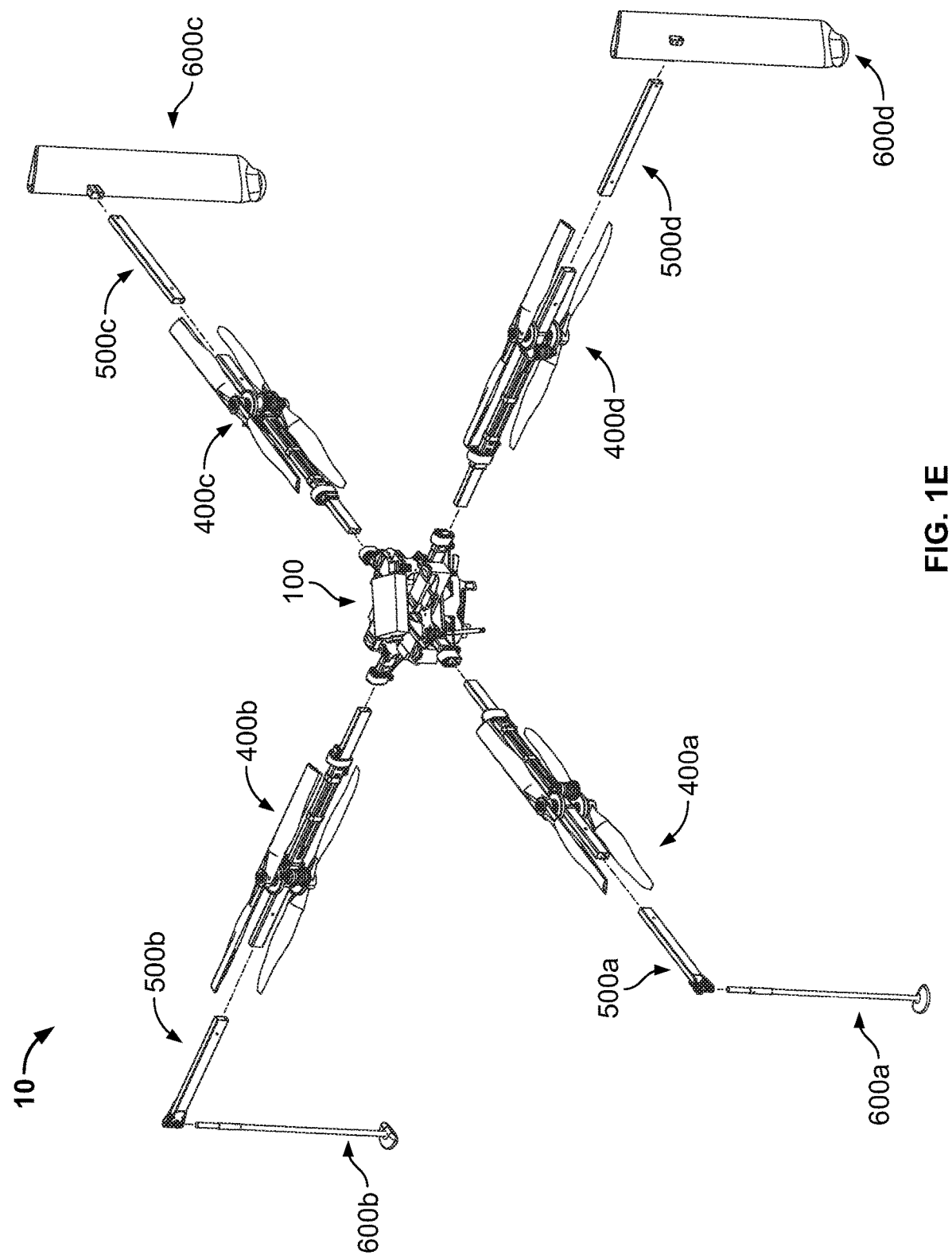
FIG. 1E is a partially exploded top perspective view of the multicopter of FIG. 1A.
Figure 1F:
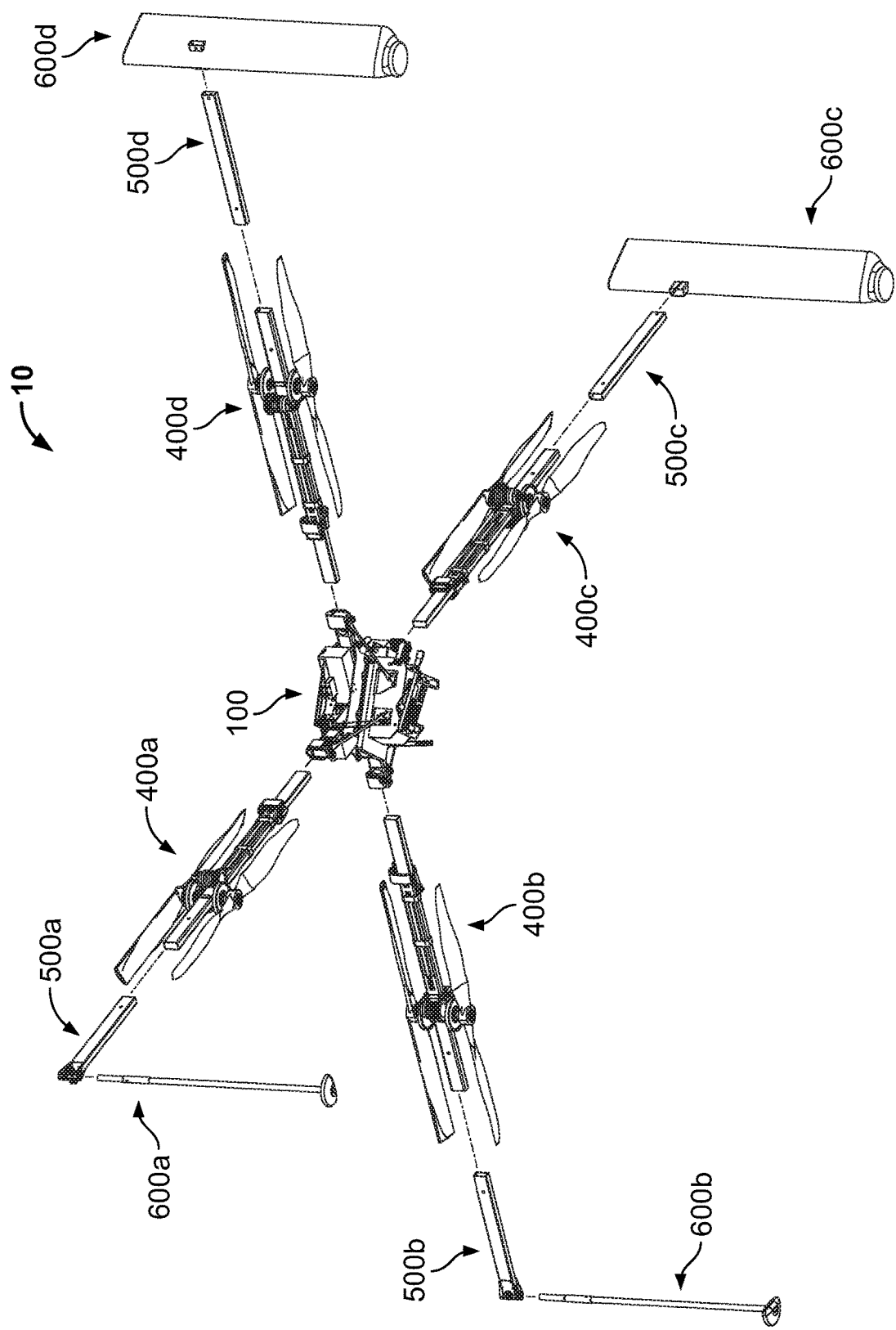
FIG. 1F is a partially exploded bottom perspective view of the multicopter of FIG. 1A.

As best shown in FIGS. 1E and 1F, the multicopter 10 includes the following 13 modules or subassemblies: a hub module 100; first, second, third, and fourth rotor arm modules 400a, 400b, 400c, and 400d; first and second front landing gear extension modules 500a and 500b; first and second rear landing gear extension modules 500c and 500d;

first and second front landing gear modules 600a and 600b; and first and second rear landing gear modules 600c and 600d.

As described in detail below, to assemble the multicopter 10 from these 13 modules or subassemblies, after removing the 13 modules from the container of the storage and launch system 2000, an operator: (1) attaches the first, second, third, and fourth rotor arm modules 400a, 400b, 400c, and 400d to the hub module 100; (2) attaches the first and second front landing gear extension modules 500a and 500b to the first and second rotor arm modules 400a and 400b, respectively; (3) attaches the first and second rear landing gear extension modules 500c and 500d to the third and fourth rotor arm modules 400c and 400d, respectively; (4) attaches the first and second front landing gear module 600a and 600b to the first and second front landing gear extension modules 500a and 500b, respectively; and (5) attaches the first and second rear landing gear module 600c and 600d to the first and second rear landing gear extension modules 500c and 500d, respectively.

The modularity of this multicopter is beneficial compared to non-modular or unitary multicopter construction. First, the modularity of this multicopter enables an operator to quickly and easily disassemble this relatively large multicopter into 13 smaller modules or subassemblies. The operator can compactly store these modules or subassemblies in a single container, which makes the disassembled multicopter easy to store and transport compared to the assembled multicopter. Second, if a part of this multicopter breaks, its modularity enables the operator to quickly and easily replace the module(s) or subassembly(ies) including the broken part with a properly-functioning replacement module(s) or subassembly(ies) rather than waste time repairing the broken component(s).

Figure 1G:
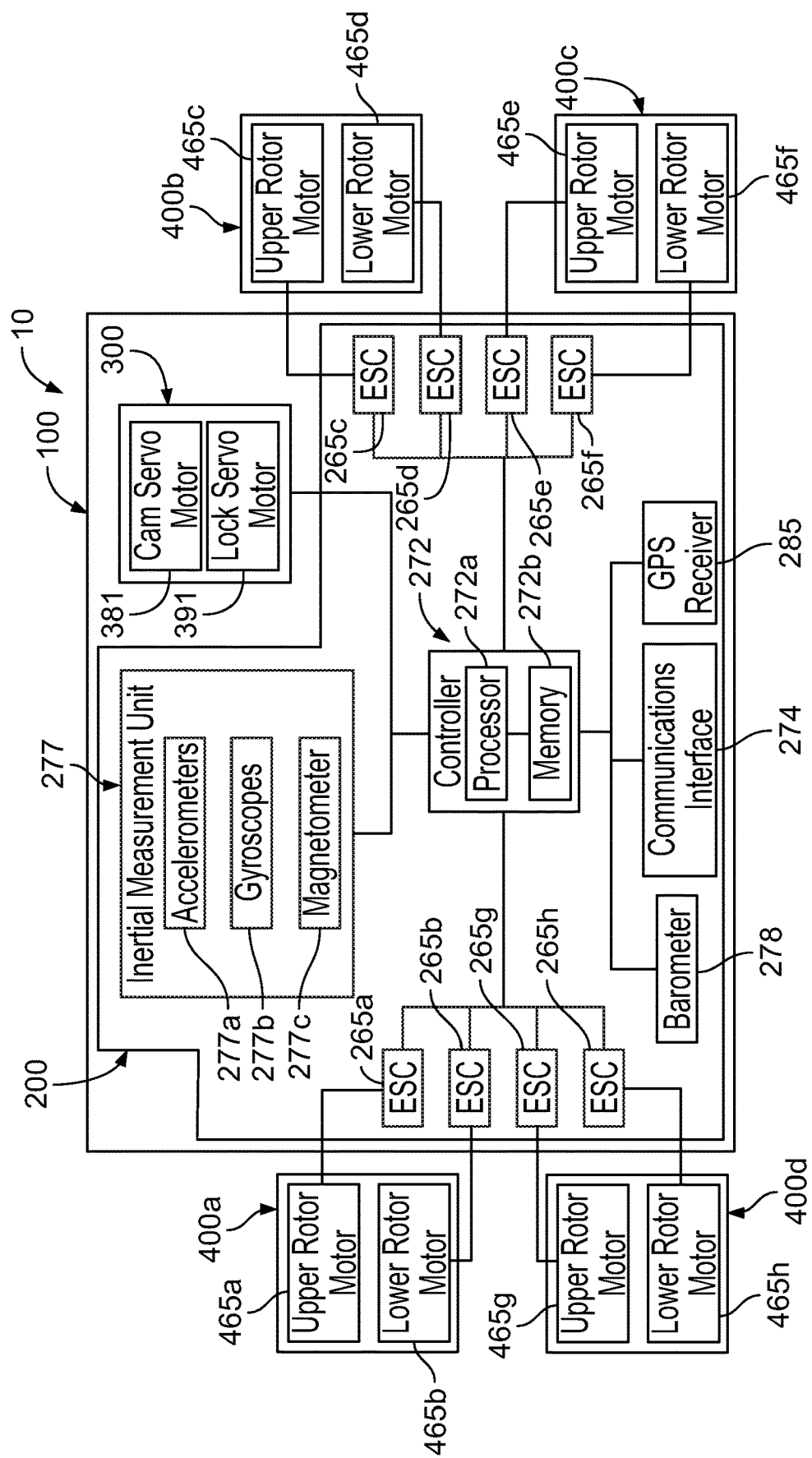
FIG. 1G is a block diagram showing certain electrically controlled components of the multicopter of FIG. 1A.

FIG. 1G is a block diagram of certain electrically-controlled components of the multicopter 10. In this embodiment, although not shown in FIG. 1G, four (or any suitable quantity of) lithium-ion batteries (or any other suitable power source(s)) power these components (as described below). Specifically, for a given component, the power source may be directly electrically connected to that component to power that component or indirectly electrically connected to that component (e.g., via another component) to power that component.

The hub module 100 includes a hub base 200 and a saddle 300. The hub base 200 includes: (1) a controller 272; (2) a communications interface 274; (3) an inertial measurement unit (IMU) 277; (4) a barometer 278 (or other suitable pressure sensor); (5) a GPS receiver 285; and (6) eight electronic speed controllers (ESCs) 265a, 265b, 265c, 265d, 265e, 265f, 265g, and 265h. The saddle 300 includes: (1) a cam servo motor 381; and (2) a lock servo motor 391. This is merely one example configuration, and these components may be located on any suitable part of the multicopter in other embodiments. The first rotor arm module 400a includes an upper rotor motor 465a and a lower rotor motor 465b. The second rotor arm module 400b includes an upper rotor motor 465c and a lower rotor motor 465d. The third rotor arm module 400c includes an upper rotor motor 465e and a lower rotor motor 465f. The fourth rotor arm module 400d includes an upper rotor motor 465g and a lower rotor motor 465h.

The controller 272 is electrically and communicatively connected to the telemetry link 274, the R/C receiver 276, the IMU 277, the barometer 278, the GPS receiver 285, the ESCs 265a to 265h, the cam servo motor 381, and the lock servo motor 391.

The controller 272 includes a processor 272a and a memory 272b. The processor 272a is configured to execute program code or instructions stored in the memory 272b to control operation of the multicopter 10, as described herein. The processor 272a may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory 272b is configured to store, maintain, and provide data as needed to support the functionality of the multicopter 10. For instance, in various embodiments, the memory 272b stores program code or instructions executable by the processor 272a to control the multicopter 10. The memory 272b may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown) that the operator of the multicopter 10 controls. In operation, once the communications interface 274 establishes communication with the computing device, the controller 272 can send data (via the communications interface 274) associated with the operation of the multicopter 10 (such as the operational status of the multicopter 10, GPS coordinates of the multicopter 10, rotor motor status, IMU or other sensor measurements, altitude, GPS reception health, magnetometer health, aircraft attitude, and the like) to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller.

In certain embodiments, the communications interface 274 includes separate components for communicating with the computing device (such as a telemetry link) and the R/C controller (such as an R/C receiver).

The IMU 277 includes: (1) multiple accelerometers 277a configured to sense the linear acceleration of the multicopter 10 with respect to three orthogonal reference axes (e.g., standard orthogonal x-, y-, and z-axes); (2) multiple gyroscopes 277b configured to sense the angular rotation of the multicopter 10 with respect to the pitch, yaw, and roll axes of the multicopter 10, as is known in the art; and (3) a magnetometer 277c configured to enable the controller 272 to determine the heading of the multicopter 10 (i.e., the direction in which the multicopter 10 is pointed relative to Earth), as is known in the art. More specifically, the magnetometer 277c is configured to sense the Earth's magnetic field and transmit a signal representing the direction of the Earth's magnetic North to the controller 272. The controller 272 is configured to use the GPS coordinates of the multicopter 10 and a global map of declination angle (the angle between the Earth's true North and the Earth's magnetic North) to determine a required correction angle. The controller 272 is configured to apply the required correction angle to the direction of the Earth's magnetic North to obtain the direction of the Earth's true North. The controller 272 then uses this information to determine the heading of the multicopter 10. In other embodiments, a pair of GPS receivers are used instead of the magnetometer to maintain more accurate heading. This practice is especially useful when the multicopter is operating in close proximity to large iron objects—such as ship hulls—or when the difference between the Earth's magnetic North and true North is large, such as near the Earth's poles.

The accelerometers 277a, the gyroscopes 277b, and the magnetometer 277c continuously or periodically obtain these sensor readings and continuously or periodically transmit corresponding signals to the controller 272, which uses these sensor readings in a variety of different ways described herein. This is merely one example IMU, and the IMU may include any suitable sensors.

The barometer 278 is configured to sense the atmospheric pressure and to transmit a signal representing the sensed atmospheric pressure to the controller 272. The controller 272 is configured to use the sensed atmospheric pressure to determine: (1) the height of the multicopter 10 above sea level, as is known in the art; and (2) the height of the multicopter 10 above the ground or any other suitable reference location, as is known in the art. For instance, to determine the height of the multicopter 10 above the ground, the controller 272 uses a reference atmospheric pressure sensed by the barometer 278 while the multicopter 10 is on the ground just before takeoff to determine the height of the ground above sea level. Once the multicopter 10 is airborne, at any given point in time the controller 272 is configured to determine the height of the multicopter 10 above the ground by: (1) using the atmospheric pressure sensed by the barometer 278 to determine the height of the multicopter 10 above sea level; and (2) determining the difference between the height of the multicopter 10 above sea level and the height of the ground above sea level. This is merely one example way of determining the height of the multicopter above a reference point. Any other suitable method may be employed.

The GPS receiver 285 is communicatively connectable with (such as via a suitable wireless protocol) GPS satellites (not shown), as is known in the art. The GPS receiver 285 is configured to receive signals from one or more of the GPS satellites, to determine the multicopter's location using those signals, and to transmit signals representing the multicopter's location to the controller 272.

The ESC 265a is electrically connected to and, along with the controller 272, controls the operation of the upper rotor motor 465a of the first rotor arm module 400a. The ESC 265b is electrically connected to and, along with the controller 272, controls the operation of the lower rotor motor 465b of the first rotor arm module 400a. The ESC 265c is electrically connected to and, along with the controller 272, controls the operation of the upper rotor motor 465c of the second rotor arm module 400b. The ESC 265d is electrically connected to and, along with the controller 272, controls the operation of the lower rotor motor 465d of the second rotor arm module 400b. The ESC 265e is electrically connected to and, along with the controller 272, controls the operation of the upper rotor motor 465e of the third rotor arm module 400c. The ESC 265f is electrically connected to and, along with the controller 272, controls the operation of the lower rotor motor 465f of the third rotor arm module 400c. The ESC 265g is electrically connected to and, along with the controller 272, controls the operation of the upper rotor motor 465g of the fourth rotor arm module 400d. The ESC 265h is electrically connected to and, along with the controller 272, controls the operation of the lower rotor motor 465h of the fourth rotor arm module 400d.

The controller 272 is configured to send rotor motor control signals to the ESCs 265a to 265h to control operation of the rotor motors 465a to 465h in accordance with received control signals and/or control signals the controller 272 generates via any of the software subroutines disclosed herein.

Each module or subassembly of the multicopter 10 is described in further detail below.

1.1 Hub Module

Figure 2B:
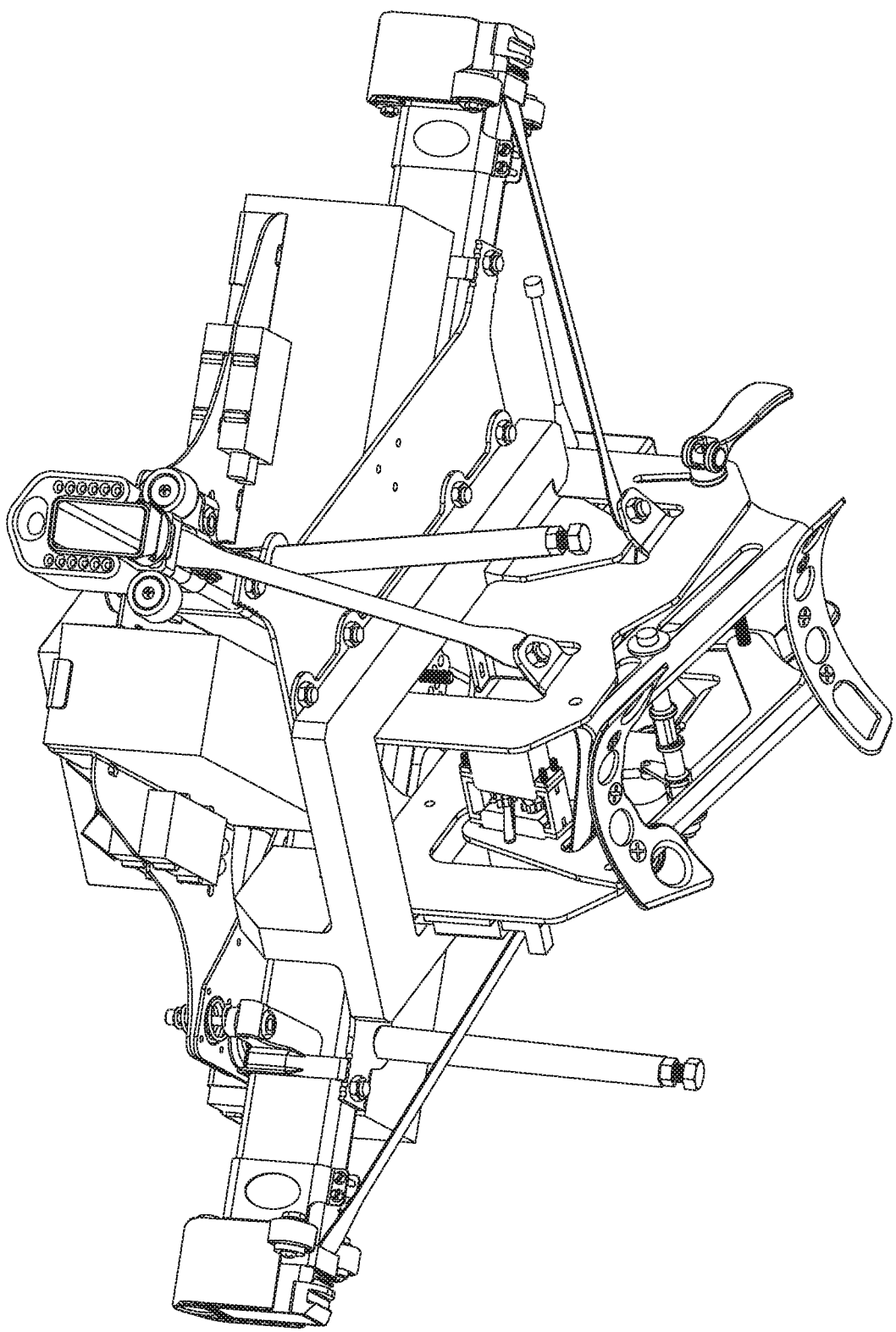
FIG. 2B is a bottom perspective view of the hub module of FIG. 2A.
Figure 2C:
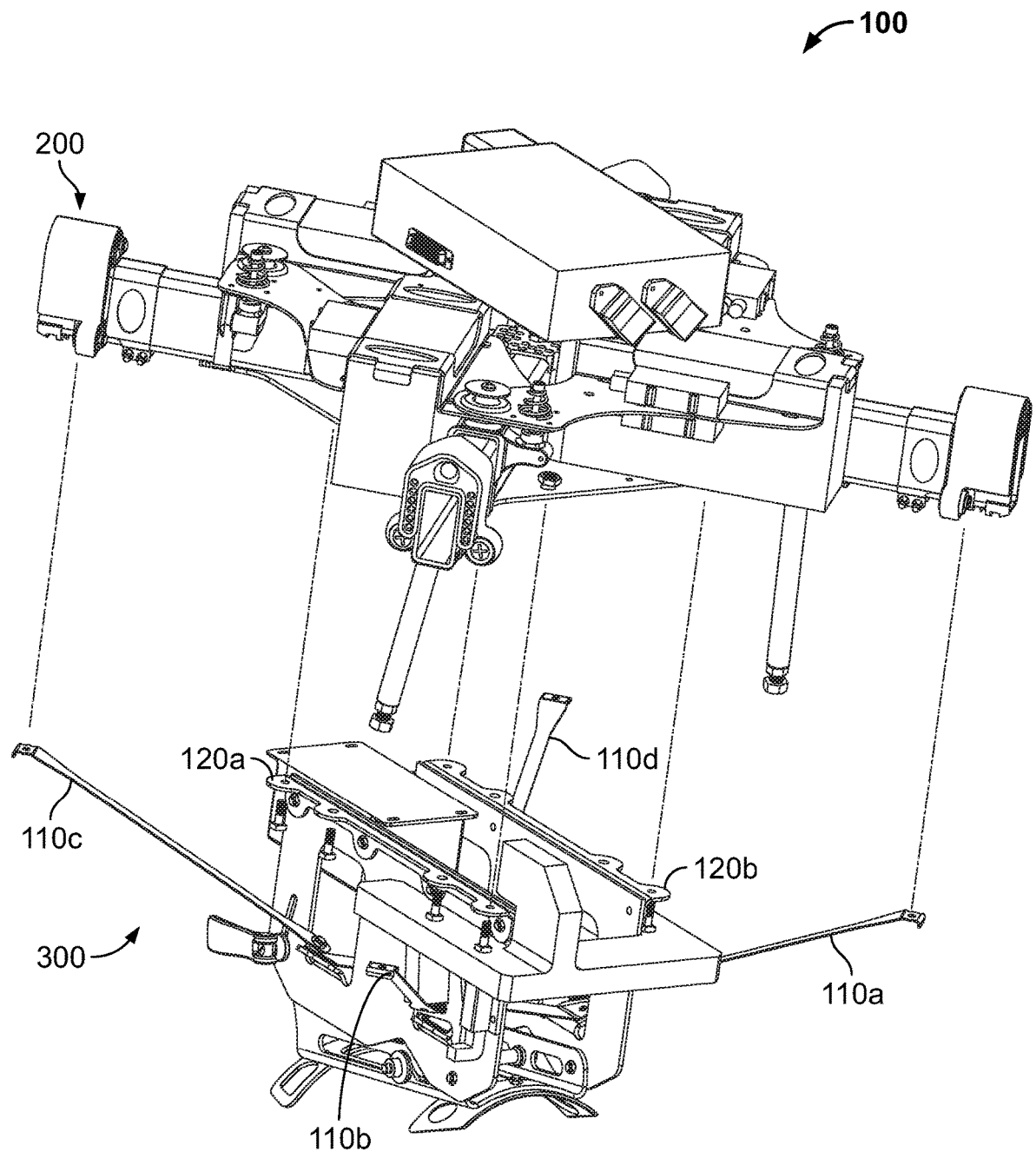
FIG. 2C is a partially exploded top perspective view of the hub module of FIG. 2A showing the hub base separated from the saddle.

FIGS. 2A, 2B, and 2C show the hub module 100. The hub module 100: (1) serves as the attachment point for the rotor arm modules 400a to 400d; (2) is the portion of the multicopter 10 to which the fixed-wing aircraft 20 is attached for launch; (3) is the portion of the multicopter 10 to which the flexible capture member 5000 is attached for retrieval of the fixed-wing aircraft 20; (4) includes the power source for the multicopter 10; and (5) includes certain components used to control operation of the multicopter 10.

As best shown in FIG. 2C, the hub module 100 includes a hub base 200 and a saddle 300. The saddle 300 is attached to the underside of the hub base 200 via two brackets 120a and 120b and four struts 110a, 110b, 110c, and 110d. Each strut 110 is attached at one end to the hub base 200 and at the other end to the saddle 300. This is merely one example of how the saddle can be attached to the hub base, and in other embodiments the saddle may be attached to the hub base in any suitable manner. For instance, in another embodiment, rather than being attached to the hub base, each strut is attached to a different rotor arm module, such as to one of the rotor motor assemblies of the rotor arm modules.

1.1.1 Hub Base

FIGS. 3A, 3B, 3C, 3D, 3E, 3F, 3G, and 3H show the hub base 200 or components thereof. The hub base 200 is the portion of the hub module 100 that: (1) serves as the attachment point for the rotor arm modules 400a to 400d; (2) includes the power source for the multicopter 10; and (3) includes certain components used to control operation of the multicopter 10.

Figure 3A:
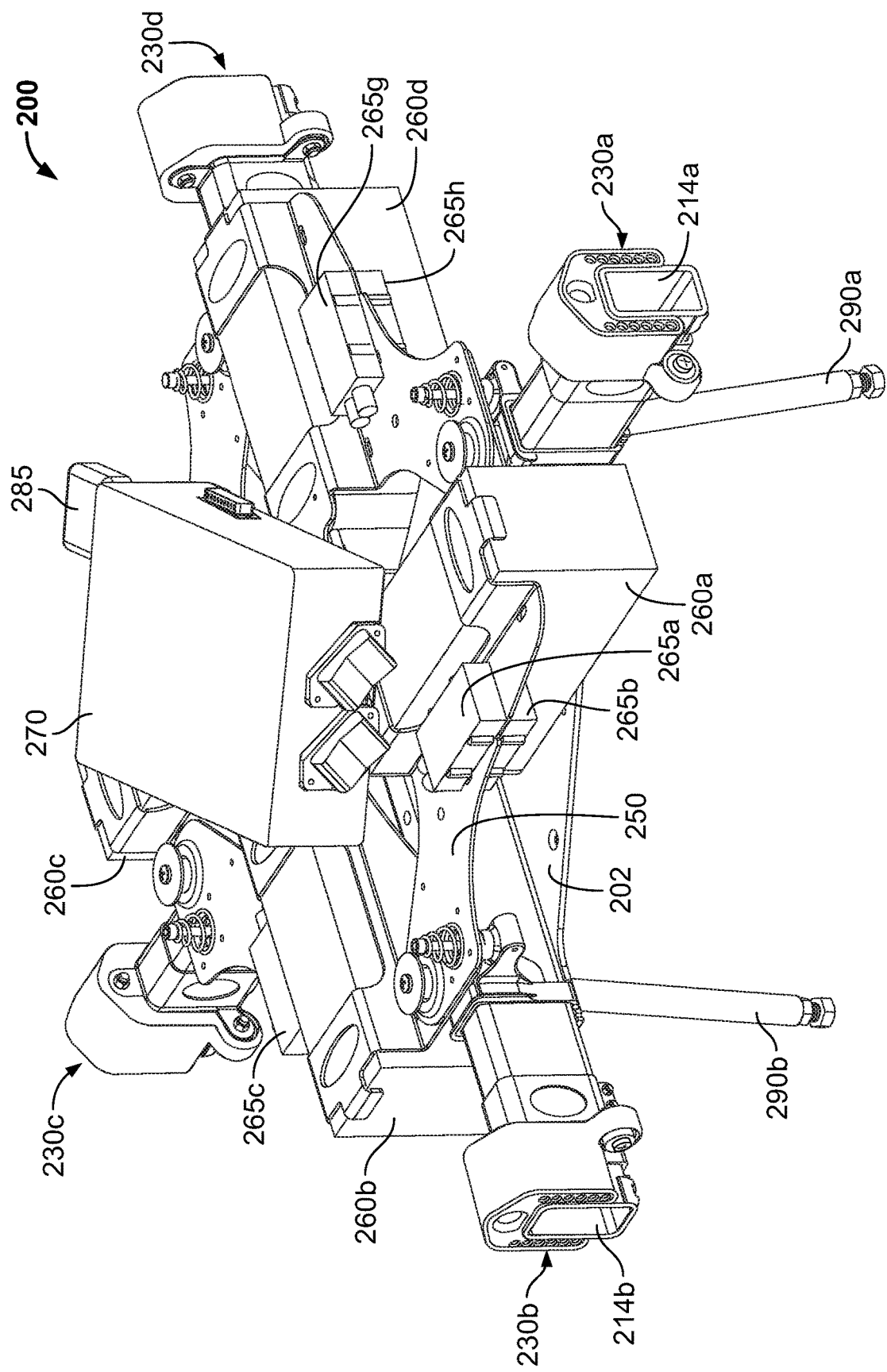
FIG. 3A is a top perspective view of the hub base of the hub module of FIG. 2A.
Figure 3B:
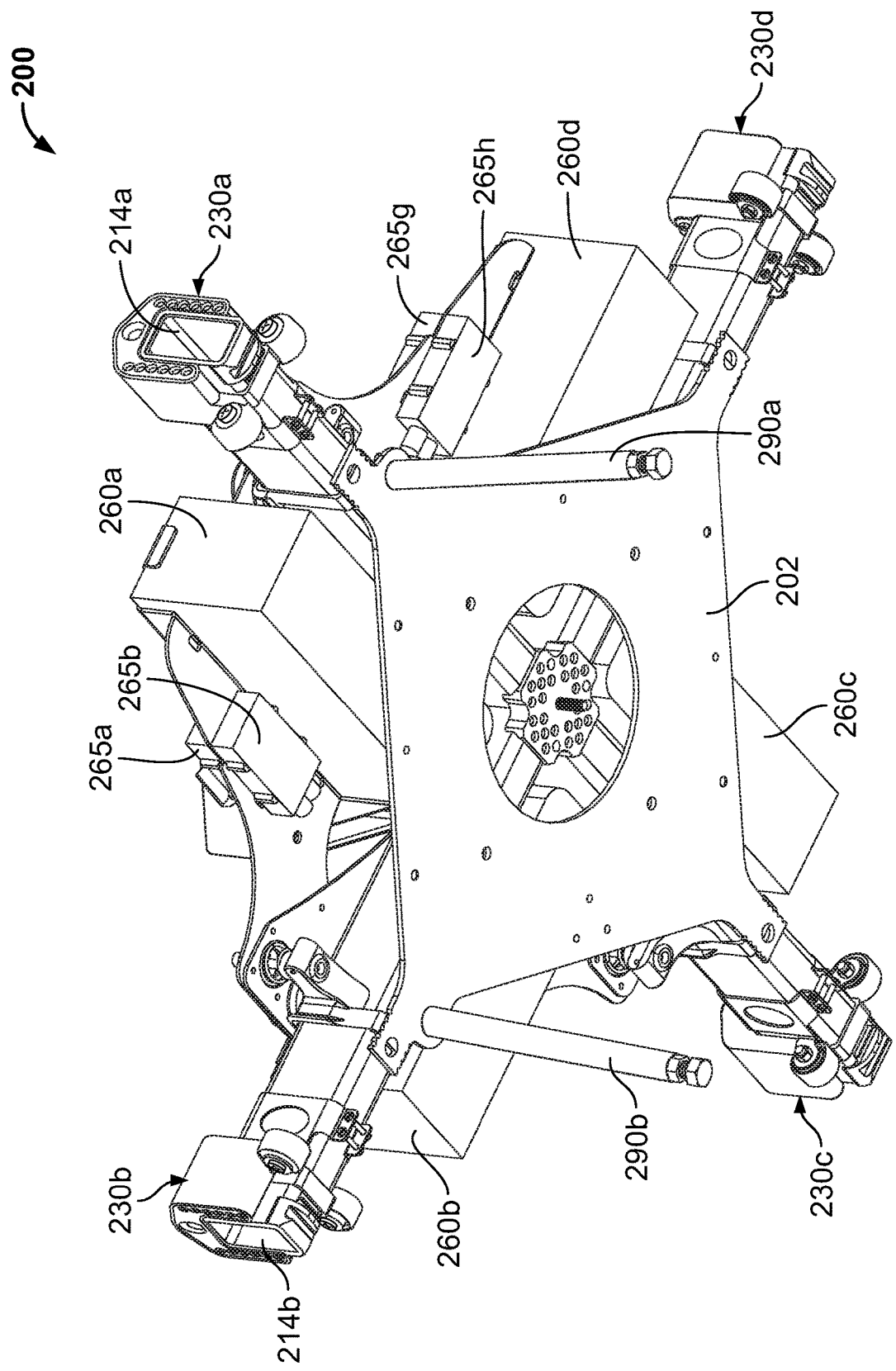
FIG. 3B is a bottom perspective view of the hub base of FIG. 3A.
Figure 3C:
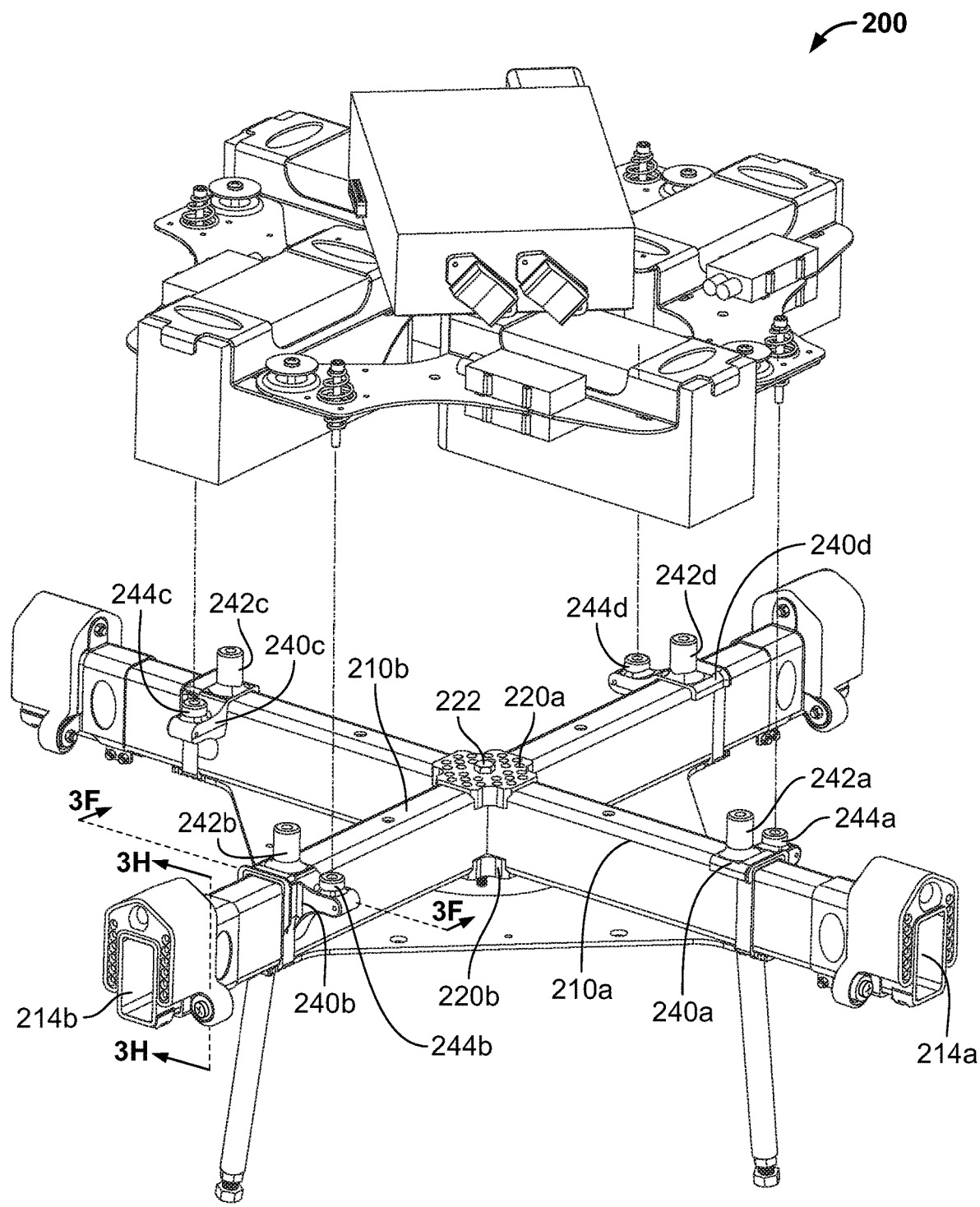
FIG. 3C is a partially exploded top perspective view of the hub base of FIG. 3A.
Figure 3D:
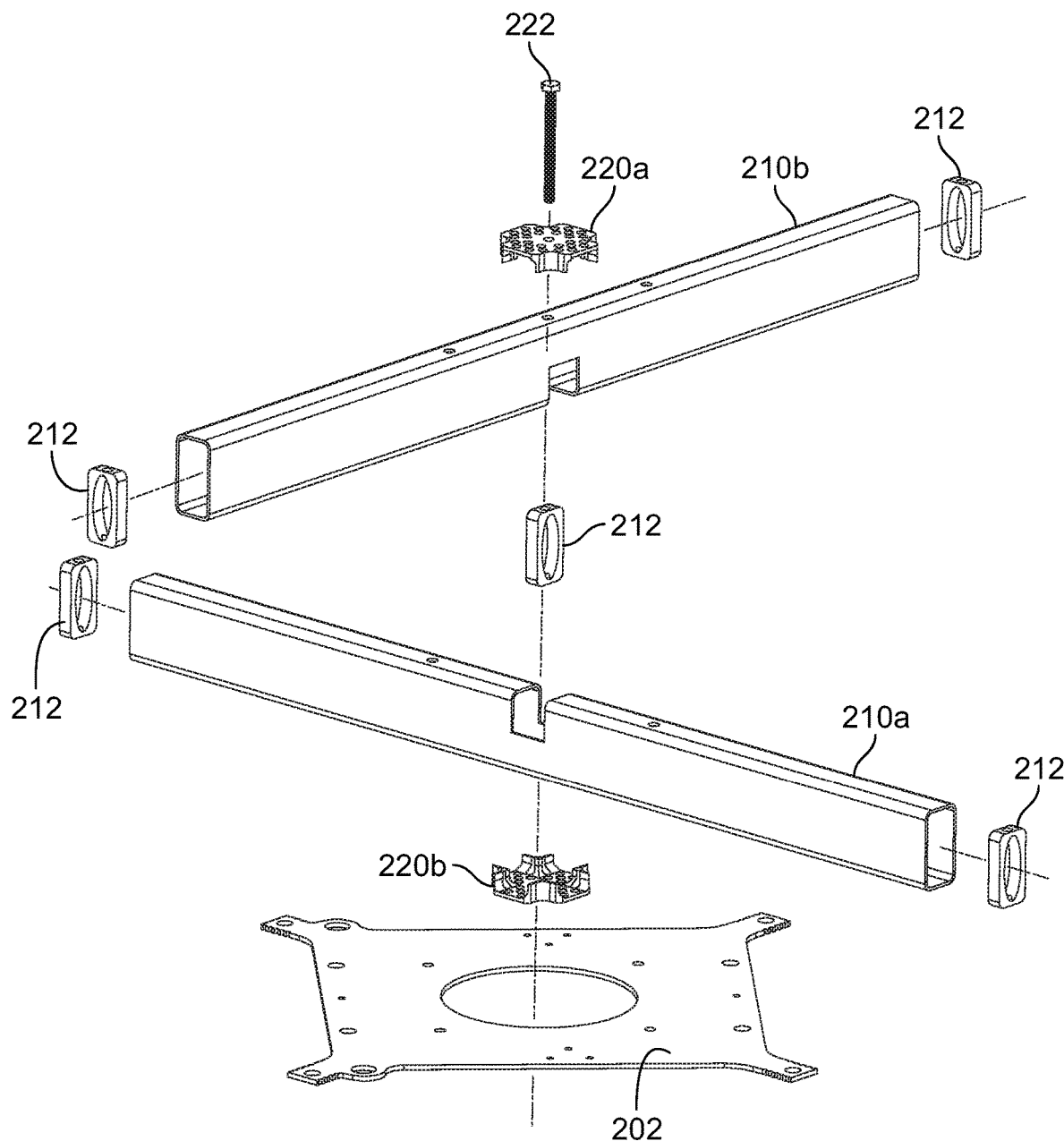
FIG. 3D is an exploded top perspective view of the supports and associated mounting hardware of the hub base of FIG. 3A.

As best shown in FIGS. 3C and 3D, the hub base 200 includes two hollow elongated rectangular supports 210a and 210b. The hollow supports 210a and 210b interlock with one another near their centers such that the hollow supports 210a and 210b are oriented transversely (such as generally perpendicularly) to one another and generally form a cross shape when viewed from above or below. Reinforcing plugs 212 are disposed within the hollow supports 210a and 210b such that fastener receiving openings (not labeled) of the reinforcing plugs 212 vertically align with fastener receiving openings (not labeled) of the hollow supports 210a and 210b. Upper and lower braces 220a and 220b sandwich the hollow supports 210a and 210b. A fastener 222 threaded through the upper brace 220a, the hollow support 210a, the reinforcing plug 212, the hollow support 210b, and the lower brace 220b holds the upper and lower braces 220a and 220b and the hollow supports 210a and 210b together. This ensures the hollow supports 210a and 210b remain interlocked and ensures their orientation with respect to one another does not substantially change.

The hollow supports 210a and 210b are attached to a hub base plate 202 via suitable fasteners (not labeled) threaded through the hollow supports 210a and 210b and the reinforcing plugs 212 disposed within the hollow supports 210a and 210b. As best shown in FIG. 2B, two stabilizers 290a and 290b are attached to and extend downward from either hollow support 210a and 210b. The free ends of the stabilizers 290a and 290b terminate in feet configured to contact the fixed-wing aircraft 20 to help prevent the fixed-wing aircraft 20 from rotating about its roll axis relative to the multicopter 10. The feet are adjustable in length (e.g., are threaded such that they can be shortened by threading further into the stabilizers or lengthened by unthreading further out of the stabilizers).

As best shown in FIG. 3C, first and third isolator plate mounts 240a and 240c are attached (such as via lashing) to the hollow support 210a and second and fourth isolator plate mounts 240b and 240d are attached (such as via lashing) to the hollow support 210b radially-inward of the ends of the hollow supports 210a and 210b. Each isolator plate mount 240 includes a first isolator plate mounting post 242 defining a threaded fastener receiving opening at least partially therethrough and a second isolator plate mounting post 244 defining a threaded fastener receiving opening at least partially therethrough.

Figure 3E:
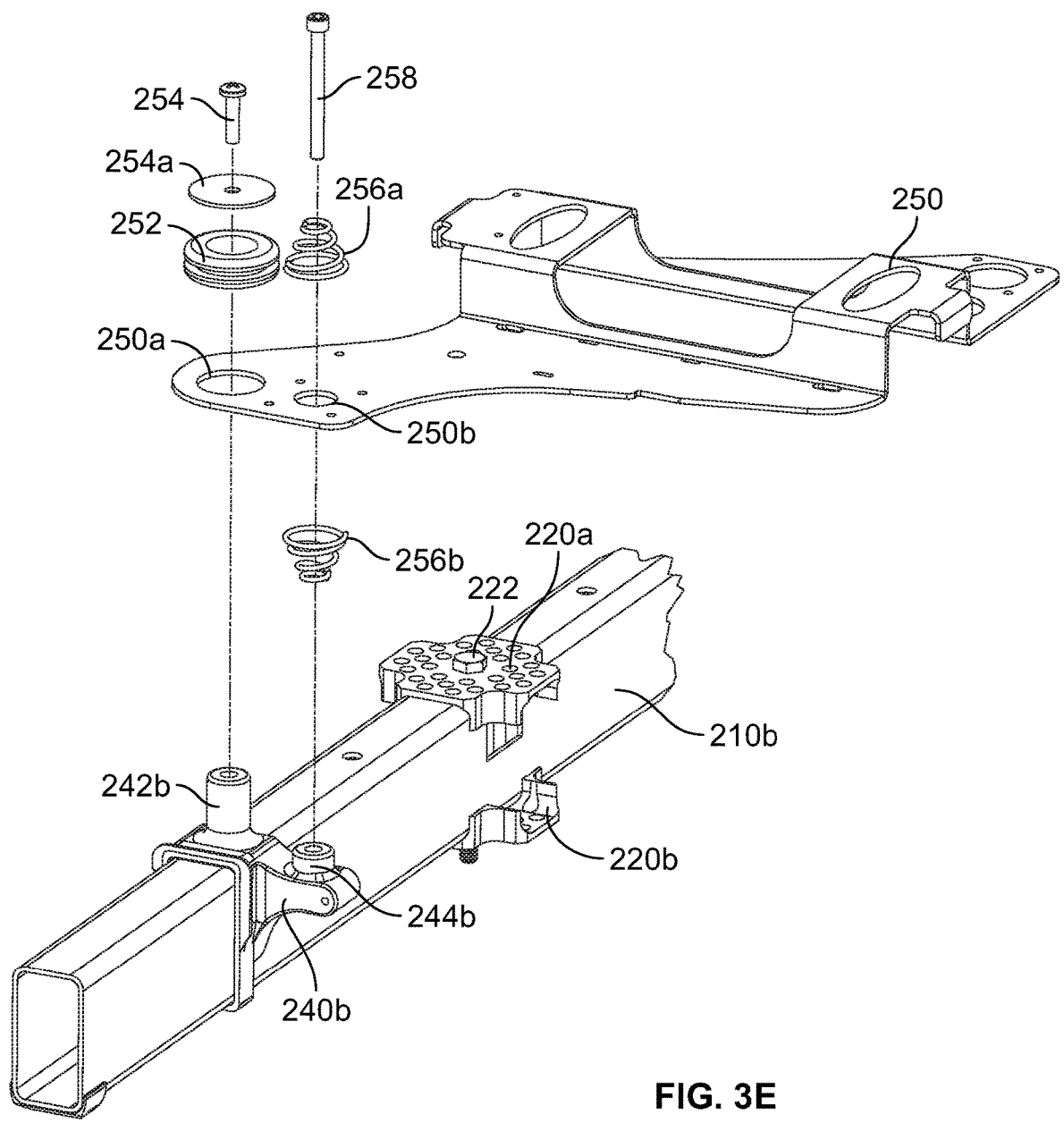
FIG. 3E is an exploded top perspective view of the isolator plate and associated mounting hardware of the hub base of FIG. 3A.
Figure 3F:
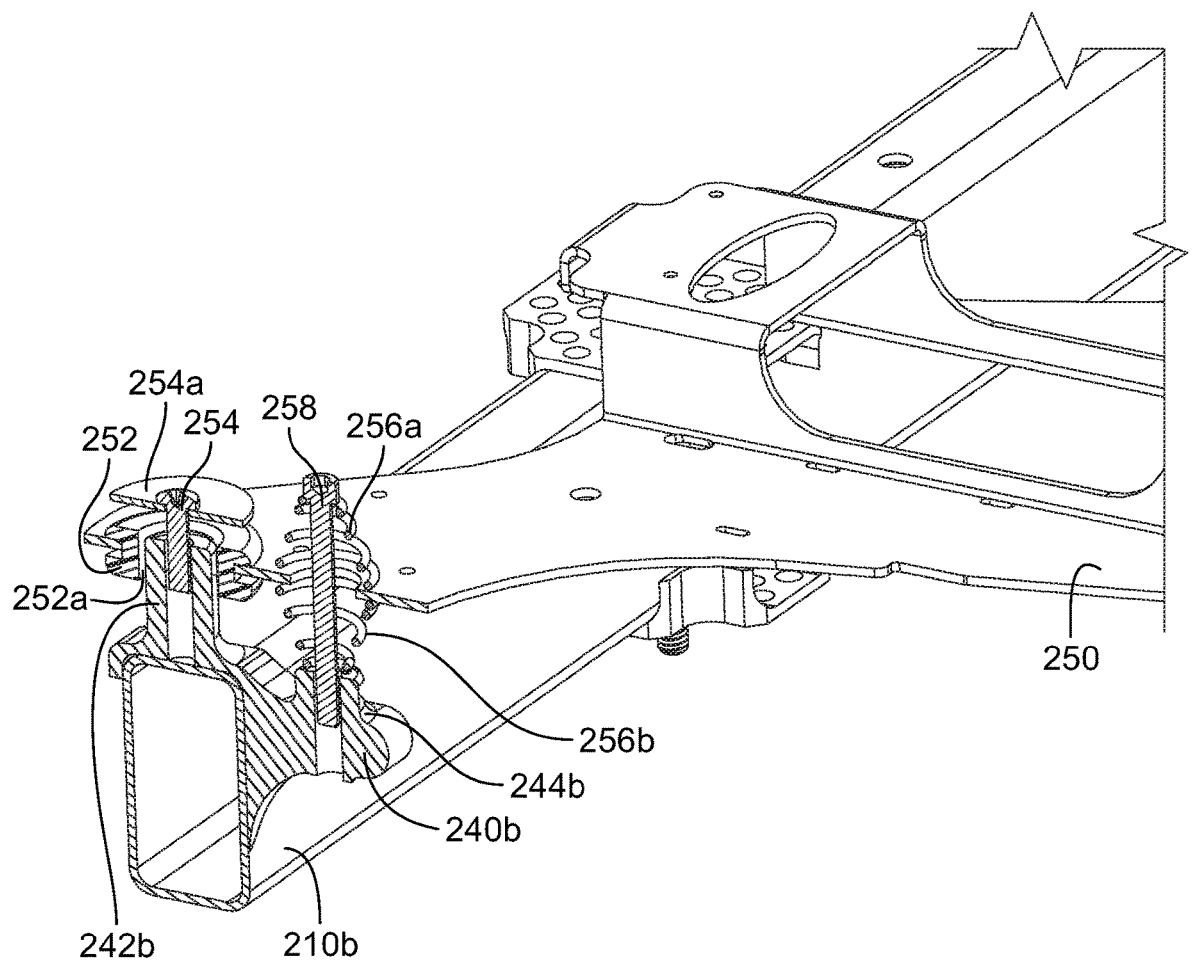
FIG. 3F is a partial cross-sectional view of one of the isolator plate mounts of the hub base of FIG. 3A taken substantially along line 3F-3F of FIG. 3C.

An isolator plate 250 is slidably mounted to the isolator plate mounts 240a, 240b, 240c, and 240d. FIGS. 3E and 3F show how the isolator plate 250 is mounted to the isolator plate mount 240b. For simplicity and brevity, illustrations of how the isolator plate 250 is mounted to the remaining three isolator plate mounts 240a, 240c, and 240d in a similar manner are not provided.

The isolator plate 250 defines first and second mounting openings 250a and 250b therethrough. An elastomeric grommet 252 is installed in the first mounting opening 250a of the isolator plate 250. The grommet 252 defines a first isolator plate mounting post receiving channel 252a therethrough, and the first isolator plate mounting post 242b is slidably received in the first isolator plate mounting post receiving channel 252a. A fastener 254 having a stop washer 254a beneath its head is partially threaded into the fastener receiving opening of the first isolator plate mounting post 242b. Upper and lower conical springs 256a and 256b— held in place by a fastener 258 partially threaded into the fastener receiving opening of the second isolator plate mounting post 244b—sandwich the isolator plate 250.

The hollow support 210b and the stop washer 254a constrain the vertical movement of the isolator plate 250. In other words, the isolator plate 250 can move vertically between a lower position in which the grommet 252 contacts the hollow support 210b and an upper position in which the grommet 252 contacts the stop washer 254a. The conical springs 256a and 256b act as a suspension that absorbs (or partially absorbs) vibrations of the hollow support 210b that would otherwise be directly transferred to the isolator plate 250, which could affect operation of certain components of the multicopter 10 (such as the controller 272).

The relatively high mass of the batteries 260a to 260d and the fact that they are mounted to the isolator plate 250 and close-coupled to the controller 272 and the IMU 277 to help prevent undesired vibration of the isolator plate 250 and therefore the controller 272 and the IMU 277. In certain embodiments, for the controller 272 to perform well, the IMU 277 must resolve accelerations on the order of 0.1 gee and rotations of 0.1 radians/second. In various embodiments, the controller 272 cannot do this reliably when (~10-gee) vibration, caused by rotor unbalance, for example, is transmitted from the airframe of the multicopter 10 to the IMU 277. When the mass of the batteries 260a to 260d is used to ballast the IMU 277 on the isolator plate 250, and the isolator plate 250 is anchored to the airframe structure through the suspension, the IMU 277 enjoys the vibration-free mounting location. By mounting the isolator plate 250 well-outboard at its corners, the IMU 277 remains sufficiently well-coupled to the airframe that pitch and roll movements are transmitted to the IMU 277, which is able to effectively resolve these motions.

As best shown in FIGS. 3A and 3B, The following components are mounted to the isolation plate 250: (1) the batteries 260a, 260b, 260c, and 260d (which are received in respective battery receivers (not labeled) configured to retain the batteries and to electrically connect the batteries (such as via suitable wiring electrically connectable to the batteries) to components of the multicopter to power those components); (2) the ESCs 265a to 265h; (3) an avionics enclosure 270 that houses a variety of components including the controller 272, the telemetry link 274, and the R/C receiver 276; (4) a GPS receiver mounting bracket 280 on which the GPS receiver 285 is mounted; (5) navigation lights (not shown); and (6) a Mode C transponder (not shown).

The four open ends of the hollow supports 210a and 210b form rotor arm module receiving sockets that can receive one of the rotor arm modules 400a to 400d. Specifically, the hollow support 210a forms a first rotor arm module receiving socket 214a and a third rotor arm module receiving socket (not shown) and the hollow support 210b forms a second rotor arm module receiving socket 214b and a fourth rotor arm module receiving socket (not shown).

As best shown in FIG. 3A, female blind mate assemblies 230 are attached to the ends of the hollow supports 210a and 210b. Specifically, a first female blind mate assembly 230a is attached to one end of the hollow support 210a near the first rotor arm module receiving socket 214a, a second female blind mate assembly 230b is attached to one end of the hollow support 210b near the second rotor arm module receiving socket 214b, a third female blind mate assembly 230c is attached to the other end of the hollow support 210a near the third rotor arm module receiving socket 214c, and a fourth female blind mate assembly 230d is attached to the other end of the hollow support 210b near the fourth rotor arm module receiving socket 214d.

The female blind mate assemblies 230 (along with the corresponding male blind mate connectors described below with respect to the rotor arm modules) facilitate: (1) mechanical attachment of the rotor arm modules 400a, 400b, 400c, and 400d to the hub module 100; (2) power flow from the battery(ies) 260a, 260b, 260c, and/or 260d to the rotor motors 465a to 465h of the rotor arm modules 400a, 400b, 400c, and 400d; and (3) communication between the ESCs 265a to 265h and the rotor motors 465a to 465h.

Figure 3G:
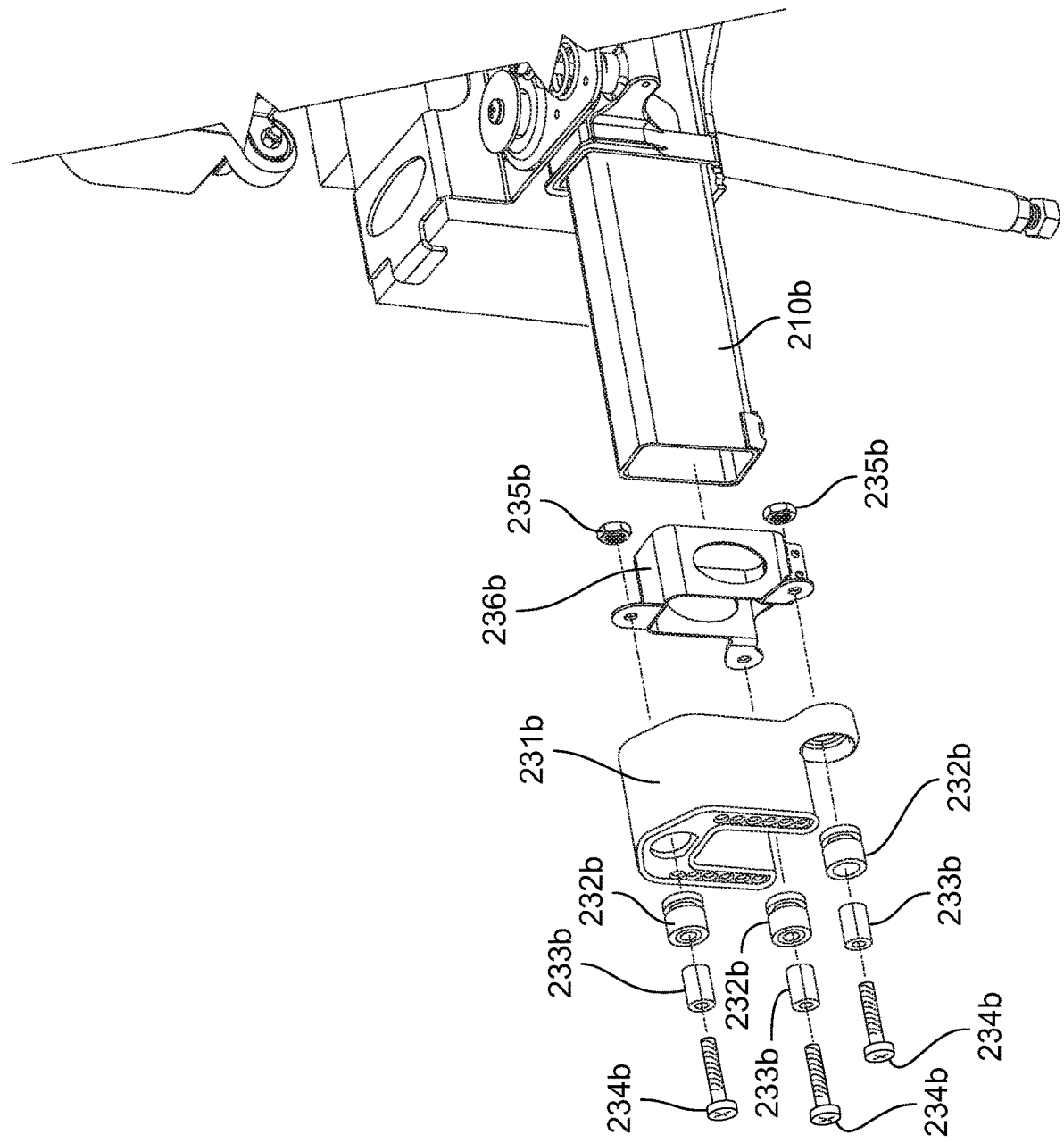
FIG. 3G is a partially exploded top perspective view of one of the female blind mate assemblies of the hub base of FIG. 3A.
Figure 3H:
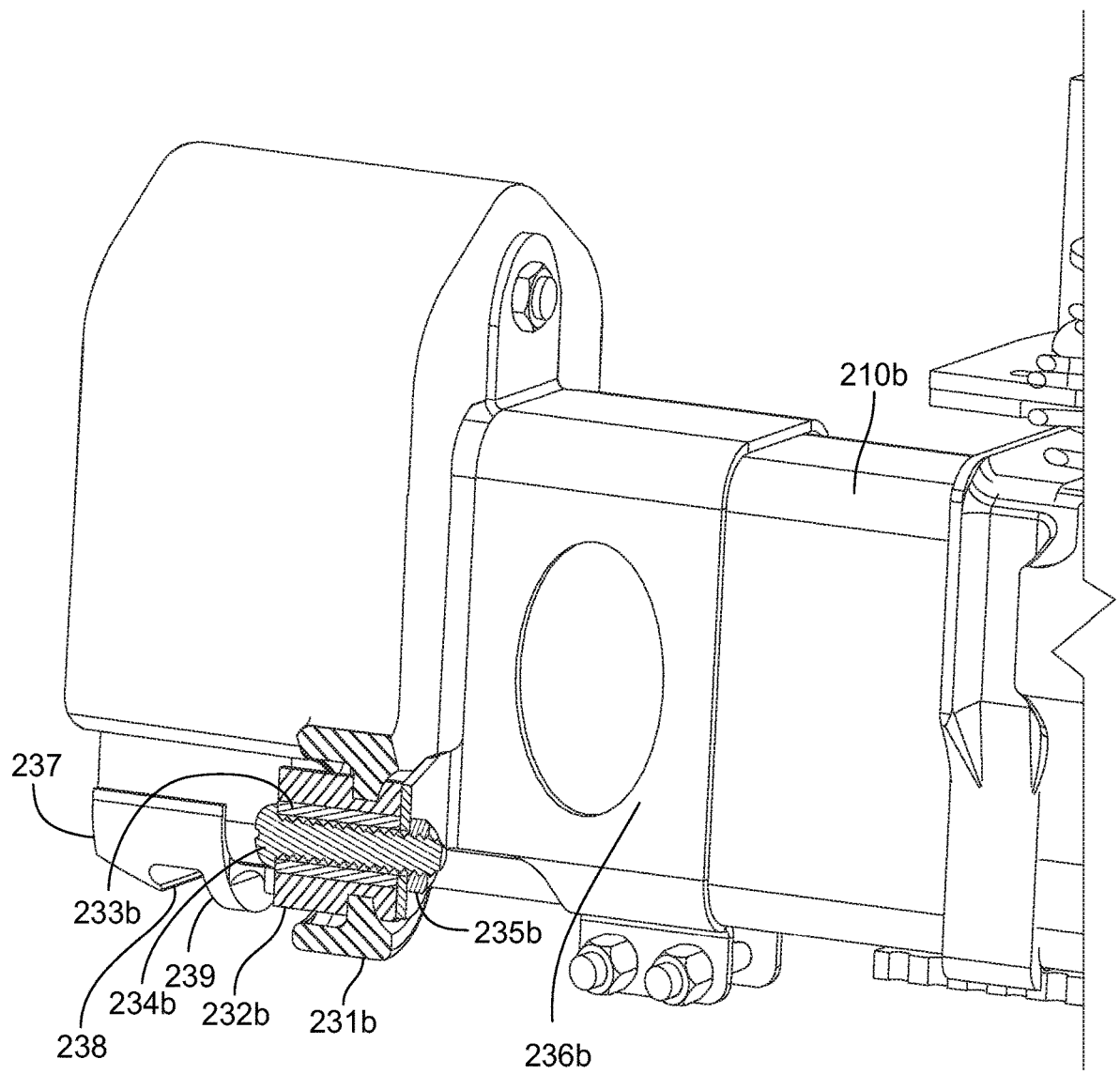
FIG. 3H is a partial cross-sectional view of one of the flexural mounts of the female blind mate assembly of FIG. 3G taken substantially along line 3H-3H of FIG. 3C.

FIGS. 3G and 3H show the second female blind mate assembly 230b. The female blind mate assemblies 230a, 230*c*, and 230*d* are similar to the second female blind mate assembly 230*b* and are not separately shown or described for brevity.

The second female blind mate assembly 230*b* includes: (1) a female blind mate connector 231*b* including a plurality of pin receptacles (not labeled); (2) three elastomeric grommets 232*b*; (3) three rigid, hollow cylindrical spacers 233*b*; (4) three fasteners 234*b*; (5) three nuts 235*b*; (6) a mounting bracket 236*b*; and (7) mounting bracket fasteners (not labeled).

Although not shown for clarity, the female blind mate connector 231*b* and, particularly, the pin receptacles, are electrically connected to the corresponding ESCs 265*c* and 265*d* via wiring. In this example embodiment, the female blind mate connector 231*b* includes 12 pin receptacles, six of which are connected to the ESC 265*c* via wiring and the other six of which are connected to the ESC 265*d* via wiring.

The mounting bracket 236*b* is positioned at a desired location along the hollow support 210*b*, and the mounting bracket fasteners are tightened to clamp the mounting bracket 236*b* in place relative to the hollow support 210*b*.

The female blind mate connector 231*b* is flexurally mounted to the mounting bracket 236*b* via the elastomeric grommets 232*b*, the spacers 233*b*, the fasteners 234*b*, and the nuts 235*b*. Specifically, the elastomeric grommets 232*b* are fitted into corresponding cavities in the female blind mate connector 231*b*. As best shown in FIG. 3H, each cavity includes an inwardly-projecting annular rib that fits into a corresponding annular cutout of the corresponding elastomeric grommet 232*b*. The spacers 233*b* are disposed within longitudinal bores defined through the elastomeric grommets 232*b*. The fasteners 234*b* extend through the hollow spacers 233*b* and through corresponding fastener receiving openings defined through the mounting bracket 236*b* into their corresponding nuts 235*b*. This secures the female blind mate connector 231*b* to the mounting bracket 236*b*.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached rotor arm module during flight. Because the female blind mate connector is not rigidly attached to the corresponding mounting bracket, it is less likely that the pins of the male blind mate connector (described below) received by the pin receptacles of the female blind mate connector will lose electrical contact—causing the multicopter 10 to lose control of at least one of its rotor motors—when loads are applied to the female blind mate connector.

As best shown in FIG. 3H, a latch plate 237 is attached to the underside of each hollow support 210*a* and 210*b* below each female blind mate connector 231 attached thereto. The latch plate 237 includes a claw engager 238 and a backstop 239. The latch plate 237 is described below with respect to the locking assemblies 420 of the rotor arm modules 400*a* to 400*d*.

In some embodiments, the hub module (either the hub base, the saddle, or both) or other elements of the multicopter include ballast to obtain a desired weight distribution and/or provide stability during flight.

1.1.2 Saddle

FIGS. 4A, 4B, 4C, 4D, 4E, 4F, 4G, 4H, 4I, and 4J show the saddle 300 or components thereof. The saddle 300 is the portion of the hub module 100: (1) to which the fixed-wing aircraft 20 is attached for launch; (2) from which the fixed-wing aircraft 20 is detached for launch; and (3) to which the flexible capture member 5000 is attached for retrieval of the fixed-wing aircraft 20. The saddle 300 also enables the operator to vary the pitch angle of the fixed-wing aircraft 20 relative to the multicopter 10.

Figure 4A:
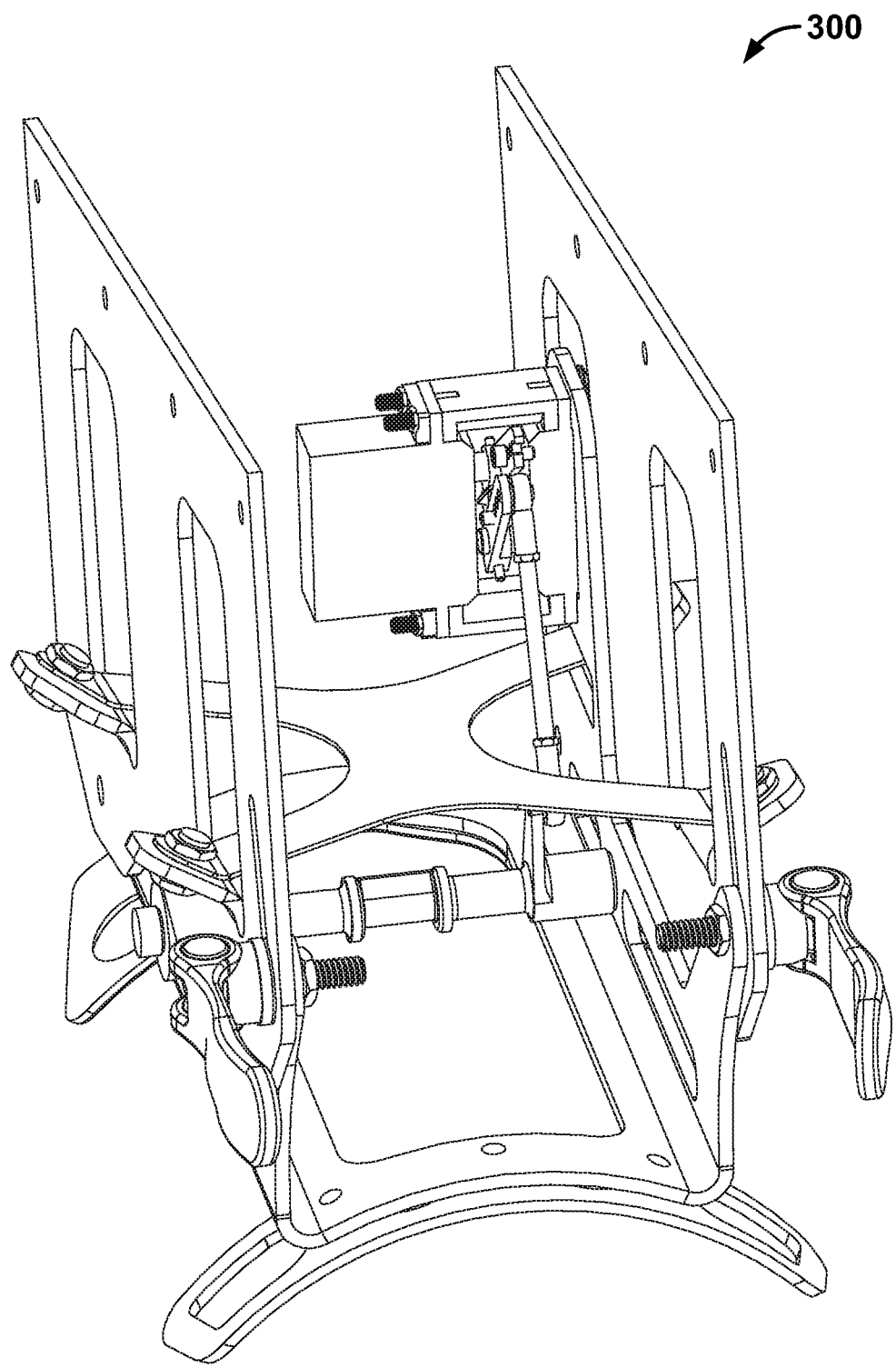
FIG. 4A is a top perspective view of the saddle of the hub module of FIG. 2A.
Figure 4B:
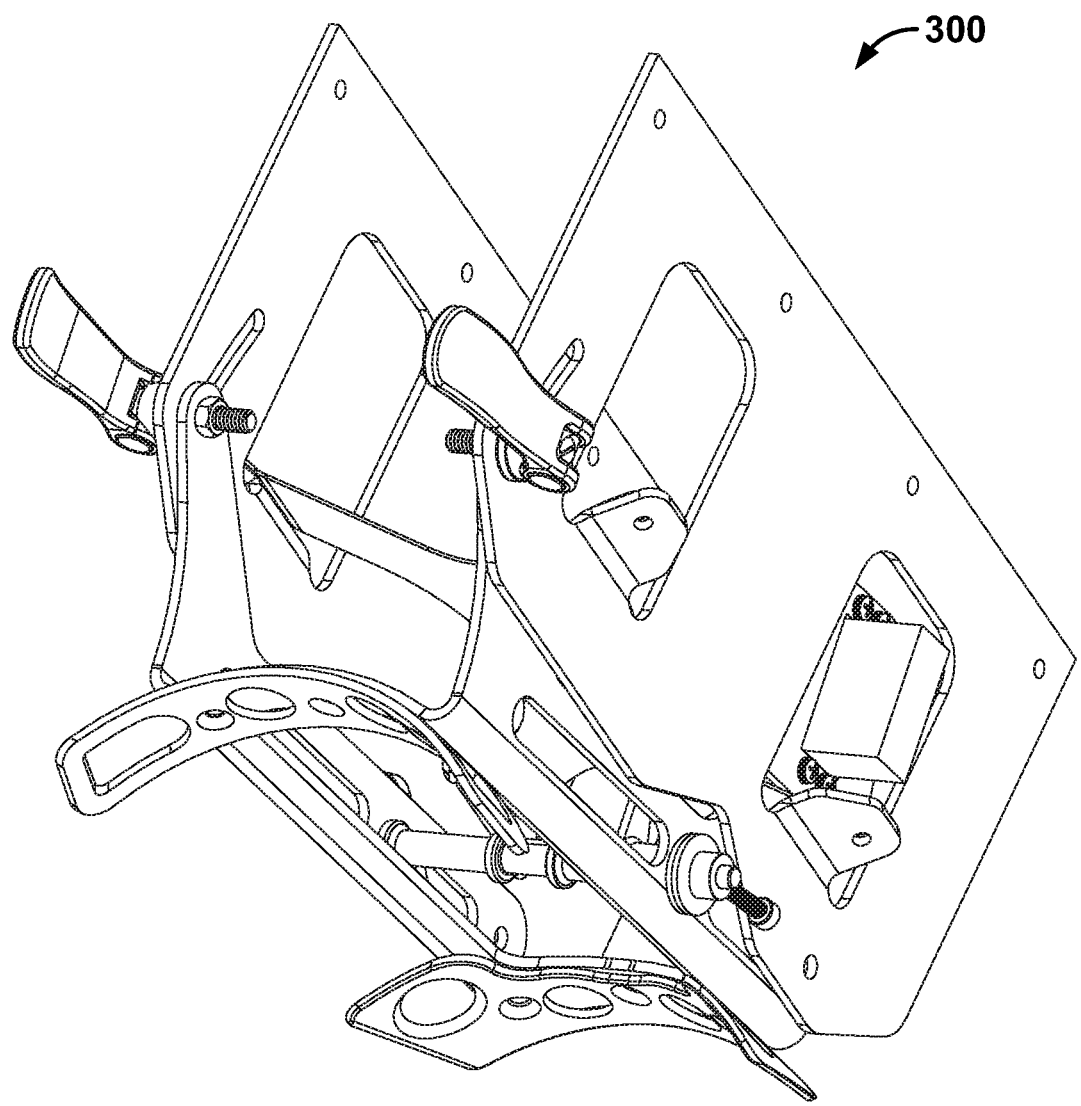
FIG. 4B is a bottom perspective view of the saddle of FIG. 4A.
Figure 4C:
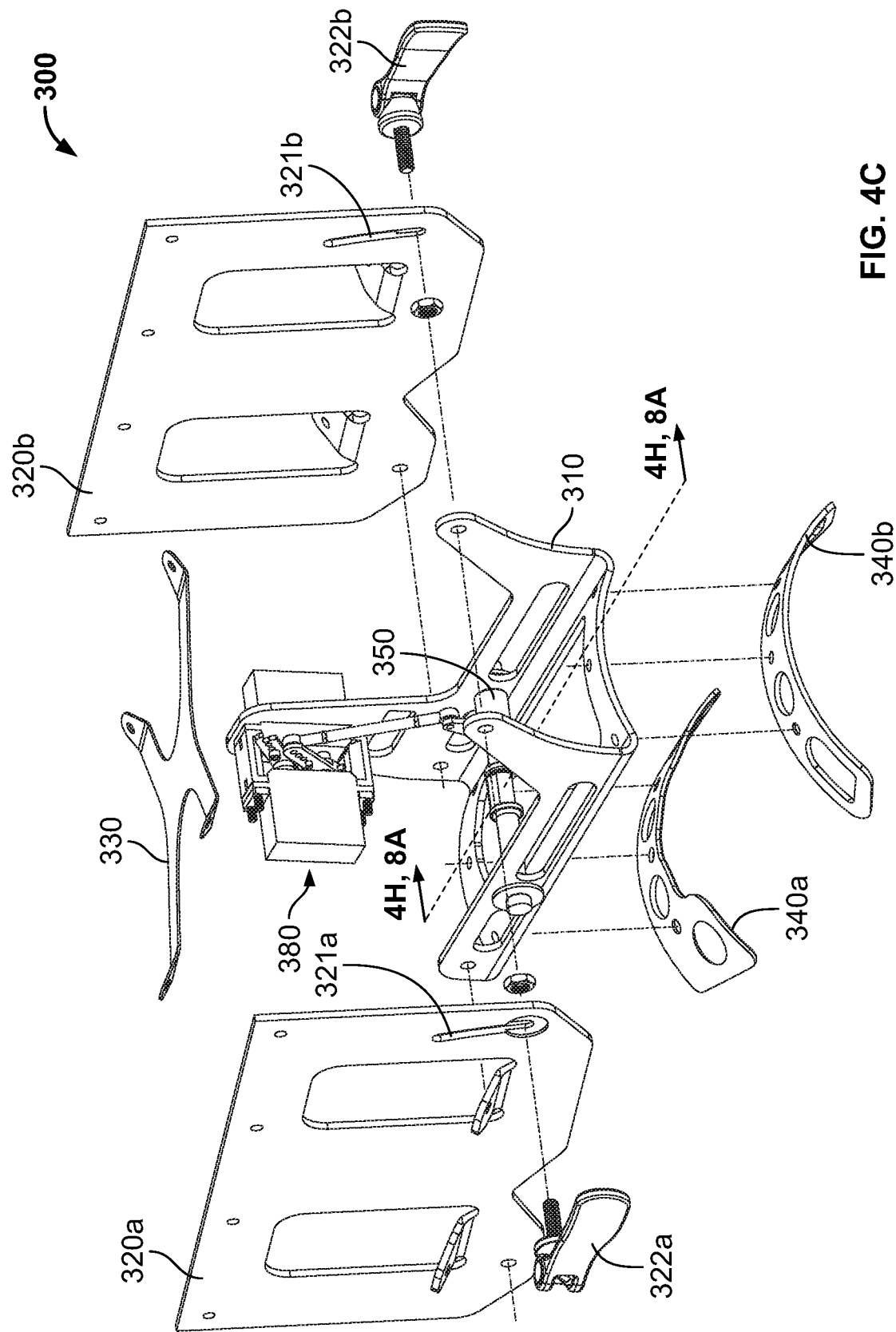
FIG. 4C is a partially exploded top perspective view of the saddle of FIG. 4A.

As best shown in FIG. 4C, the saddle 300 includes a saddle base bracket 310 and first and second saddle side plates 320*a* and 320*b*. The first and second saddle side plates 320*a* and 320*b* are pivotably connected to opposite sides of the saddle base bracket 310 near the front end of the saddle base bracket 310. The first and second saddle side plates 320*a* and 320*b* are also attached to opposite sides of the saddle base bracket 310 near the rear end of the saddle base bracket 310 via locking devices 322*a* and 322*b* (which are cam lever locks in this example embodiment but can be any suitable locking devices). The locking devices 322*a* and 322*b* extend through respective slots 321*a* and 322*b* defined through the respective first and second side plates 320*a* and 320*b*.

Figure 4D:
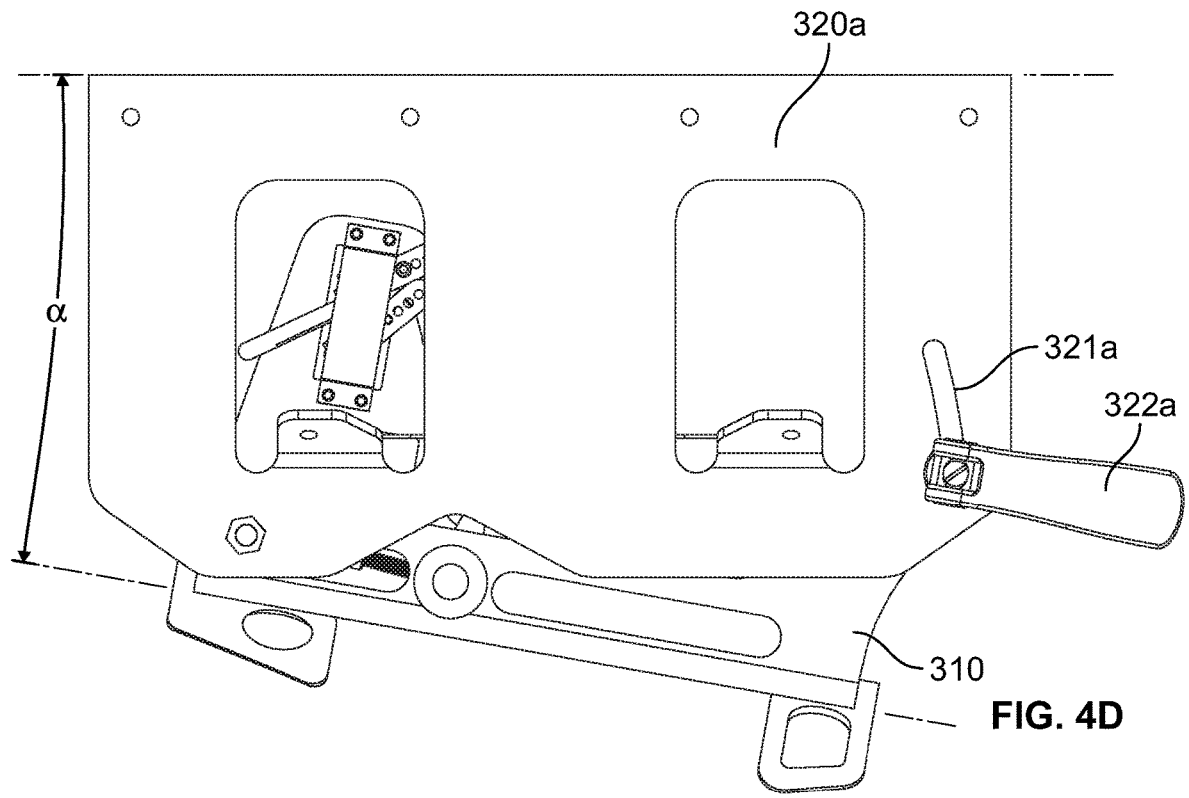
FIGS. 4D and 4E are side elevational views of the saddle of FIG. 4A showing different positions of the saddle.
Figure 4E:
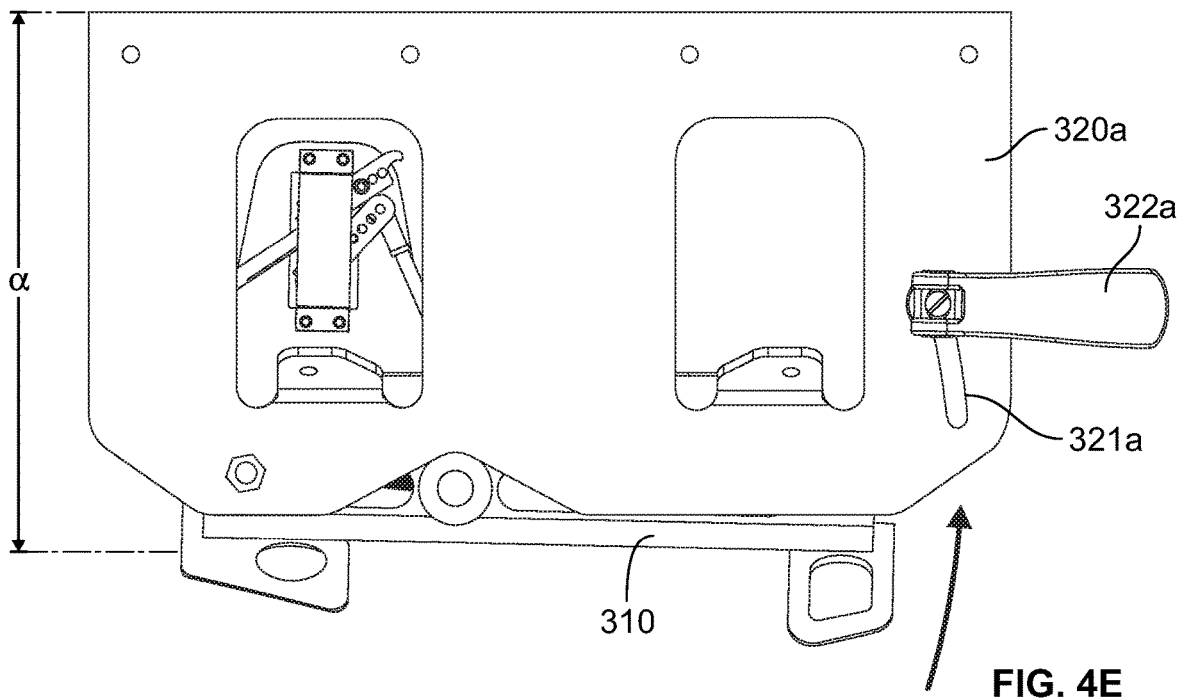

As shown in FIGS. 4D and 4E, the orientation of the slots 321*a* and 321*b* enables an operator to vary the angle α formed between a plane including the tops of the first and second saddle side plates 320*a* and 320*b*—to which the hub base 200 is attached—and a plane including the generally horizontally extending bottom portion of the saddle base plate 310. Plane as used herein can mean either a physical plane or a virtual reference plane. The angle α generally corresponds to the angle formed between the hub base plate 202 of the hub base 200 and the fuselage of the fixed-wing aircraft 20 when the fixed-wing aircraft 20 is attached to the saddle 300. To change the angle α, the operator unlocks the locking devices 322*a* and 322*b*, rotates the first and second side plates 320*a* and 320*b* relative to the saddle base bracket 310 around their pivotable attachments to the saddle base bracket 310 to the desired rotational position (or vice-versa), and re-locks the locking devices 322*a* and 322*b*. In this example embodiment, the angle α is variable from about 0 degrees to about 10 degrees, though in other embodiments the angle α is variable between any suitable angles.

In certain embodiments, an operator can cause the first and second side plates to rotate relative to the saddle while the multicopter 10 is flying. For instance, the operator may desire to release the fixed-wing aircraft nose-down from a hover. Conversely, the operator may desire to release the fixed-wing aircraft nose-up (such as nose-up about 10 degrees) to facilitate launch while the multicopter is dashing forward (this nose-up pitch reduces wind drag and better-aligns the thrust vector of the fixed-wing aircraft with the desired direction of travel). The multicopter may include any suitable combination of elements to facilitate this remote pivoting, such as various motors, actuators, and the like.

As best shown in FIGS. 4A, 4B, and 4C, a stabilizing bracket 330 is attached to the first and second saddle side plates 320*a* and 320*b* and extends across the space between the first and second saddle side plates 320*a* and 320*b*. A downwardly-curved front aircraft engaging bracket 340*a* is attached to the underside of the saddle base bracket 310 near the front of the saddle base bracket 310. A downwardly-curved rear aircraft engaging bracket 340*b* is attached to the underside of the saddle base bracket 310 near the rear of the saddle base bracket 310.

Figure 4F:
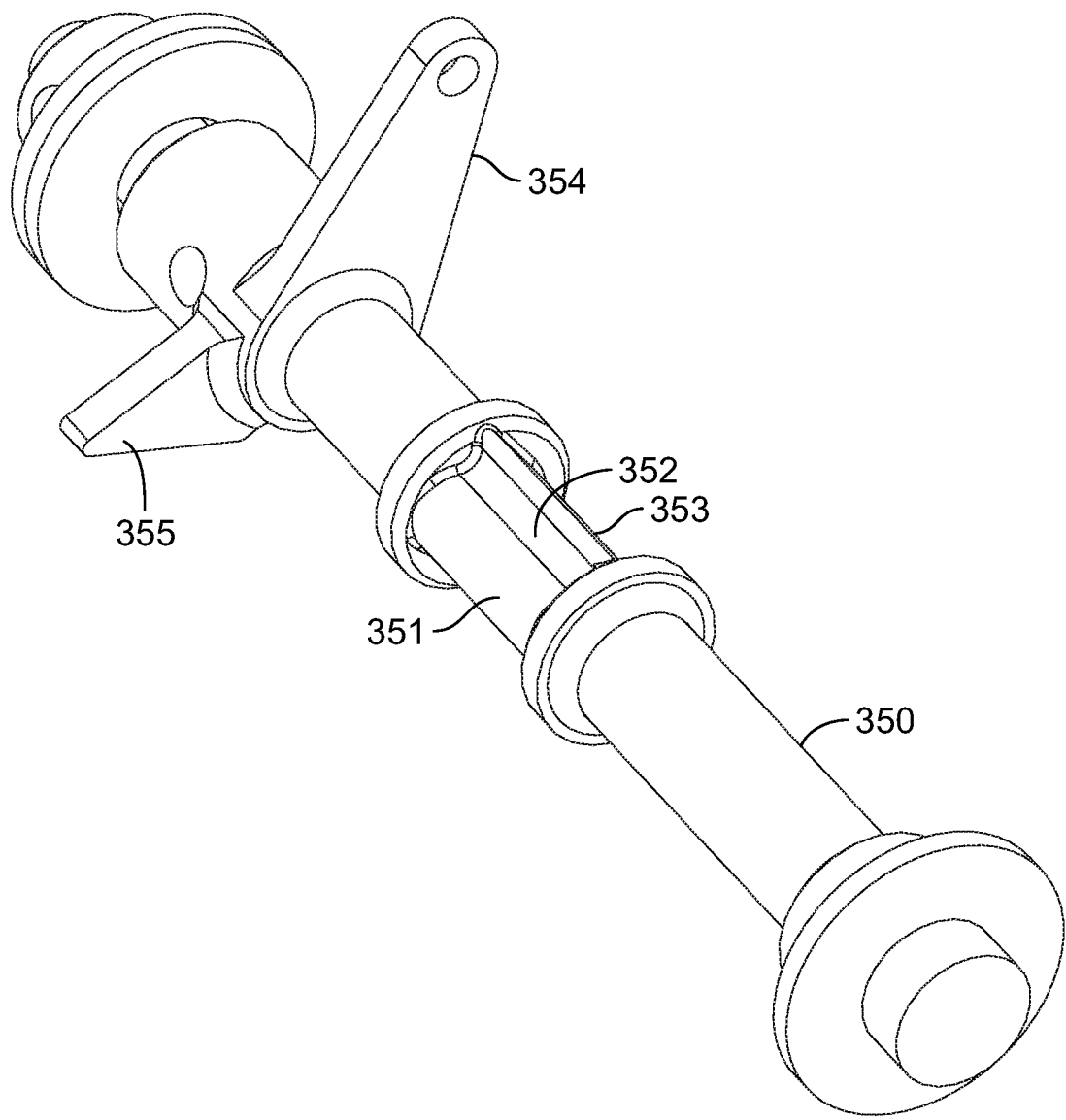
FIG. 4F is a top perspective view of the cam of the saddle of FIG. 4A.
Figure 4G:
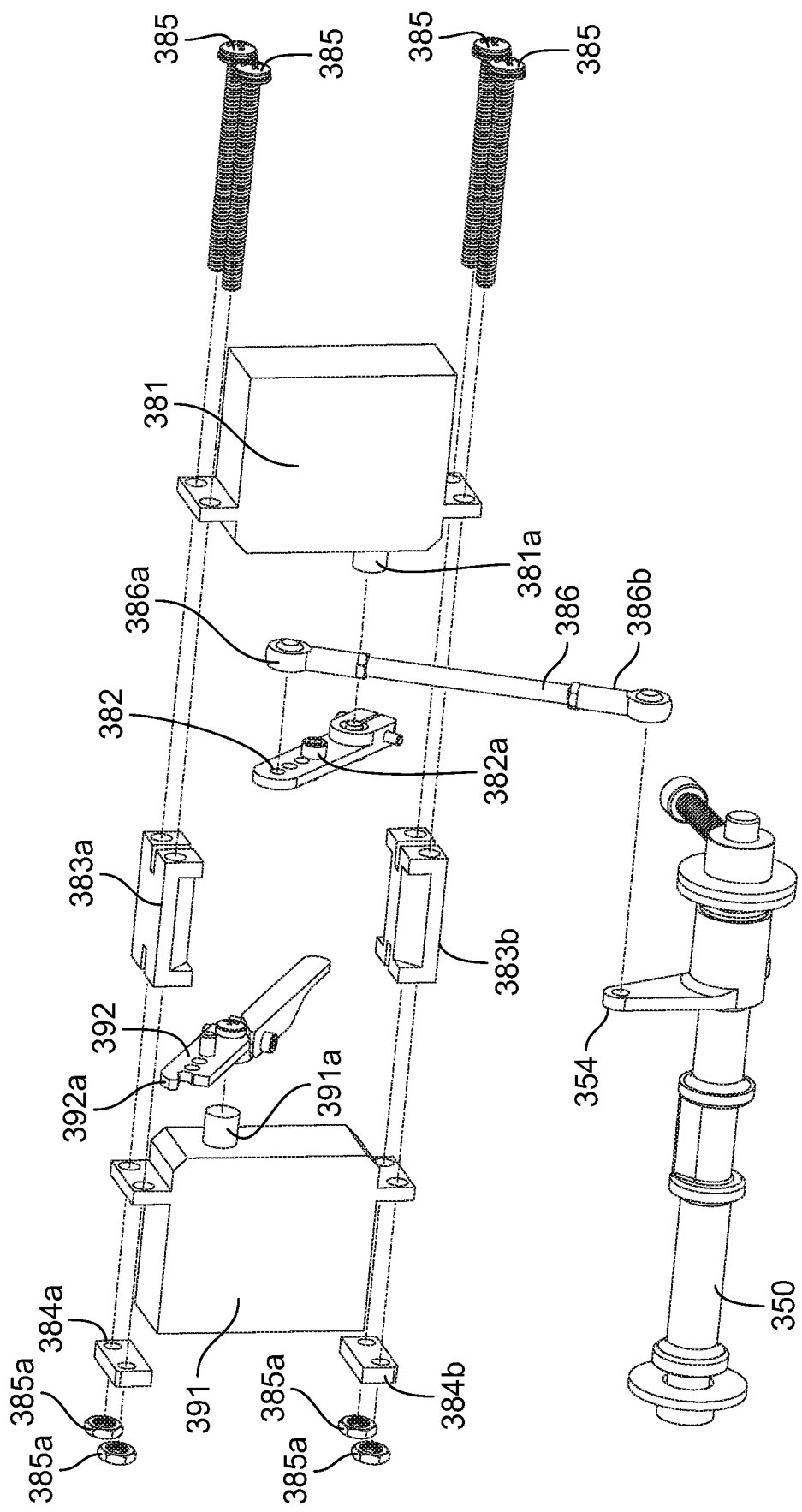
FIG. 4G is an exploded top perspective view of the aircraft attaching/detaching assembly and the cam of the saddle of FIG. 4A.
Figure 4H:
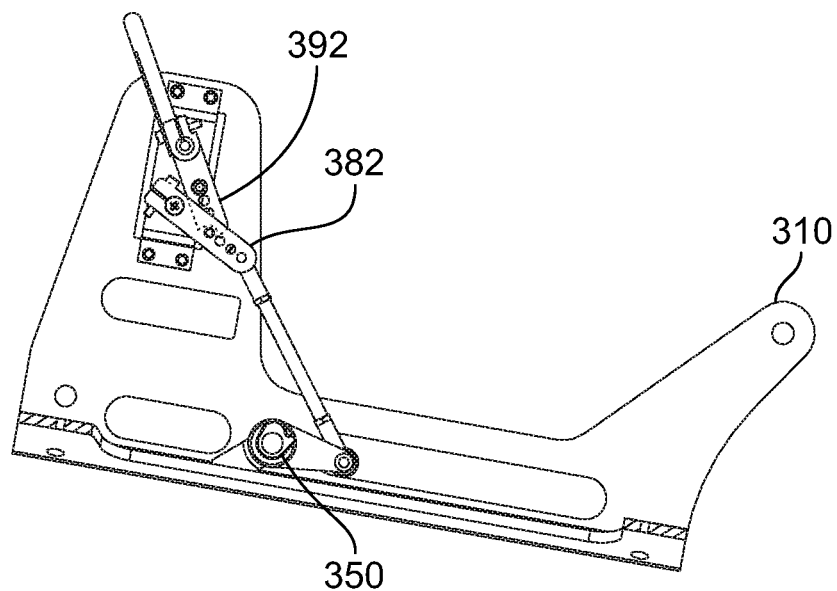
FIG. 4H is a partial cross-sectional view of the saddle of FIG. 4A taken substantially along line 4H-4H of FIG. 4C.
Figure 4I:
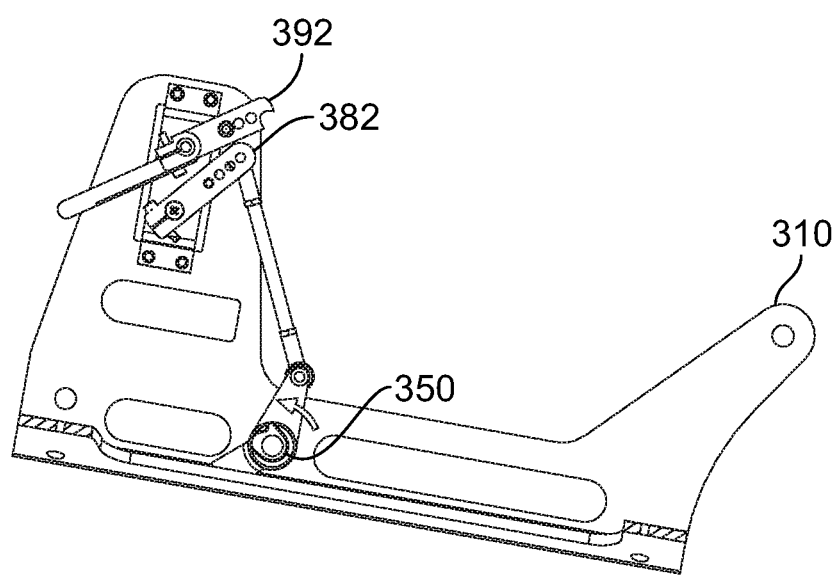
FIG. 4I is a partial cross-sectional view of the saddle of FIG. 4A showing the cam in a detached rotational position taken substantially along line 4H-4H of FIG. 4C.

As best shown in FIG. 4C, a cam 350 is rotatably attached to and extends across the width of the saddle base bracket 310 such that the cam 350 is transverse (such as generally perpendicular) to the first and second saddle side plates 320*a* and 320b. As best shown in FIGS. 4F, 4H, and 4I, the portion of the cam 350 near its longitudinal center has an irregularly-shaped profile including a first relatively wide ridge 351, a second relatively narrow ridge 353, and a valley 352 between the first and second ridges 351 and 353. This irregularly-shaped profile facilitates attaching the fixed-wing aircraft 20 to the cam 350 (and therefore to the multicopter 10) and detaching the fixed-wing aircraft 20 from the cam 350 (and therefore from the multicopter 10), as described below with respect to FIGS. 8A, 8B, and 8C. The cam 350 also includes a cam control arm 354 and a foot 355 extending transversely (such as generally perpendicularly) from the longitudinal axis of the cam 350.

An aircraft attaching/detaching assembly 380 attached to the saddle base bracket 310 controls rotation of the cam 350 relative to the saddle base bracket 310. As best shown in FIG. 4G, the aircraft attaching/detaching assembly 380 includes: (1) a cam servo motor 381 having a cam servo motor shaft 381a; (2) a cam servo motor arm 382; (3) a cam servo motor arm lock device 382a; (4) upper and lower servo spacers 383a and 383b; (5) upper and lower nut plates 384a and 384b; (6) fasteners 385; (7) a cam rotation control link 386 having connectors 386a and 386b at either end; (8) a lock servo motor 391 having a lock servo motor shaft 391a; and (9) a lock servo motor arm 392 terminating at one end in a lock servo motor locking extension 392a.

The cam servo motor 381 and the lock servo motor 391 are attached to one another and to the saddle base bracket 310 via the fasteners 385, the upper and lower servo spacers 383a and 383b, and the upper and lower nut plates 384a and 384b. The cam servo motor arm 382 is attached near one end to the cam servo motor shaft 381a and near the other end to the connector 386a. The connector 386b is attached to the cam control arm 354 of the cam 350, which links the cam servo motor shaft 381a to the cam 350. The cam servo motor arm lock device 382a is attached to the cam servo motor arm 382 between the connector 386a and the cam servo motor shaft 381a. The lock servo motor arm 392 is attached to the lock servo motor shaft 391a. The rearwardly-extending portion of the lock servo motor arm 392 terminates in the lock servo motor locking extension 392a, which is engageable to the cam servo motor arm lock device 382a in certain instances.

The cam servo motor 381 controls rotation of the cam 350 relative to the saddle base bracket 310. To rotate the cam 350, the cam servo motor 381 rotates the cam servo motor shaft 381a, which rotates the attached cam servo arm 382, which in turn rotates the cam 350 via the cam rotation control link 386. The cam servo motor 381 can rotate the cam 350 from an attached rotational position—shown in FIG. 4H—to a detached rotational position—shown in FIG. 4I (and vice-versa).

The lock servo motor 391 controls rotation of the lock servo motor arm 392 between a cam rotation-preventing rotational position—shown in FIG. 4H—and a cam rotation-enabling rotational position—shown in FIG. 4I (and vice-versa). When the cam 350 is in the attached rotational position and the lock servo motor arm 392 is in the cam rotation-preventing rotational position, the lock servo motor locking extension 392a engages the cam servo motor arm lock device 382a of the cam servo motor arm 382. This prevents the cam servo motor 381 from rotating the cam 350 from the attached rotational position to the detached rotational position.

FIGS. 4H and 4I show how the cam servo motor 381 and the lock servo motor 391 operate to rotate the cam 350 from the attached rotational position to the detached rotational position. Initially, the cam servo motor 381 is in the attached rotational position and the lock servo motor 391 is in the cam rotation-preventing rotational position. Here, the lock servo motor locking extension 392a on the end of the lock servo motor arm 392 engages the cam servo motor arm lock device 382a of the cam servo motor arm 382.

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint).

Rotating the cam 350 from the attached rotational position to the detached rotational position is a two-step process. The operator first operates the lock servo motor 391 to rotate the lock servo motor arm 392 into the cam rotation-enabling rotational position (counter-clockwise from this viewpoint). Second, the operator operates the cam servo motor 381 to rotate the cam 350 from the attached rotational position to the detached rotational position (counter-clockwise from this viewpoint).

Figure 8A:
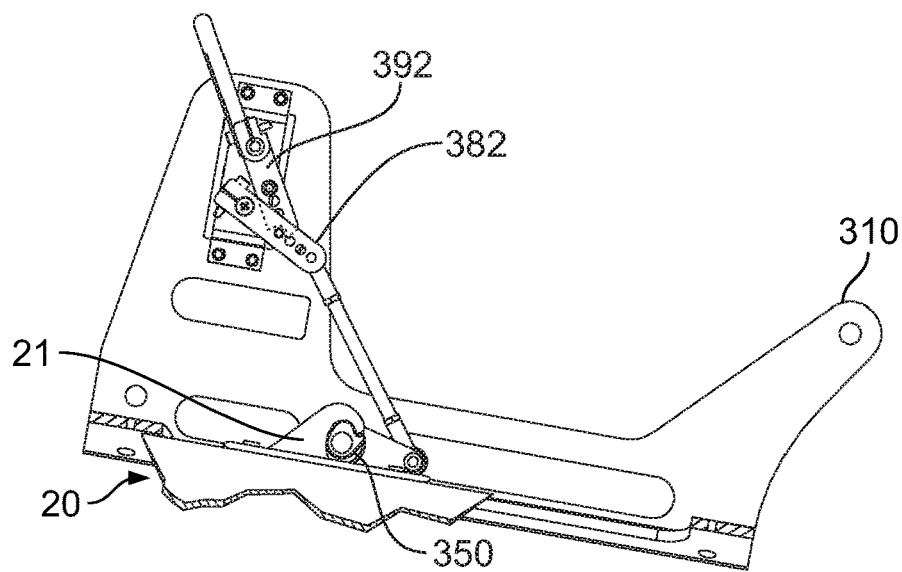
FIG. 8A is a partial cross-sectional view of the saddle of FIG. 4A showing the cam in an attached rotational position and a hook of the fixed-wing aircraft attached taken substantially along line 8A-8A of FIG. 4C.
Figure 8B:
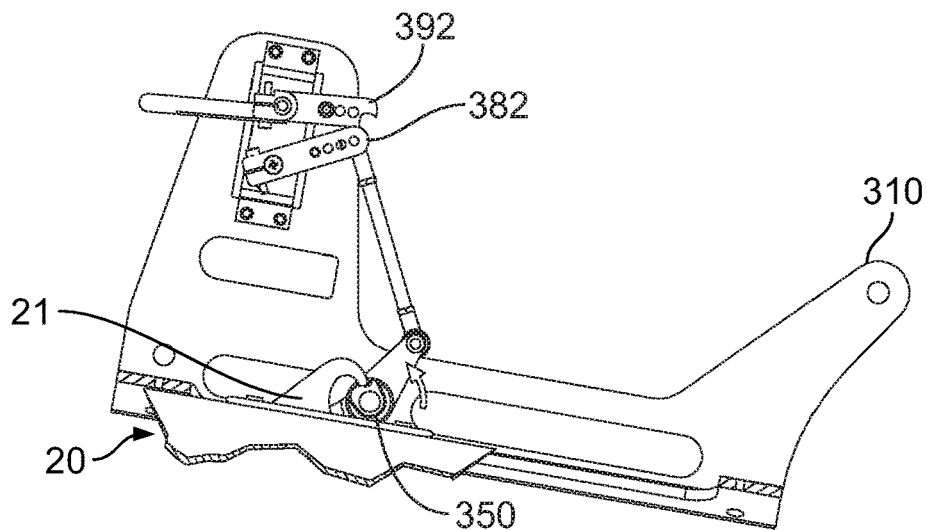
FIG. 8B is a partial cross-sectional view of the saddle of FIG. 4A showing the cam halfway between the attached rotational position and the detached rotational position and the hook of the fixed-wing aircraft being pushed off of the cam taken substantially along line 8A-8A of FIG. 4C.
Figure 8C:
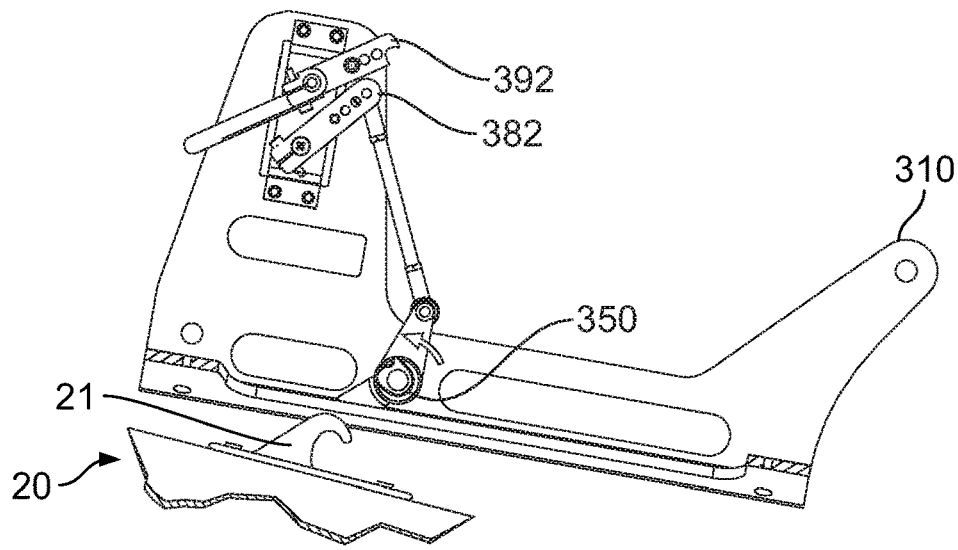
FIG. 8C is a partial cross-sectional view of the saddle of FIG. 4A showing the cam in the detached rotational position and the hook of the fixed-wing aircraft detached from the cam taken substantially along line 8A-8A of FIG. 4C.

FIGS. 8A to 8C, described below, show how rotation of the cam from the attached rotational position to the detached rotational position causes the fixed-wing aircraft to detach from the cam.

The foot 355 controls the extent to which the cam 350 can rotate. The foot 355 is oriented such that when the cam 350 rotates a certain amount in a first direction relative to the saddle base bracket 310, the foot 355 contacts the saddle base bracket 310 and prevents the cam 350 from rotating any further in that first direction. Similarly, when the cam 350 rotates a particular amount in a second opposite direction relative to the saddle base bracket 310, the foot 355 contacts the saddle base bracket 310 and prevents the cam 350 from rotating any further in that second direction. The foot 355 is angled to stop the cam 350 from rotating before it exerts an undue force on the cam rotation control link 386, and by extension the cam motor arm 382 and the cam motor shaft 381a.

1.2 Rotor Arm Modules

The rotor arm modules 400a to 400d are mechanically attachable to and mechanically lockable to the hub module 200 and include: (1) the eight rotors of the multicopter 10; (2) the eight rotor motors that drive these rotors; (3) gear reduction trains that couple the rotor motors to their corresponding rotors; and (4) locking assemblies that lock the rotor arm modules 400a to 400d to the hub module 100.

FIGS. 5A, 5B, 5C, 5D, 5E, 5F, 5G, 5H, 5I, and 5J show the first rotor arm module 400a or components thereof. The other rotor arm modules 400b, 400c, and 400d are similar to the first rotor arm module 400a and are not separately shown or described for brevity.

As best shown in FIGS. 5A, 5B, 5H, and 5J, the first rotor arm module 400a includes: (1) a generally rectangular hollow elongated rotor arm 410a; (2) a generally rectangular hollow rotor arm extension 410b; (3) a locking assembly 420; (4) a male blind mate connector 431; (5) upper and lower rotor motor assemblies 460a and 460b; and (6) a rotor assembly 470.

The rotor arm extension 410b is attached to the rotor arm 410a such that part of the rotor arm extension 410b is disposed within the rotor arm 410a and the remainder of the rotor arm extension 410b extends from the rotor arm 410a. The locking assembly 420 is attached to the underside of the rotor arm 410a near the end of the rotor arm 410a from which the rotor arm extension 410b extends. The male blind mate connector 431 is attached to the end of the rotor arm 410a from which the rotor arm extension 410b extends. The upper and lower rotor motor assemblies 460a and 460b and the rotor assembly 470 are attached to the rotor arm 410a in a manner described in detail below.

Although not shown, the open end of the rotor arm 410a opposite the end from which the rotor arm extension 410b extends forms a first front landing gear extension module receiving socket that can receive the first front landing gear extension module 500a, as described below.

As best shown in FIGS. 5A, 5B, 5C, 5D, 5E, and 5F, the male blind mate connector 431—along with its counterpart female blind mate connector 231a of the hub module 100—facilitate: (1) mechanical attachment of the first rotor arm module 400a to the hub module 100; (2) electrical power flow from the battery(ies) 260a, 260b, 260c, and/or 260d to the upper and lower rotor motors 465a and 465b of the first rotor arm module 400a; and (3) communication between the ESCs 265a and 265b their corresponding upper and lower rotor motors 465a and 465b.

The male blind mate connector 431 includes a plurality of pins 431a configured to mate with the pin receptacles of the female blind mate connector 231a. Although not shown for clarity, the male blind mate connector 431 and, particularly, the pins 431a, are electrically connected to the corresponding upper and lower rotor motors 465a and 465b via wiring. In this example embodiment, the male blind mate connector 431 includes 12 pins 431a, six of which are electrically connected to the upper rotor motor 465a via wiring and the other six of which are electrically connected to the lower rotor motor 465b via wiring. In this example embodiment, each motor only requires three motor leads to properly function, but the multicopter 10 includes two motor leads for each motor pole. By using two motor leads per motor pole, the multicopter 10 eliminates single-point failures (i.e., both leads would have to fail rather than just a single lead for the motor to fail).

To attach the rotor arm module 400a to the hub module 100, an operator inserts the rotor arm extension 410b into the first rotor arm module receiving socket 214 of the hub module 100 and slides the rotor arm module 400a toward the hub module 100 with enough force to mate the pins of the male blind mate connector 431 with the pin receptacles of the female blind mate connector 231a of the hub module 100.

In an alternative embodiment, rather than the hub module slidably receiving a portion of the rotor arm module to attach the rotor arm module to the hub module, the rotor arm module slidably receives a component (such as an arm) of the hub module to attach the rotor arm module to the hub module.

As best shown in FIGS. 5C, 5D, 5E, and 5F, the locking assembly 420 includes a drawcatch 420a and a drawcatch lock 420b that: (1) facilitate attaching the first rotor arm module 400a to the hub module 100; (2) lock the first rotor arm module 400a to the hub module 100; and (3) facilitate detachment of the first rotor arm module 400a from the hub module 100.

Figure 5A:
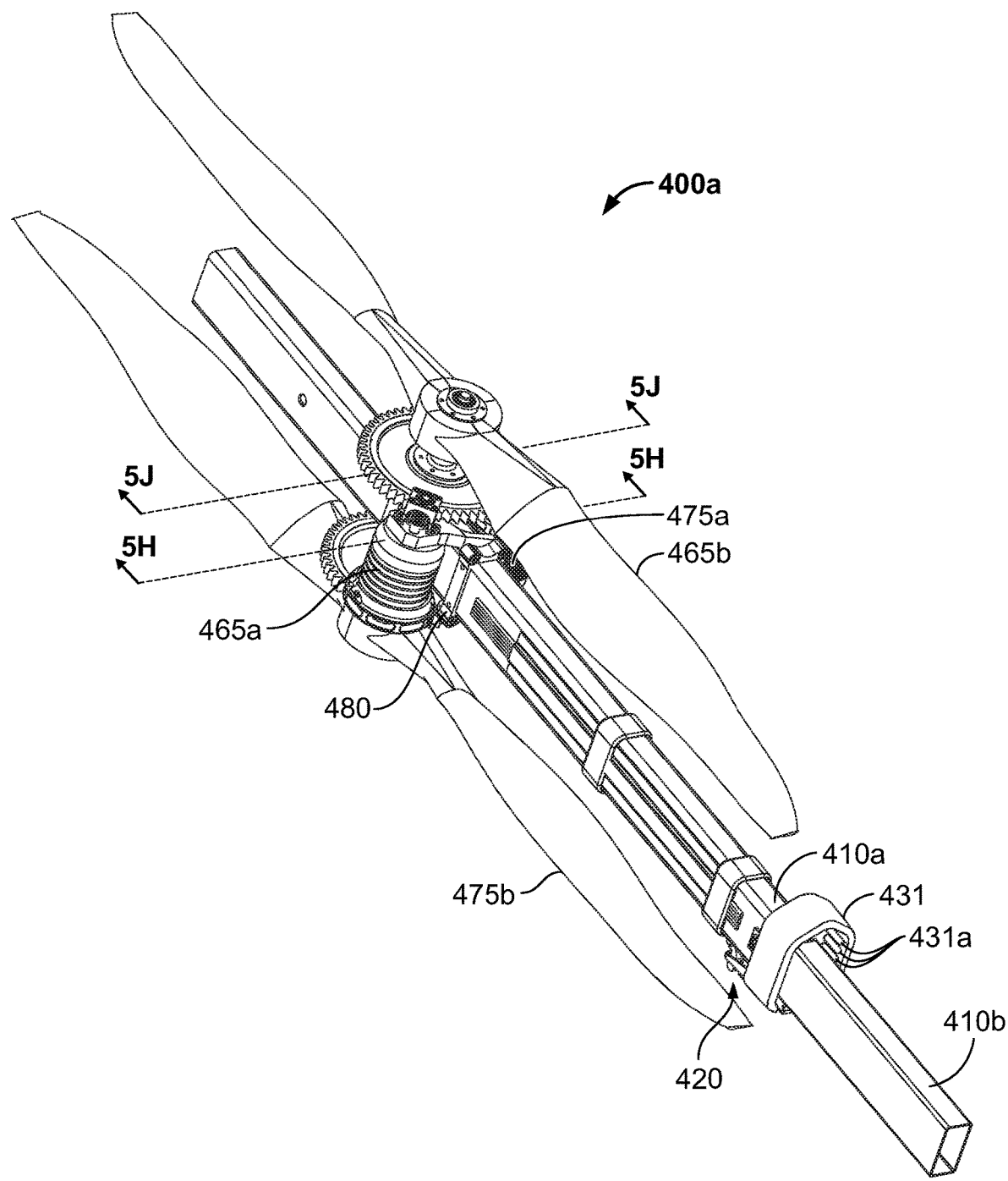
FIG. 5A is a top perspective view of one of the rotor arm modules of the multicopter of FIG. 1A.
Figure 5B:
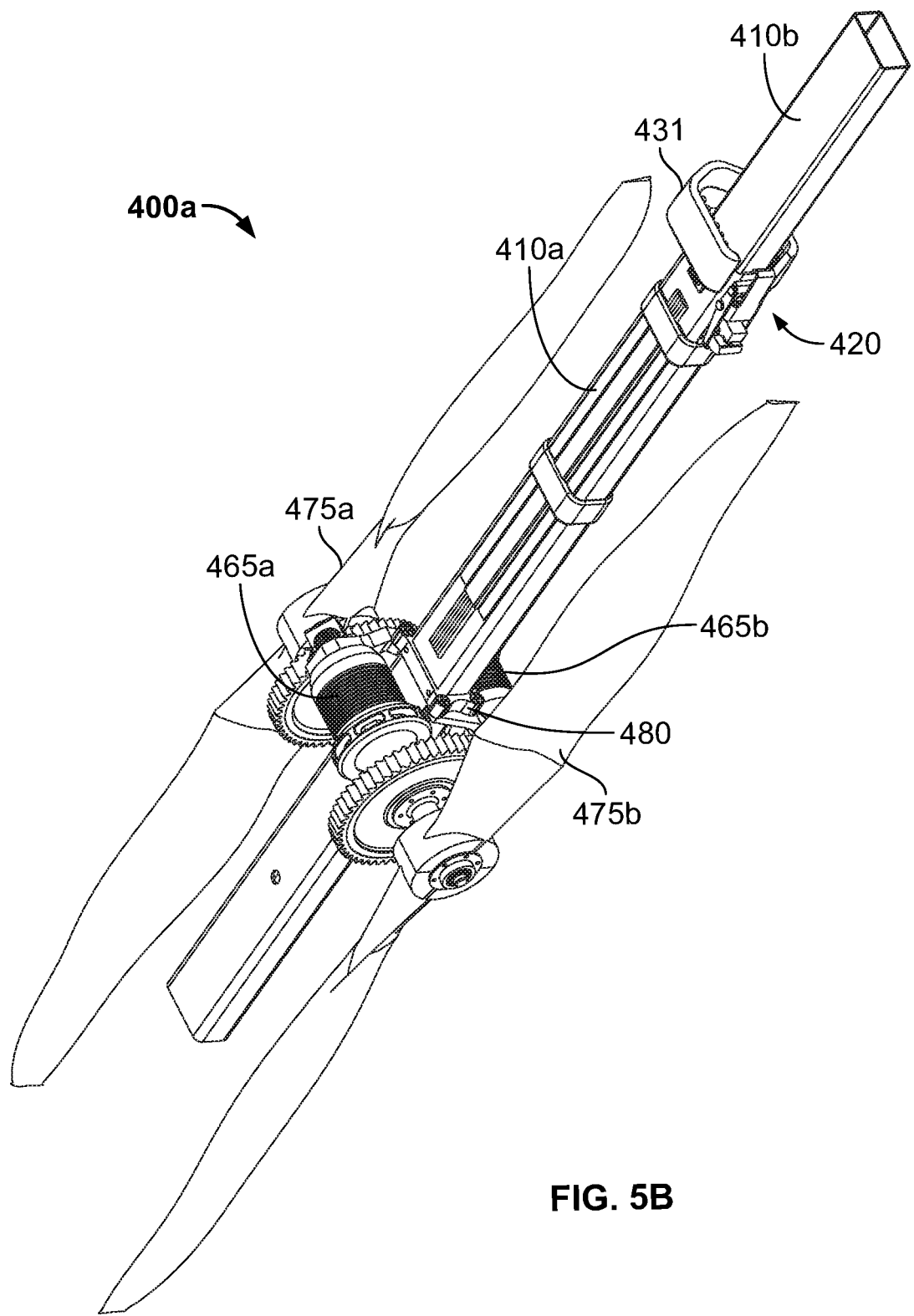
FIG. 5B is a bottom perspective view of the rotor arm module of FIG. 5A.
Figure 5C:
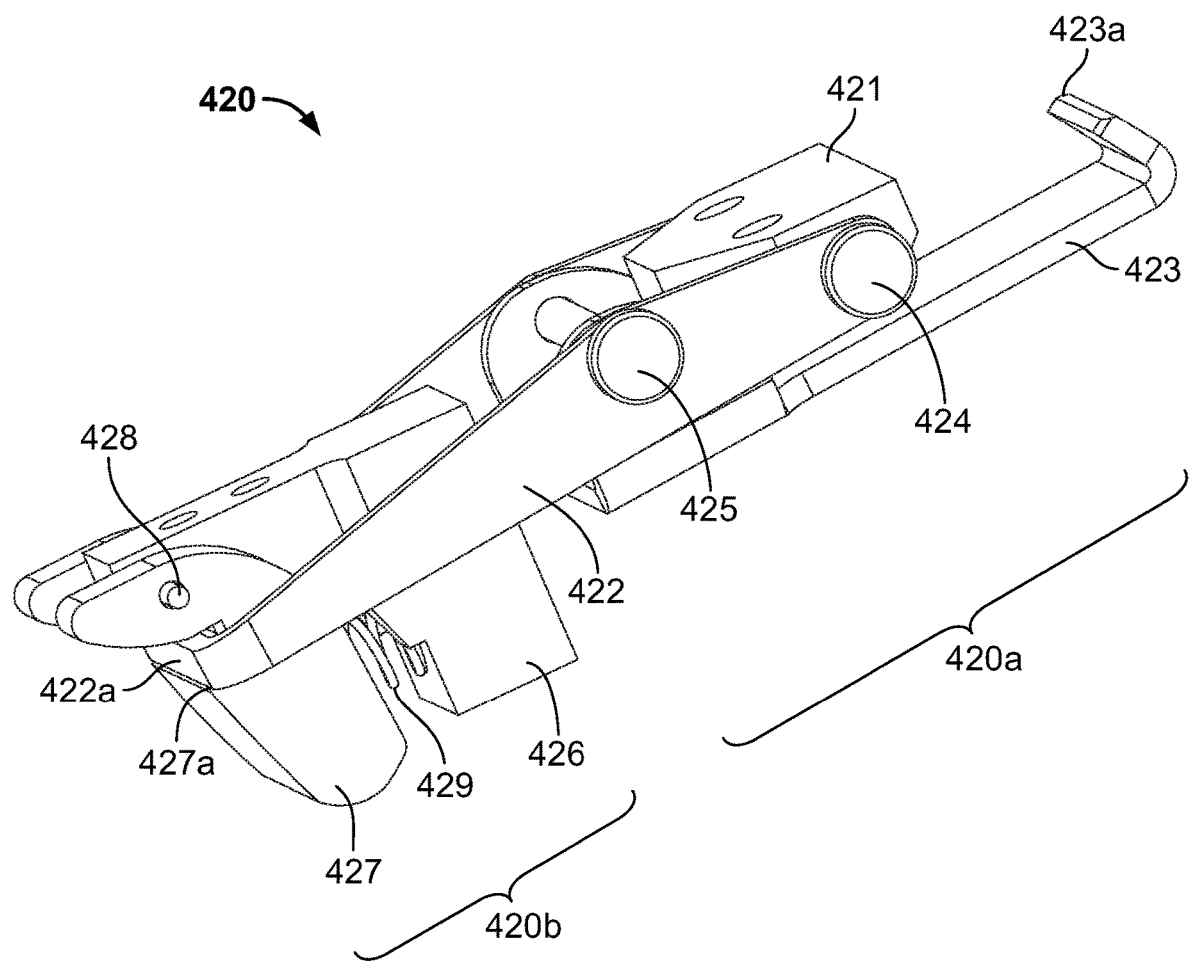
FIG. 5C is a top perspective view of the locking assembly of the rotor arm module of FIG. 5A.

As best shown in FIG. 5C, the drawcatch 420a includes: (1) a base 421; (2) a lever 422; (3) a claw 423; (4) a first fastener 424 (such as a clevis pin or other suitable fastener); and (5) a second fastener 425 (such as a clevis pin or other suitable fastener).

The drawcatch lock 420b includes: (1) a base 426; (2) a lock/release device 427 having a locking shelf 427a; (3) a pin 428 (or other suitable connector); and (4) a compression spring 429 (or other suitable biasing element).

The base 421 is attached to the underside of the rotor arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the rotor arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first rotor arm module 400a and the hub module 100 are locked together.

In addition to using the locking assembly 420 to lock the first rotor arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first rotor arm module 400a and the hub module 100 toward one another and cause the male blind mate connector 431 to mate with the female blind mate connector 231a.

Figure 5D:
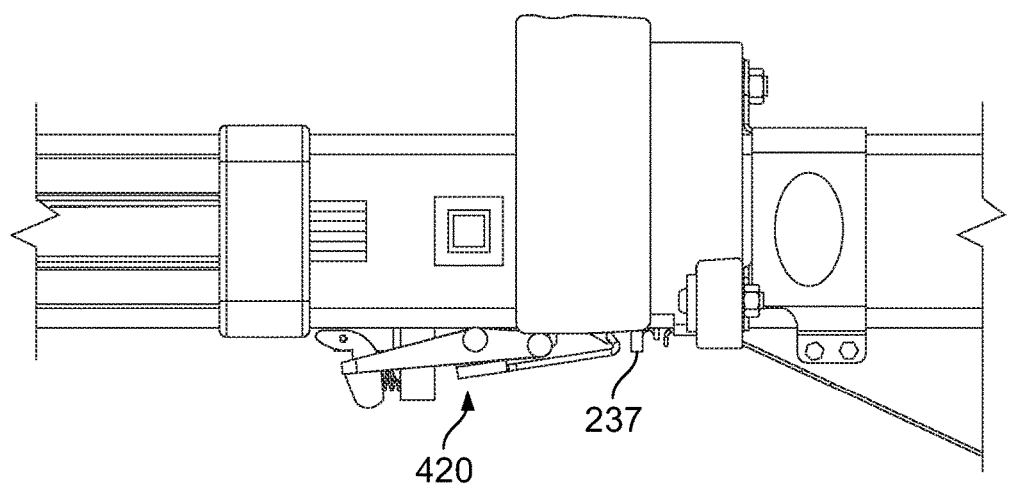
FIGS. 5D, 5E, and 5F are side elevational views of the rotor arm module of FIG. 5A detaching from the hub module of FIG. 2A via the locking assembly of FIG. 5C.
Figure 5E:
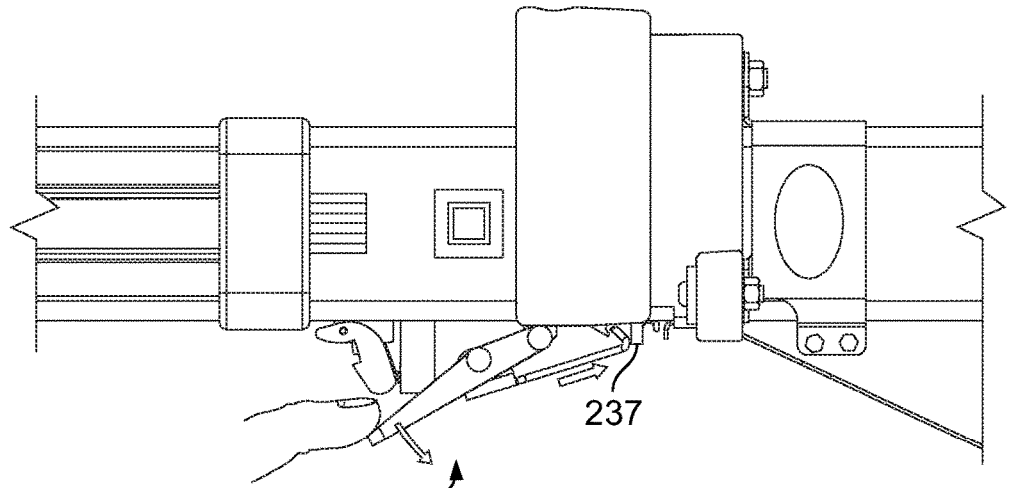
Figure 5F:
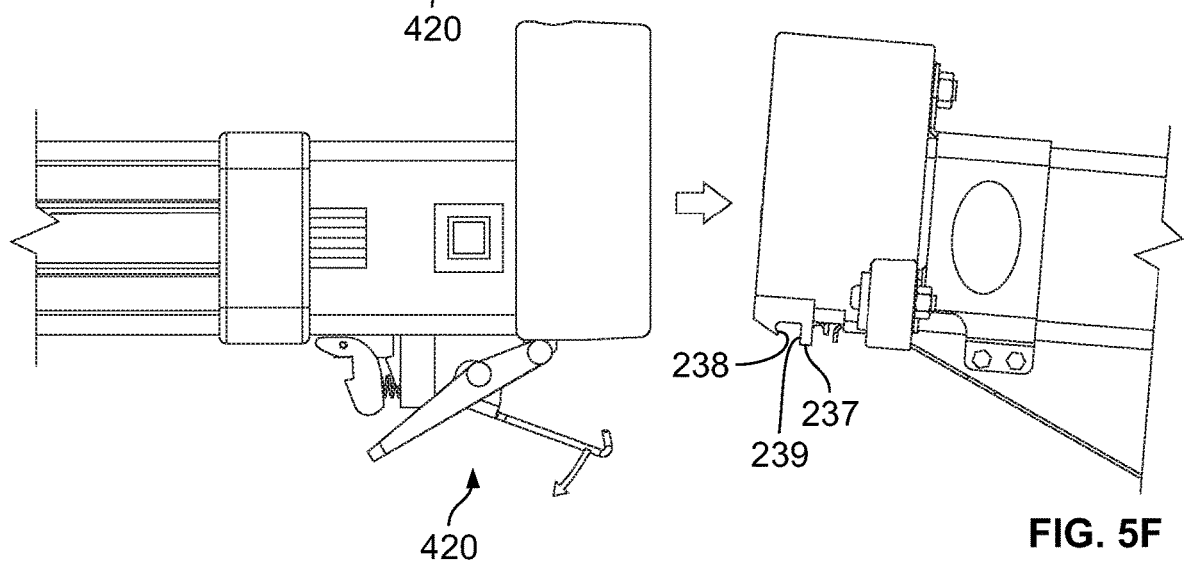

As shown in FIGS. 5D to 5F, the operator reverses this process to unlock the first rotor arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first rotor arm module 400a and the hub module 100 apart to separate the male and female blind mate connectors 431 and 231a or use the locking assembly 420 to aid in detachment. When using the locking assembly 420 to aid in detachment, as shown in FIG. 5E, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first rotor arm module 400a and the hub module 100 apart, as shown in FIG. 5F.

Turning to the upper and lower rotor motor assemblies 460a and 460b and the rotor assembly 470a, the upper and lower rotor motors 465a and 465b of the upper and lower motor assemblies independently drive respective upper and lower rotors 475a and 475b via separate gear reduction trains.

Figure 5G:
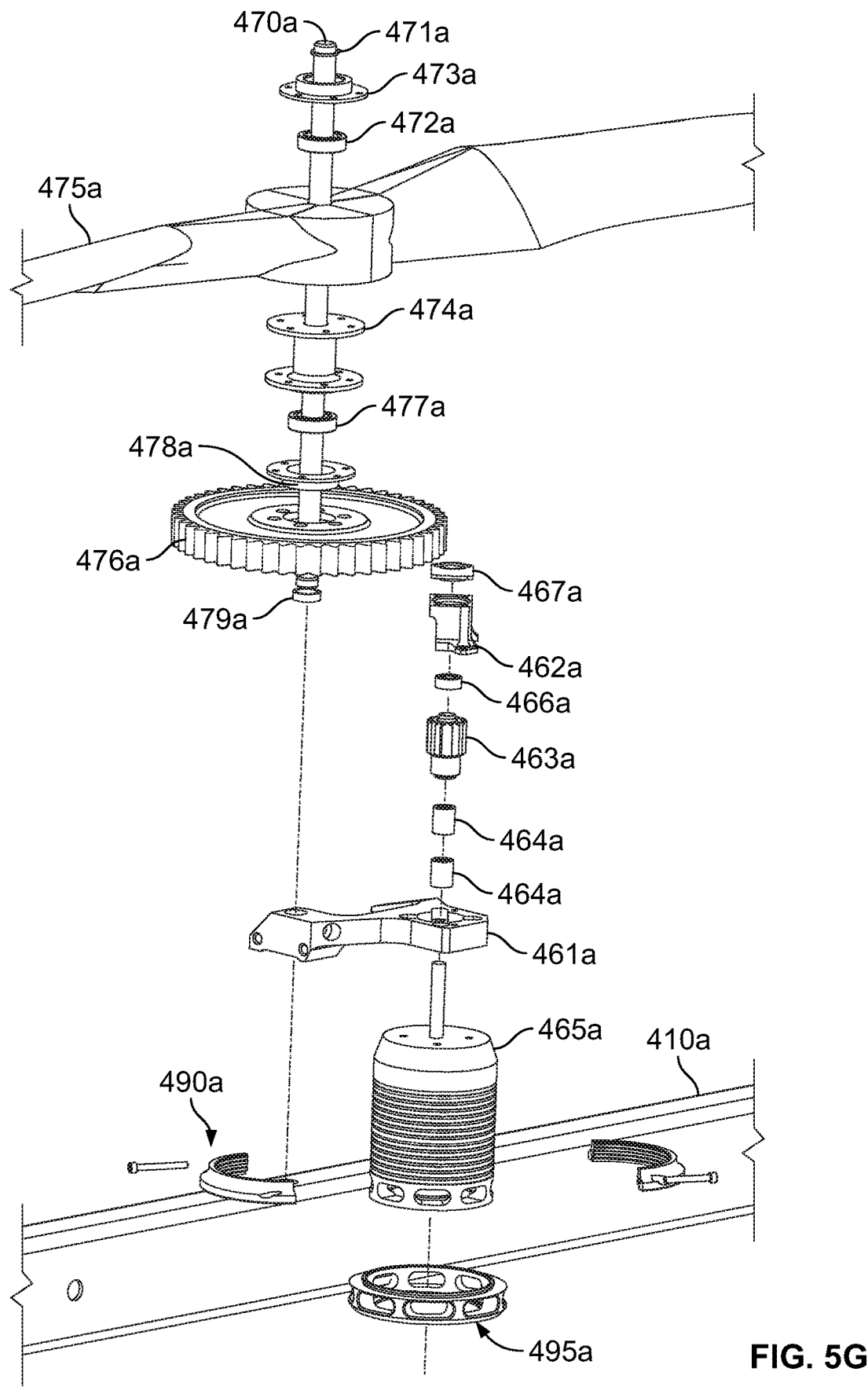
FIG. 5G is an exploded top perspective view of one of the rotor arm assemblies and part of the rotor assembly of the rotor arm module of FIG. 5A.
Figure 5H:
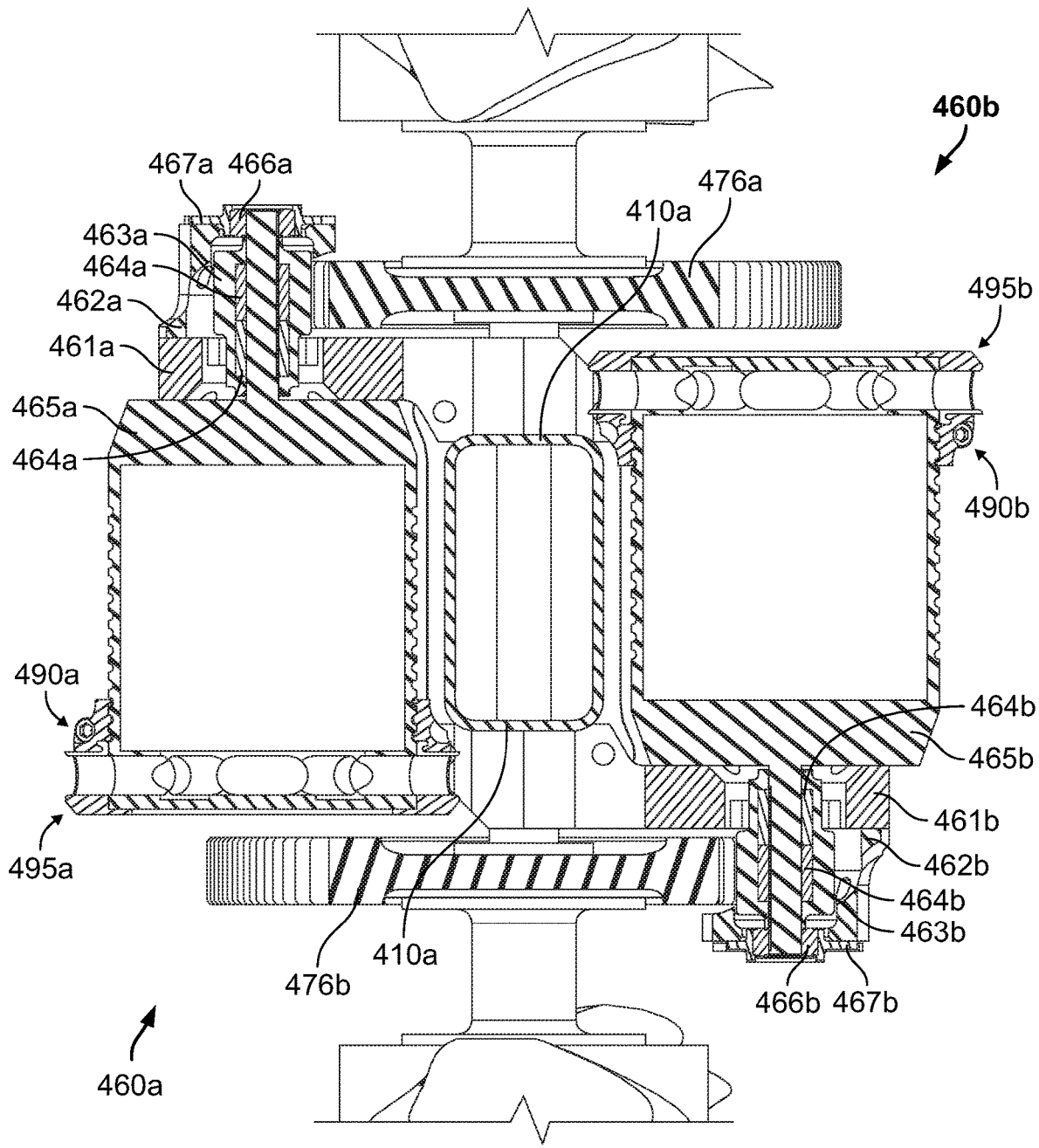
FIG. 5H is a cross-sectional view of the rotor motor assemblies of the rotor arm module of FIG. 5A taken substantially along line 5H-5H of FIG. 5A.

As best shown in FIGS. 5G and 5H, the upper rotor motor assembly 460a includes: (1) an upper rotor motor mount 461a, (2) an upper bearing spider 462a, (3) an upper pinion 463a, (4) upper bearings 464a, (5) the upper rotor motor 465a, (6) an upper bearing 466a, (7) an upper bearing cup 467a, (8) an upper two-piece cooling fan collar 490a, and (9) an upper rotor motor cooling fan 495a.

The upper rotor motor 465a is attached to the upper rotor motor mount 461a. The bearing spider 462a is attached to the upper rotor motor mount 461a. The upper bearings 464a are disposed on the motor shaft (not labeled) of the upper rotor motor 465a. The upper drive pinion 463a is disposed on the upper bearings 464a and on the motor shaft of the upper rotor motor 465a such that the upper drive gear 463a rotates with the motor shaft. The upper bearing 466a within the upper bearing cup 467a is disposed on the motor shaft of the upper rotor motor 465a. The upper bearing cup 467a is attached to the upper bearing spider 462a. The upper rotor motor cooling fan 495a is press-fit around the bottom of the upper rotor motor 465a and held in place via the upper two-piece cooling fan collar 490a.

The lower rotor motor assembly 460b includes: (1) a lower rotor motor mount 461b, (2) a lower bearing spider 462b, (3) a lower pinion 463b, (4) lower bearings 464b, (5) the lower rotor motor 465b, (6) a lower bearing 466b, (7) a lower bearing cup 467b, (8) a lower two-piece cooling fan collar 490b, and (9) a lower rotor motor cooling fan 495b.

The lower rotor motor 465b is attached to the lower rotor motor mount 461b. The lower bearing spider 462b is attached to the lower rotor mount 461b. The lower bearings 464b are disposed on the motor shaft (not labeled) of the lower rotor motor 465b. The lower pinion 463b is disposed on the lower bearings 464b and on the motor shaft of the lower rotor motor 465b such that the lower pinion 463b rotates with the motor shaft. The lower bearing 466b within the lower bearing cup 467b is disposed on the motor shaft of the lower rotor motor 465b. The lower bearing cup 467b is attached to the lower bearing spider 462b. The lower rotor motor cooling fan 495b is press-fit around the bottom of the lower rotor motor 465a and held in place via the lower two-piece cooling fan collar 490b.

Figure 5I:
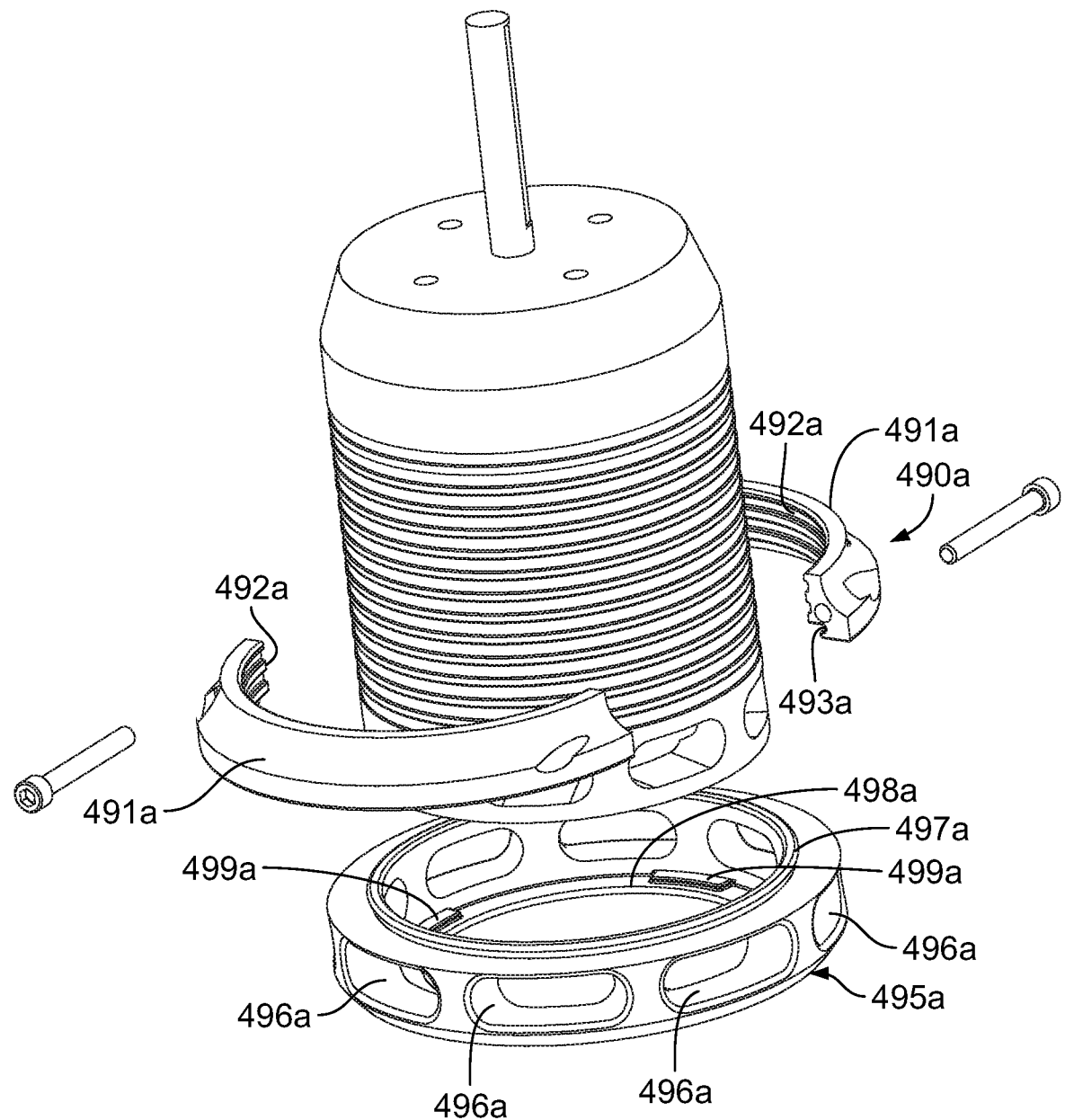
FIG. 5I is an exploded top perspective view of one of the rotor motor collars and one of the rotor motor fans of the rotor arm module of FIG. 5A.

The upper cooling fan collar 490a and the upper rotor motor cooling fan 495a are shown in detail in FIG. 5I. The lower cooling fan collar 490b and the lower rotor motor cooling fan 495b are similar to the upper cooling fan collar 490a and the upper rotor motor cooling fan 495b and are not separately shown or described for brevity.

The upper rotor motor cooling fan 495a includes a generally annular body that defines a plurality of cooling fan openings 496a through its side walls (not labeled). A collar connection lip 497a extends upward from body and radially-outward. A generally annular motor mounting shelf 498a extends radially-inward from the bottom of the body. A plurality of motor seats 499a extend upward from the motor mounting shelf 498a.

The upper cooling fan collar 490a includes two identical collar halves 491a having generally half-annular bodies. An upper rotor motor mating surface 492a that extends around the (half) circumference of the collar half 491a is grooved to correspond with and mate with grooves on the exterior of the upper rotor motor 465a. A lip retaining chamber 493a that extends around the (half) circumference of the collar half 491a is shaped to receive and retain the lip 497a of the upper rotor motor cooling fan 495a.

The bottom of the upper rotor motor 465a is disposed within the space defined by the inner cylindrical surface of the cooling fan 495a such that the bottom of the upper rotor motor 465a contacts the motor seats 499a. The cooling fan openings 496a of the cooling fan 495a are generally aligned with corresponding cooling fan openings of the upper rotor motor 465. The collar halves 491 are fit onto the upper rotor motor 465a and the cooling fan 495a such that: (1) the lip retaining chambers 493a of the collar halves 491 receive the lip 497a of the upper rotor motor cooling fan 495a; and (2) the upper rotor motor mating surfaces 492a of the collar halves 491 mate with the grooves on the exterior of the upper rotor motor 465a. Two fasteners (not labeled) attach the collar halves 491a to each other to prevent separation.

The cooling fans solve two problems: (1) limited motor power output due to overheating; and (2) motors falling apart. First, the power output of the rotor motors depends to a certain extent on cooling—power output generally decreases the hotter the rotor motors get. The cooling fans enlarge the radius of the cooling fan openings of the rotor motors. The increased radius drives cooling air at a greater flow rate, which improves cooling and allows motors to be used safely at increased loads without fear of failure.

Second, the flux rings of the rotor motors are typically glued onto the end caps of the rotor motors. This attachment is not secure due to the temperatures the rotor motors reach and the vibrations that occur during flight. The cooling fan collars double as redundant load paths for the motor flux rings since they mechanically engage the grooves on the exterior of the upper rotor motor, which eliminates the chance of the flux ring working its way off of the end cap.

Figure 5J:
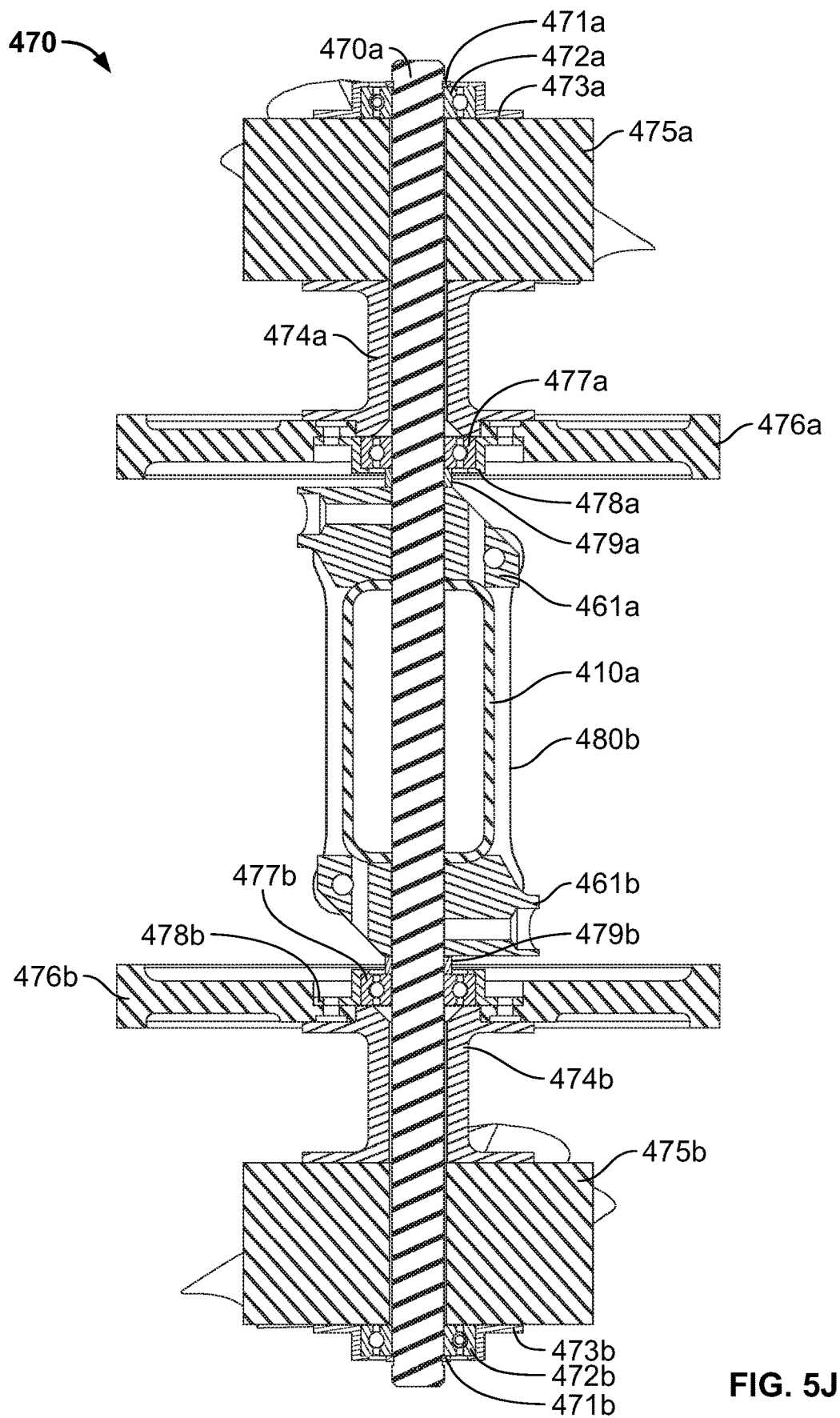
FIG. 5J is a cross-sectional view of the rotor assembly of the rotor arm module of FIG. 5A taken substantially along line 5J-5J of FIG. 5A.

As best shown in FIG. 5J, the rotor assembly 470 includes a spindle 470a and the following components rotatably mounted to the spindle 470a: (1) an upper retaining ring 471a, (2) a lower retaining ring 471b, (3) upper bearings 472a and 477a, (4) lower bearings 472b and 477b, (5) upper bearing cups 473a and 478a, (6) lower bearing cups 473b and 478b, (7) an upper torque tube 474a, (8) a lower torque tube 474b, (9) an upper rotor 475a, (10) a lower rotor 475b, (11) an upper driven gear 476a, (12) a lower driven gear 476b, (13) an upper spacer 479a, and (14) a lower spacer 479b.

Turning to the upper portion of the rotor assembly 470, the bearing 472a is disposed within the bearing cup 473a, which is fixedly attached to the top of the rotor 475a. The torque tube 474a is fixedly attached at one end to the underside of the rotor 475a and at the other end to top of the driven gear 476a. The bearing 477a is disposed within the bearing cup 478a, which is fixedly attached to the underside of the driven gear 476a. The spacer 479a is disposed between the bearing 477a and the upper rotor motor mount 461a. The upper retaining ring 471a is seated in a groove defined around the spindle 470a and prevents these components from sliding off of the spindle 470a.

Turning to the lower portion of the rotor assembly 470, the bearing 472b is disposed within the bearing cup 473b, which is fixedly attached to the bottom of the rotor 475b. The torque tube 474b is fixedly attached at one end to the top of the rotor 475b and at the other end to underside of the driven gear 476b. The bearing 477b is disposed within the bearing cup 478b, which is fixedly attached to the top of the driven gear 476b. The spacer 479b is disposed between the bearing 477b and the lower rotor motor mount 461b. The lower retaining ring 471b is seated in a groove defined around the spindle 470a and prevents these components from sliding off of the spindle 470a.

The spindle 470a extends through two vertically-aligned spindle receiving openings (not labeled) defined through the rotor arm 410a. This prevents the spindle 470a from substantially translating relative to the rotor arm 410a. And since all of the components of the upper and lower motor assemblies 460a and 460b and the rotor assembly 470 are attached to the spindle 470a (directly or indirectly), the fact that the spindle 470a extends through the spindle receiving openings defined through the rotor arm 410a prevents any of the components of the upper and lower motor assemblies 460a and 460b and the rotor assembly 470 from substantially translating relative to the rotor arm 410a.

To prevent the upper and lower rotor motors 465a and 465b (and certain components attached thereto) from rotating relative to the rotor arm 410a, the upper and lower rotor motor mounts 461a and 461b are attached to both an inner bracket 480a and an outer bracket 480b. The brackets 480a and 480b are disposed around the rotor arm 410a, as best shown in FIGS. 5A, 5B, and 5J.

In operation, the controller 272 and the ESC 265a control the rate and direction of rotation of the motor shaft of the upper rotor motor 465a, which drives the upper pinion 463a, which in turn drives the upper driven gear 476a. Since the upper driven gear 476a is fixedly attached to the upper rotor 475a without any further gear reduction, the upper rotor 475a rotates at the same rate as and in the same rotational direction as the upper driven gear 476a. Similarly, the controller 272 and the ESC 265b control the rate and direction of rotation of the motor shaft of the lower rotor motor 465b, which drives the lower pinion 463b, which in turn drives the lower driven gear 476b. Since the lower driven gear 476b is fixedly attached to the lower rotor 475b without any further gear reduction, the lower rotor 475b rotates at the same rate as and in the same rotational direction as the lower driven gear 476b.

In this embodiment, the upper and lower rotors are generally the same size and shape. In another embodiment, the lower rotors are larger than (such as about 7% larger than) the upper rotors to compensate for the fact that the lower rotors operate in the upper rotors' downwash. Running larger lower rotors is one way to improve load sharing of upper and lower motors of a multicopter with counter-rotating blades. Another way to improve load sharing is to select a lower gear-reduction for the lower rotors. Yet another way is to select motors with higher KV (rpm/volt) values. Yet another way is to select lower rotors with coarser pitch than the upper rotors.

1.3 Front Landing Gear Extension Modules and Landing Gear Modules

Figures 6A, 6B:
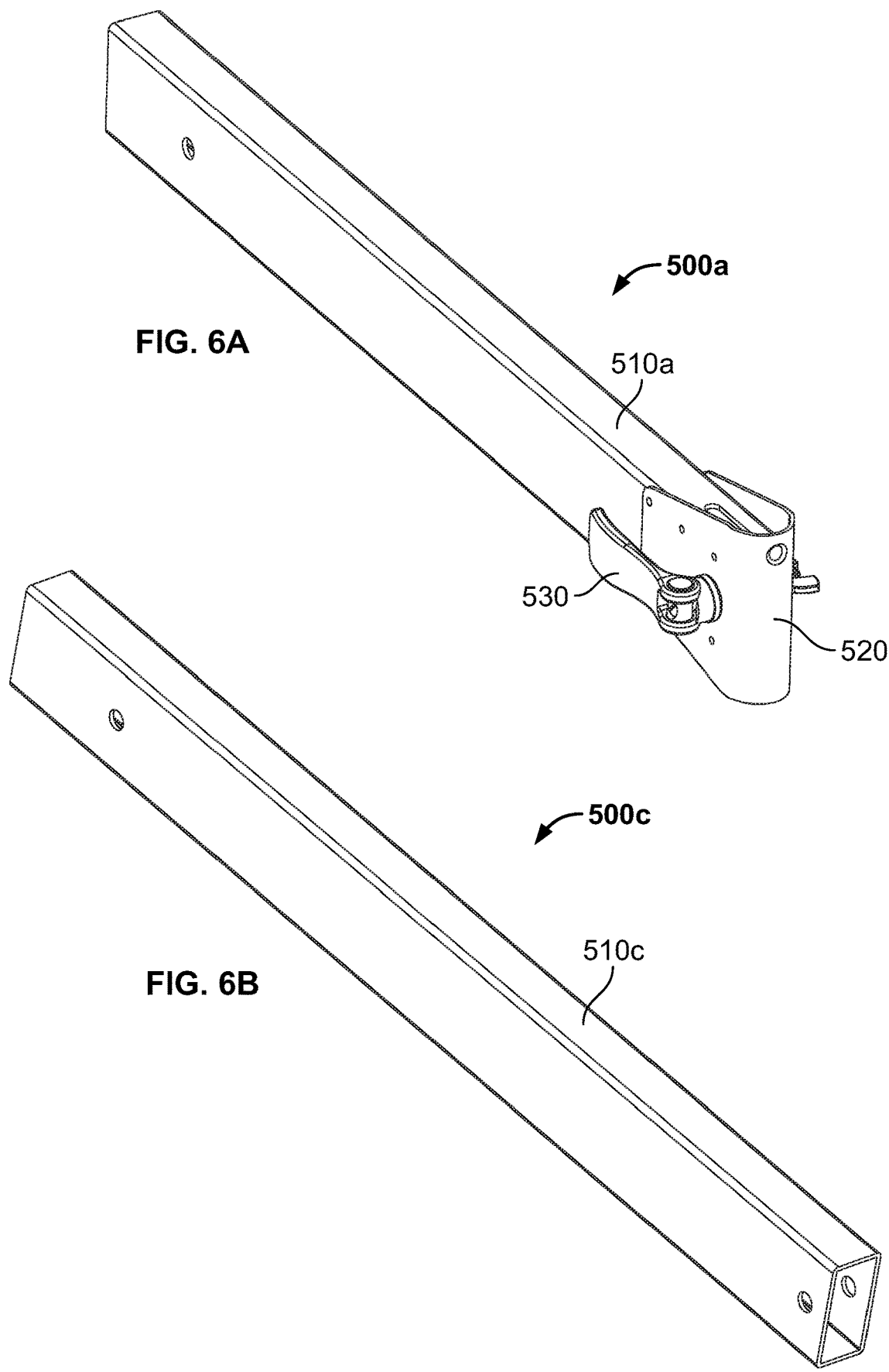
FIG. 6A is a top perspective view of one of the front landing gear extension modules of the multicopter of FIG. 1A.
FIG. 6B is a top perspective view of one of the rear landing gear extension modules of the multicopter of FIG. 1A.
Figure 7A:
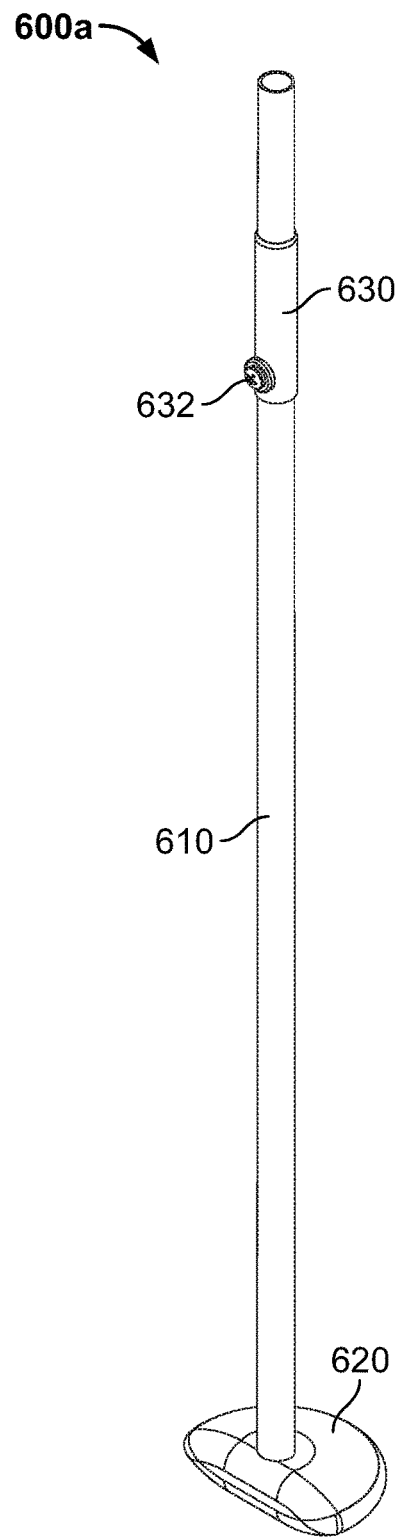
FIG. 7A is a top perspective view of one of the front landing gear modules of the multicopter of FIG. 1A.

FIGS. 6A and 7A show the first front landing gear extension module 500a and the first front landing gear module 600a, respectively. The front landing gear modules (along with the rear landing gear modules, described below) support the multicopter 10 when assembled but not flying, and facilitate launch and landing of the multicopter 10 without damaging the multicopter 10. The front landing gear extensions are used to attach the front landing gear to the respective rotor arm modules, and also enable the front landing gear to move relative to the rotor arm modules to prevent rotor rotation in certain instances.

The second front landing gear extension module 500b and the second front landing gear module 600b are similar to the first front landing gear extension module 500a and the first front landing gear module 600a and are not separately shown or described for brevity.

The first front landing gear extension module 500a includes a generally rectangular hollow support 510a, a landing gear module securing device 520 attached at one end of the support 510a, and a front landing gear locking device 530 (which is a cam lever lock in this embodiment but can be any suitable locking device) attached to the landing gear module securing device 520.

The first front landing gear module 600a includes a generally cylindrical leg 610, a generally semicircular foot 620 attached to a bottom end of the leg 610, and a collar 630 attached near the top end of the leg 610 via a fastener 632 (such as a set screw).

The front landing gear locking device 530 enables an operator to attach the first front landing gear module 600a to the first front landing gear extension module 500a. To do so, the operator unlocks the front landing gear locking device 530, inserts the first front landing gear module 600a into the landing gear module securing device 520 until the collar 630 is disposed within the landing gear module securing device 520, and re-locks the front landing gear locking device 530. The operator reverses this process to detach the first front landing gear module 600a from the first front landing gear extension module 500a.

The operator attaches the first front landing gear extension module 500a to the first rotor arm module 400a by inserting the end of the support 510a opposite the end to which the landing gear module securing device 520 is attached into the front landing gear extension module receiving socket of the first rotor arm module 400a. The operator then locks the first front landing gear extension module 500a into place, such as using suitable fasteners.

Although not shown, the operator can move the front landing gear module further radially-inward or further radially-outward by sliding the support of the front landing gear extension module further into or further out of the rotor arm of the corresponding rotor arm module. This enables the operator to move the front landing gear module from a first position in which the front landing gear module is clear of the rotors radially-inward to a second position in which the rotors contact the front landing gear module. When in the second position, the front landing gear module prevents the rotors from rotating.

1.4 Rear Landing Gear Extension Modules and Landing Gear Module

Figure 7B:
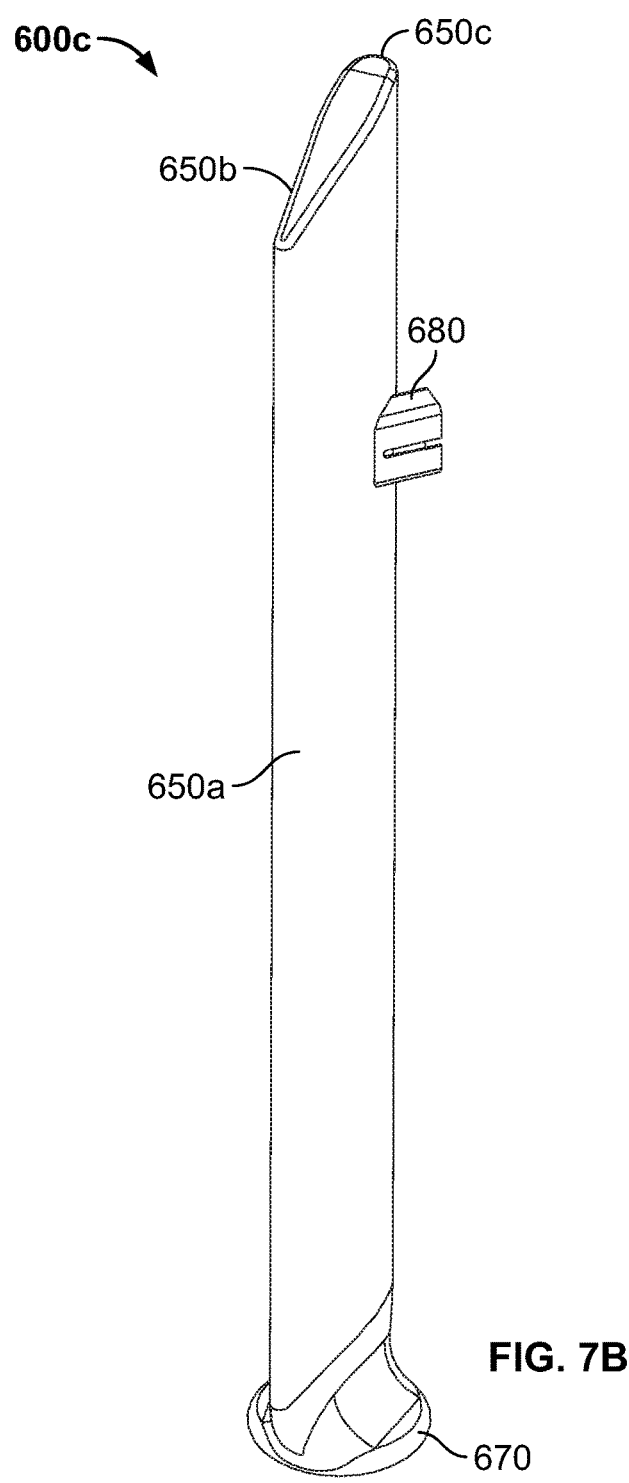
FIG. 7B is a top perspective view of one of the rear landing gear modules of the multicopter of FIG. 1A.

FIGS. 6B and 7B show the first rear landing gear extension module 500c and the first rear landing gear module 600c, respectively. The rear landing gear modules (along with the front landing gear modules, described above) support the multicopter 10 when assembled but not flying, and facilitate launch and landing of the multicopter 10 without damaging the multicopter 10. The rear landing gear modules are shaped such that they act as vertical stabilizers (or fins) during flight, ensuring that the front of the multicopter 10 (and the nose of the fixed-wing aircraft 20, if attached thereto) points generally into the airflow. The rear landing gear extensions are used to attach the rear landing gear to the respective rotor arm modules, and also enable the rear landing gear to move relative to the rotor arm modules to prevent rotor rotation in certain instances.

The second rear landing gear extension module 500*d* and the second rear landing gear module 600*d* are similar to the first rear landing gear extension module 500*c* and the first rear landing gear module 600*c* and are therefore not separately shown or described.

The first rear landing gear extension module 500*c* is an elongated rectangular hollow support 510*c*.

The first rear landing gear module 600*c* includes a body having a generally triangular cross-section that tapers from front to back. The body includes two side surfaces 650*a* and 650*b* and a front surface 650*c* joining the side surfaces 650*a* and 650*b*. The side surfaces 650*a* and 650*b* are substantially longer than the front surface 650*c* is wide. The body tapers at its bottom into a generally circular foot 670. A rear landing gear extension module receiving socket is defined by a hollow rectangular support 680 extending through the body.

The operator attaches the first rear landing gear extension module 500*c* to the third landing gear module 600*c* by inserting one end of the support 510*c* of the first rear landing gear extension module 500*c* into the rear landing gear extension module receiving socket of the support 680. The operator then locks the first rear landing gear extension module 500*c* into place, such as using suitable fasteners.

The operator attaches the first rear landing gear extension module 500*c* to the third rotor arm module 400*c* by inserting the end of the support 510*c* of the first rear landing gear extension module 500*c* opposite the end to which the first rear landing gear module 600*c* is attached into the rear landing gear extension module receiving socket of the third rotor arm module 400*c*. The operator then locks the first rear landing gear extension module 500*c* into place, such as using suitable fasteners.

Once attached, the rear landing gear modules are oriented such that the side surfaces of the rear landing gear modules are substantially aligned with the saddle side brackets 320*a* and 320*b* of the saddle 300, as best shown in FIG. 1B. When the fixed-wing aircraft 20 is attached to the multicopter 10, these side surfaces of the rear landing gear modules are substantially parallel to a generally vertical plane containing the roll axis of the fuselage of the fixed-wing aircraft 20. The relatively long length of these side surfaces of the rear landing gear modules and their placement well-aft of the center-of-lift of the multicopter 10 cause the rear landing gear modules to act as fins. This weathervane effect ensures that the nose of the fixed-wing aircraft 20 is oriented into the airflow when airborne. Good flow alignment is critically important for spin avoidance at the moment the multicopter 10 releases the fixed-wing aircraft 20, when the fixed-wing aircraft 20 may be operating well-below stall speed.

In certain embodiments, one or more of the landing gear modules includes a shock absorber.

1.5 Separately Powered Upper and Lower Rotor Motors

As noted above, four batteries 260*a* to 260*d* power the multicopter 10, though in other embodiments a different quantity of batteries and/or different type(s) of batteries power the multicopter. In other embodiments, any suitable power source(s), such as a fuel-based power source or a solar-based power source, may be used instead of or along with batteries.

In this embodiment, a first pair of batteries 260*a* and 260*b* are connected in series and a second pair of batteries 260*c* and 260*d* are connected in series. Here, the first pair of batteries 260*a* and 260*b* power the upper rotor motors and do not power the lower rotor motors, while the second pair of batteries 260*c* and 260*d* power the lower rotor motors and do not power the upper rotor motors. This configuration ensures that, if one pair of batteries fails, the multicopter 10 is operable in a quadcopter mode with either all four upper rotor motors (if the second pair of batteries 260*c* and 260*d* fails) or all four lower rotor motors (if the first pair of batteries 260*a* and 260*b* fails).

The multicopter 10 also includes a gang circuit that connects the two pairs of batteries in parallel to enable a single charger connected to one of the pairs of batteries to also charge the other pair of batteries. The gang circuit is overload-protected and includes an automatically resetting circuit breaker. The gang circuit is beneficial because it reduces charging time, allowing an operator to recharge both batteries in parallel when only one charger is available.

2. Example Fixed-Wing Aircraft Launch Method

To launch the fixed-wing aircraft 20 using the multicopter 10, the operator mounts the fixed-wing aircraft 20 to a launch-assist assembly (not shown). The operator switches an idle power circuit of the multicopter 10 to a closed state (from an open state) to power certain components of the multicopter 10—such as the GPS receiver 285, the controller 272, the IMU 277, the telemetry link 274, the R/C receiver 276, the barometer 278, the cam servo motor 381, and the lock servo motor 391—to enable various preflight checks (e.g., as operating mode status checks, throttle response checks, attitude indicator response checks, heading accuracy checks, and R/C range checks) to be performed. Switching the idle power circuit to the closed state does not power the rotor motors. The idle power circuit thus (when closed) enables the operator to conduct most preflight checks without having to worry about accidentally switching on one or more of the rotor motors.

The operator then attaches the hub module 100 to the fixed-wing aircraft 20 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392*a* on the end of the lock servo motor arm 392 engages the cam servo motor arm lock device 382*a* of the cam servo motor arm 382; and (3) seating a rearwardly-curved hook 21 attached to the fuselage of the fixed-wing aircraft 20 on the cam 350 such that hook generally rests on the ridge 351 of the cam 350 and the tip of the hook is disposed in the valley 353 of the cam 350.

At this point the fixed-wing aircraft 20 is attached to the cam 350 (and the hub base 100), the fuselage of the fixed-wing aircraft 20 contacts the front and rear aircraft engaging brackets 340*a* and 340*b* (to prevent rotation about the pitch and yaw axes of the fixed-wing aircraft 20), and the stabilizers 290*a* and 290*b* contact the wings of the fixed-wing aircraft 20 (to prevent rotation about the roll axis of the fixed-wing aircraft 20).

Since the lock servo motor locking extension 392*a* is engaged to the cam servo motor arm lock device 382*a* of the cam servo motor arm 382, the cam servo motor 381 cannot rotate the cam 350 from the attached rotational position to the detached rotational position (counter-clockwise from this viewpoint). This prevents undesired detachment of the fixed-wing aircraft 20 from the cam 350 (and the multicopter 10).

After the hub module 100 is attached to the fixed-wing aircraft 20, the operator: (1) attaches the front and rear landing gear modules 600a to 600d to their respective front and rear landing gear extension modules 500a to 500d; (2) attaches the front and rear landing gear extension modules 500a to 500d to their respective rotor arm modules 400a to 400d; and (3) attaches and locks the rotor arm modules 400a to 400d to the hub module 100 to complete assembly of the multicopter 10.

The operator ensures the front and rear landing gear modules 600a to 600d are not in the path of rotation of the rotors of their corresponding rotor arm modules 400a to 400b, and connects the main power line of the multicopter 10 to switch a main power circuit to a closed state (from an open state). Unlike the idle power circuit, the main power circuit (when closed) is capable of delivering current sufficient to drive the rotor motors and cause the multicopter 10 to fly.

At this point, the operator uses the R/C controller to arm the controller 272. After the controller 272 has armed and determined that the rotor motors are operating properly, the operator begins the engine start-up procedure for the fixed-wing aircraft 20. At this point, the multicopter 10 is manually or autonomously controlled (or a combination of both) to release the fixed-wing aircraft 20 into free flight according to the following general steps: (1) flying the multicopter 10 to a pre-dash location a particular distance above the ground; (2) dashing the multicopter 10 laterally until achieving a particular airspeed suitable for release; (3) releasing the fixed-wing aircraft 20; (4) stopping the multicopter's dash; (5) flying the multicopter 10 to a pre-landing location a particular distance above a landing location; and (6) descending to the landing location.

More specifically, in one example, the operator advances the throttle to begin vertically climbing and lift the fixed-wing aircraft 20 from the launch-assist assembly. Once the multicopter 10 and attached fixed-wing aircraft 20 have reached a designated pre-dash height above ground, the operator controls the multicopter 10 to begin dashing forward to generate enough airspeed to release the fixed-wing aircraft 20 into free flight.

Once the multicopter 10 reaches a designated airspeed, the operator remotely controls the multicopter to detach the fixed-wing aircraft 20 from the cam 350 (and the multicopter 10). This is a two-step process, as shown in FIGS. 8A to 8C. To detach the fixed-wing aircraft 20 from the cam 350 (and the multicopter 10), the operator first remotely controls the lock servo motor 391 (via the R/C controller) to rotate the lock servo motor arm 392 into the cam rotation-enabling rotational position (counter-clockwise from this viewpoint). Second, the operator remotely controls the cam servo motor 381 (via the R/C controller) to rotate the cam 350 from the attached rotational position to the detached rotational position (counter-clockwise from this viewpoint). As shown in the progression from FIGS. 8B to 8C, as the cam servo motor 381 rotates the cam 350 from the attached rotational position to the detached rotational position, the valley 352 and the ascending edge of the ridge 353 forces the hook 21 off of the cam 350, thereby detaching the fixed-wing aircraft 20 from the cam 350 (and the multicopter 10).

After the fixed-wing aircraft 20 detaches from the multicopter 10, the multicopter 10 reduces its pitch angle (such as from 20 degrees nose down to 0 degrees) to stop dashing and reduce its airspeed before traveling to a desired landing area.

3. Aircraft-Retrieval System

In various example embodiments, the aircraft-retrieval system includes a retrieval assembly 1000, a flexible capture member 2000, and a tensioning object 3000.

The flexible capture member 2000 is attachable to the retrieval assembly 1000, and the tensioning object 3000 is attachable to the flexible capture member 2000. The retrieval assembly 1000 (and the attached flexible capture member 2000 and tensioning object 3000) is removably attachable to the multicopter 10 to facilitate retrieval of the fixed-wing aircraft 20 from wing-borne flight. That is, an operator attaches the retrieval assembly 1000 to the multicopter 10 for retrieval of the fixed-wing aircraft 20 and afterwards removes it from the multicopter 10 for storage or to enable the multicopter 10 to carry out different operations (such as launch the fixed-wing aircraft 20).

Figure 9A:
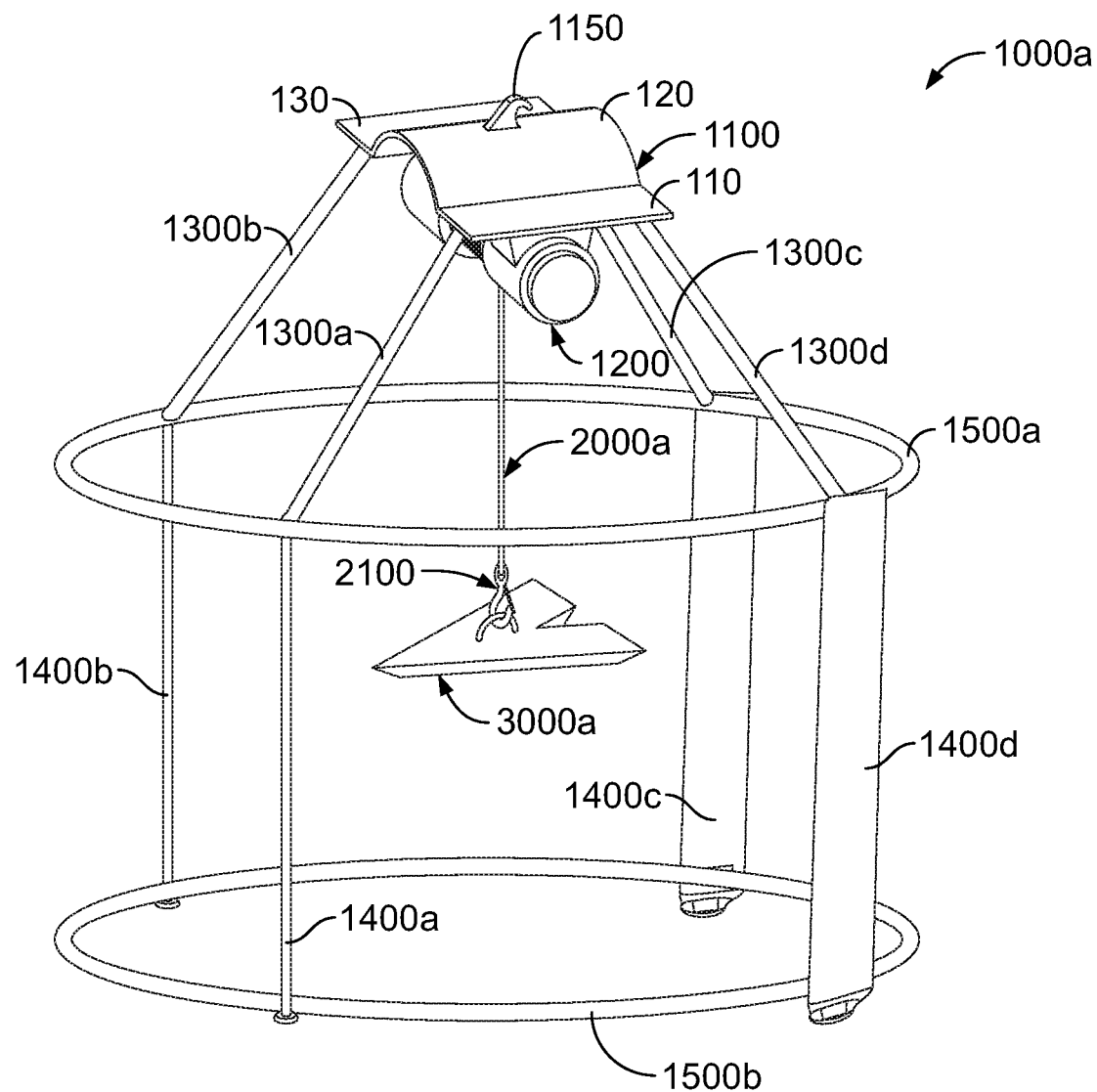
FIG. 9A is a perspective view of one embodiment of the retrieval apparatus, the flexible capture member, and the tensioning object of the present disclosure.
Figure 9B:
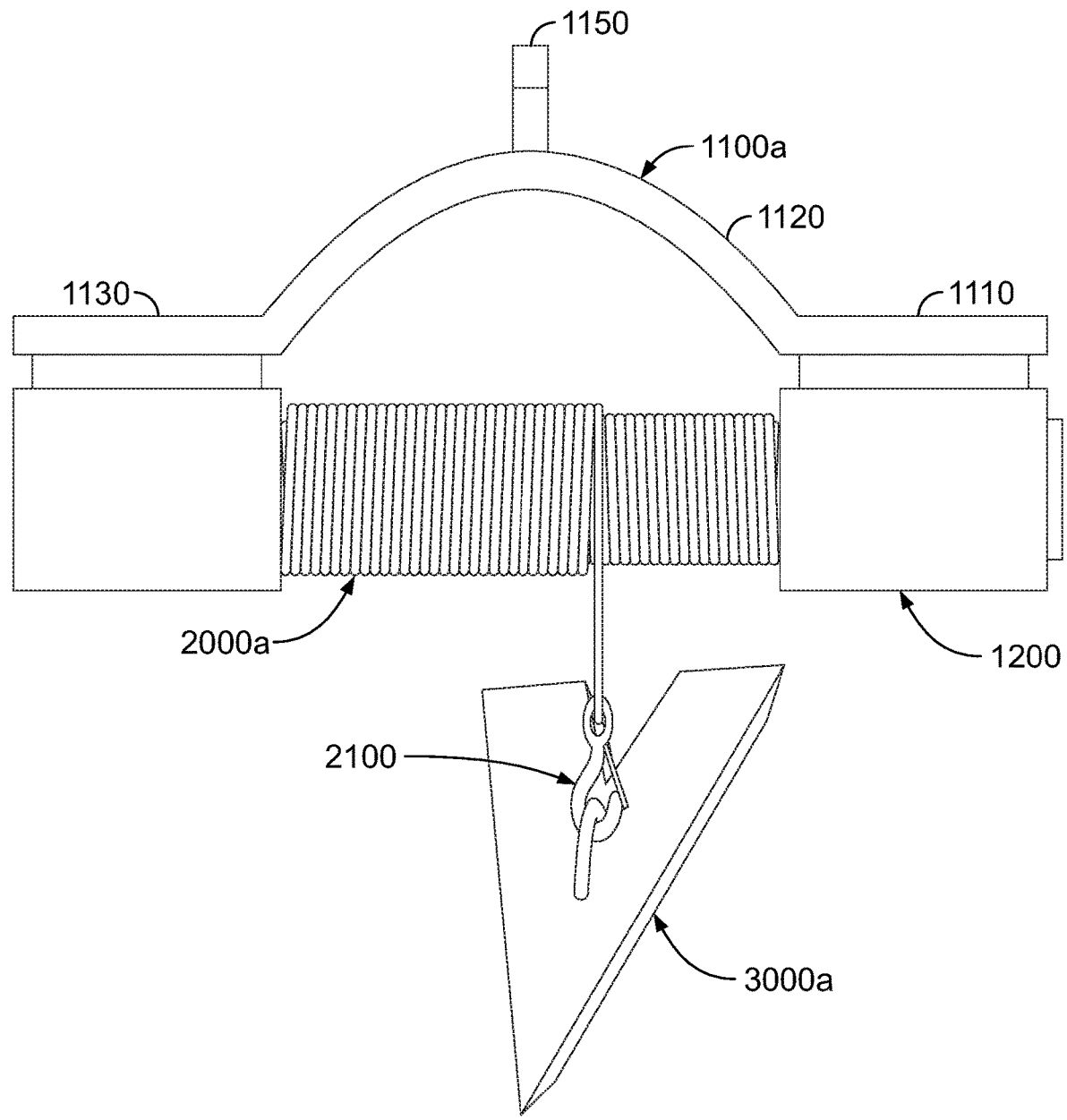
FIG. 9B is a front elevational view of part of the retrieval apparatus, the flexible capture member, and the tensioning object of FIG. 9A.

As best shown in FIGS. 9A and 9B, one embodiment of the retrieval assembly 1000 includes a base 1100; a hook 1150; a winch 1200; first, second, third, and fourth connecting arms 1300a, 1300b, 1300c, and 1300d, respectively; first and second front landing gear 1400a and 1400b, respectively; first and second rear landing gear 1400c and 1400d, respectively; and upper and lower stabilizers 1500a and 1500b, respectively.

The base 1100 includes two generally planar sections 1110 and 1130 connected by an upwardly curved section 1120. The curvature of the curved section 1120 generally matches the curvature of the aircraft-engaging brackets 340a and 340b of the saddle 300. Put differently, the curvature of the curved section 1120 mimics the curvature of the upper portion of the fuselage of the fixed-wing aircraft 20a. The hook 1150 is attached to (such as via suitable fasteners or welding or in any other suitable manner) and extends upward from the top surface of the curved section 1120. In some embodiments, the hook 1150 is integrally formed with the curved section 1120. This is merely one example configuration of the base, and it may have any other suitable shape or configuration.

The winch 1200 may be any suitable electric winch that includes a drum (not labeled) and a winch motor (not labeled) operatively connected to the drum to rotate the drum in a first direction and a second different direction. The winch motor is electrically connectable to the power source(s) of the multicopter 10 and communicatively connectable to the controller 272 of the multicopter 10, such as via a suitable wiring and an electrical connector (or connectors). In other embodiments, the winch motor is electrically connectable to a power source other than the power source of the multicopter. That is, in these embodiments, the winch motor has an power source independent from the power source of the multicopter.

The winch 1200 is attached to the base 1100 (and, particularly, to the planar sections 1100 and 1130) via suitable fasteners or in any other suitable manner. One end of the flexible capture member 2000, such as a fibrous or wire rope, is attached to the drum, and the flexible capture member 2000 is wound around the drum. The flexible capture member 2000 terminates in a free end.

In other embodiments, the retrieval assembly includes a bull wheel rather than a winch.

The controller 272 is configured to control the winch motor (such as responsive to control signals received from the controller of the operator or to instructions stored by the memory 272*b*) to rotate the drum in the first direction to wind the flexible capture member 2000 off of the drum and in the second direction to wind the flexible capture member 2000 onto the drum. In other embodiments, the operator directly controls the winch motor (such as via the R/C controller) rather than indirectly via the controller 272 of the multicopter 10.

The first and second front landing gear 1400*a* and 1400*b* are shaped and constructed similarly to the first and second front landing gear modules 600*a* and 600*b* of the multicopter 10, though they may have any other suitable shape. The first and second connecting arms 1300*a* and 1300*b*, which are solid or tubular members but may have any suitable cross-section or shape, connect the first and second front landing gear 1400*a* and 1400*b* to the base 1100 in any suitable manner, such as (but not limited to) via brackets, fasteners, lashing, or welding.

The first and second rear landing gear 1400*c* and 1400*d* are shaped and constructed similarly to the first and second rear landing gear modules 600*c* and 600*d* of the multicopter 10. That is, the rear landing gear 1400*c* and 1400*d* are shaped such that they act as vertical stabilizers (or fins) during flight, ensuring that the front of the multicopter 10 points generally into the airflow. The third and fourth connecting arms 1300*c* and 1300*d*, which are solid or tubular members but may have any suitable cross-section or shape, connect the first and second rear landing gear 1400*c* and 1400*d* to the base 1100 in any suitable manner, such as (but not limited to) via brackets, fasteners, lashing, or welding.

In this embodiment, each landing gear 1400*a*-1400*d* has a longitudinal axis, and the longitudinal axes of the landing gear are generally parallel to one another. Additionally, in this embodiment, the landing gear 1400*a*-1400*d* are generally equally circumferentially spaced apart around the base 1100.

The connecting arms 1300*a*-1300*d* and the landing gear 1400*a*-1400*d* are sized and oriented such that the internal height of the retrieval assembly, which is the vertical distance between the bottom of the winch and the free ends of the landing gear 1400*a*-1400*d*, is larger than the wingspan of the fixed-wing aircraft 20. As described below, this ensures that the fixed-wing aircraft 20 does not contact the landing surface after landing.

The upper and lower stabilizers 1500*a* and 1500*b* are rigid members that are circular in this embodiment (though they may be any suitable shape) and each connected to the first and second front landing gear and first and second rear landing gear 1400*a*-1400*d* in a suitable manner, such as (but not limited to) via fasteners, adhesive, welding, or lashing. In this embodiment, the upper stabilizer 1500*a* is connected to the first and second front landing gear and first and second rear landing gear 1400*a*-1400*d* near their attachment points to the respective arms 1300*a*-1300*d*, and the lower stabilizer 1500*b* is connected to the first and second front landing gear and first and second rear landing gear 1400*a*-1400*d* near their respective free ends. The retrieval assembly may include suitable quantity of stabilizers. In certain embodiments, each stabilizer connects at least two, but fewer than all, of the landing gear.

The arms 1300*a*-1300*d*, the landing gear 1400*a*-1400*d*, and the stabilizers 1500*a* and 1500*b* generally define a fixed-wing aircraft receiving volume sized to house the entire fixed-wing aircraft 20 after retrieval, as described below.

To retrieve the fixed-wing aircraft 20 from wing-borne flight, the operator first attaches the retrieval assembly 1000 to the multicopter 10. Here, the operator attaches the hook 1150 of the base plate 1100 to the cam 350 of the saddle 300 of the hub module 100 in a manner similar to that in which the operator attaches the hook 21 of the fixed-wing aircraft 20 to the saddle 300. Specifically, the operator attaches the hook 1150 to the cam 350 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392*a* on the end of the lock servo motor arm 392 engages the cam servo motor arm lock device 382*a* of the cam servo motor arm 382; and (3) seating the rearwardly-curved hook 1150 attached to the base plate 1100 on the cam 350 such that hook generally rests on the ridge 351 of the cam 350 and the tip of the hook is disposed in the valley 353 of the cam 350.

At this point the retrieval assembly 1100 is attached to the cam 350 (and the hub base 100) and the curved section 1120 of the base plate 1100 of the retrieval assembly 1000 contacts the front and rear aircraft engaging brackets 340*a* and 340*b* (to prevent the retrieval assembly 1000 from rotating relative to the multicopter 10 about the pitch, yaw, and roll axes of the multicopter 10).

Since the lock servo motor locking extension 392*a* is engaged to the cam servo motor arm lock device 382*a* of the cam servo motor arm 382, the cam servo motor 381 cannot rotate the cam 350 from the attached rotational position to the detached rotational position (counter-clockwise from this viewpoint). This prevents undesired detachment of the retrieval assembly 1000 from the cam 350 (and the multicopter 10).

After the hub module 100 is attached to the retrieval assembly 1000, the operator: (1) if removed, attaches the front and rear landing gear modules 600*a* to 600*d* to their respective front and rear landing gear extension modules 500*a* to 500*d*; (2) attaches the front and rear landing gear extension modules 500*a* to 500*d* to their respective rotor arm modules 400*a* to 400*d*; and (3) attaches and locks the rotor arm modules 400*a* to 400*d* to the hub module 100 to complete assembly of the multicopter 10. In other embodiments, the operator need not take this step, as the front and rear landing gear 1400*a*-1400*d* of the retrieval assembly 1000 function as the landing gear for the multicopter 10.

The operator attaches a connector 2100, such as a spring-loaded hook or any other suitable connector, to the free end of the flexible capture member 2000. The operator attaches an aerodynamic tensioning object 3000, here a kite-shaped object, to the connector 2100, thereby attaching the tensioning object 3000 to the flexible capture member 2000. The tensioning object 3000 is heavy enough (here, 2 kilograms, though it may have any other suitable mass) to tension the flexible capture member 2000 during retrieval and keep it relatively straight to improve targeting success of the fixed-wing aircraft 20 and to prevent (or reduce the chances of) the flexible capture member 2000 from bouncing off of the wing of the fixed-wing aircraft 20 and fouling retrieval.

The operator closes the idle power circuit of the multicopter 10 to perform various preflight checks, as described above, and then closes the main power circuit to power the rotor motors. The operator then arms the controller 272, as described above. At this point, as described in more detail below, the multicopter 10 is manually or autonomously controlled (or a combination of both) to capture the fixed-wing aircraft 20 from free flight and land the fixed-wing aircraft 20 and the multicopter 10 according to the following general steps: (1) remotely controlling the multicopter 10 to fly to a pre-capture altitude; (2) remotely controlling the motor of the winch 1200 to rotate the drum to wind out a first portion of the flexible capture member 2000 off of the drum; (3) remotely controlling the multicopter 10 to fly until the fixed-wing aircraft 20 contacts and captures the flexible capture member 2000; (4) remotely controlling the motor of the winch 1200 to rotate the drum to begin winding in the flexible capture member 2000 until the fixed-wing aircraft 20 reaches the drum; and (5) remotely controlling the multicopter 10 to land.

Figure 10A:
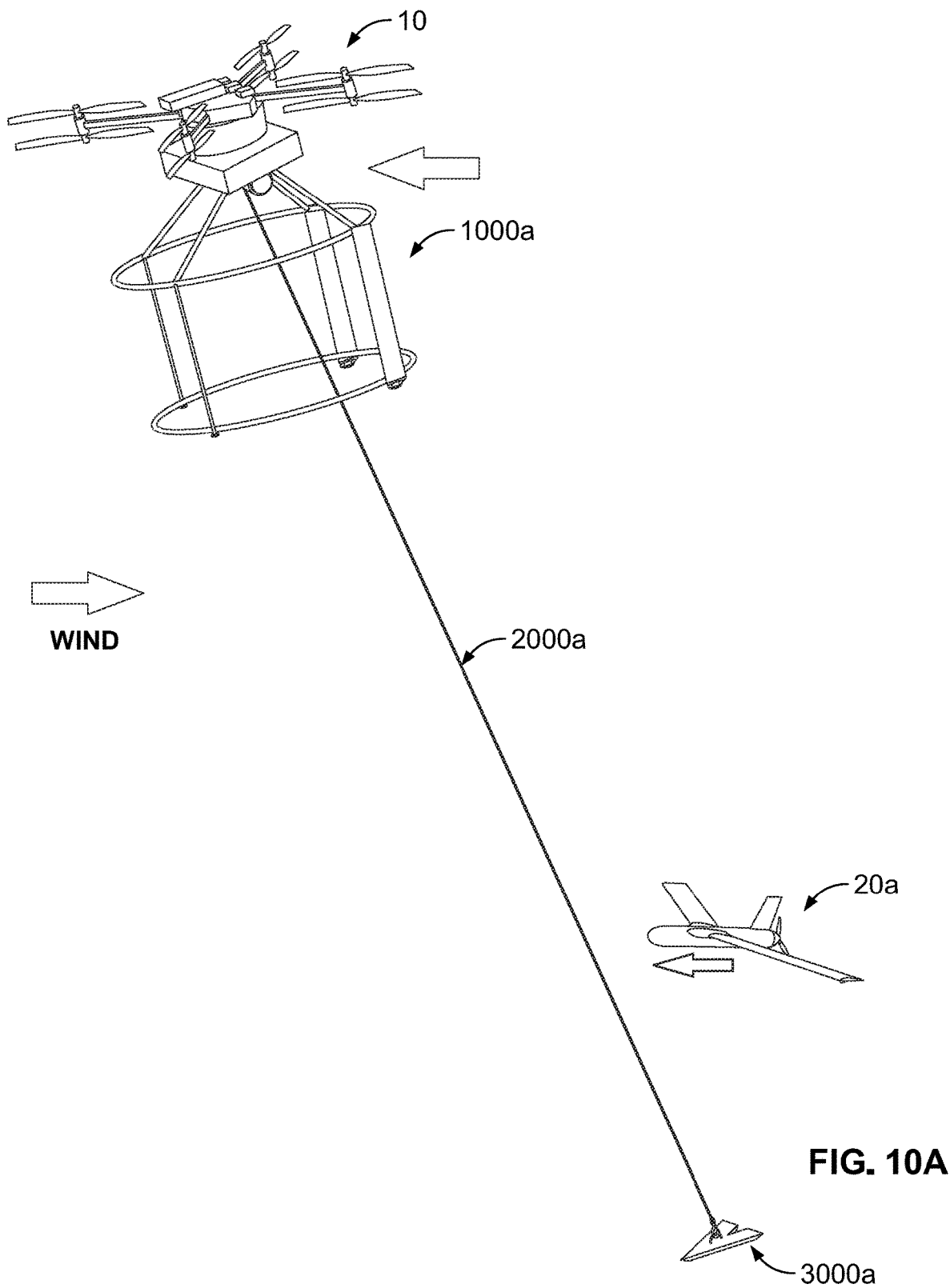
FIGS. 10A-10F are diagrammatic views of a multicopter using the retrieval apparatus, the flexible capture member, and the tensioning object of FIGS. 9A and 9B to retrieve a fixed-wing aircraft from wing-borne flight.

FIGS. 10A-10F show one example manner of retrieving a fixed-wing aircraft 20a from wing-borne flight using a retrieval assembly 1000a attached to a multicopter 10. Neither the landing gear modules of the multicopter 10 nor the details of the base of the retrieval assembly 1000a are shown for clarity. In this example, as the fixed-wing aircraft 20a approaches the retrieval location, the operator remotely controls the multicopter 10 to climb to a pre-capture altitude. The operator also remotely controls the motor of the winch to rotate the drum in the first direction to wind a first portion of (such as a designated length of) the flexible capture member 2000a off of the drum. Once the first portion of the flexible capture member 2000a is wound off of the drum, the operator remotely controls the multicopter 10 to fly into the wind, as shown in FIG. 10A.

Figure 10B:
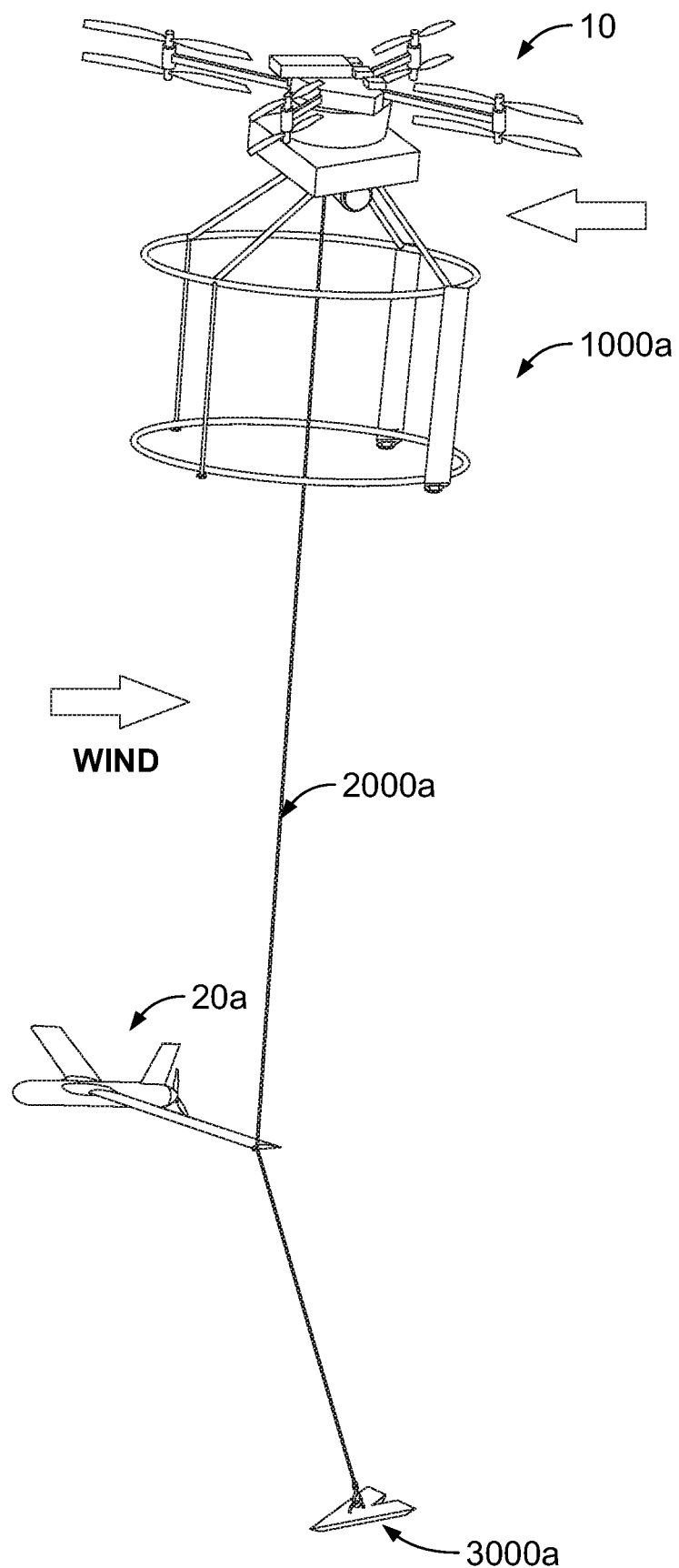

As shown in FIG. 10B, the fixed-wing aircraft 20a is flown toward, contacts, and captures part of the flexible capture member 2000 in a manner similar to that described in U.S. Pat. No. 6,264,140, the entire contents of which are incorporated herein by reference. Specifically, the fixed-wing aircraft 20a is flown toward the flexible capture member 2000a such that the leading edge of one of the wings of the fixed-wing aircraft 20a contacts the flexible capture member 2000a. After the leading edge of the wing contacts the flexible capture member 2000a, continued movement of the fixed-wing aircraft 20a relative to the flexible capture member 2000a causes the capture flexible capture member 2000a to slide away from the fuselage of the fixed-wing aircraft 20a along the leading edge of the wing toward the end of the wing until a capture device (not shown) near the end of the wing captures part of the flexible capture member 2000a. In this embodiment, the capture device includes a cleat such that the fixed-wing aircraft 20a does not slide along the flexible capture member 2000a after capture.

Figure 10C:
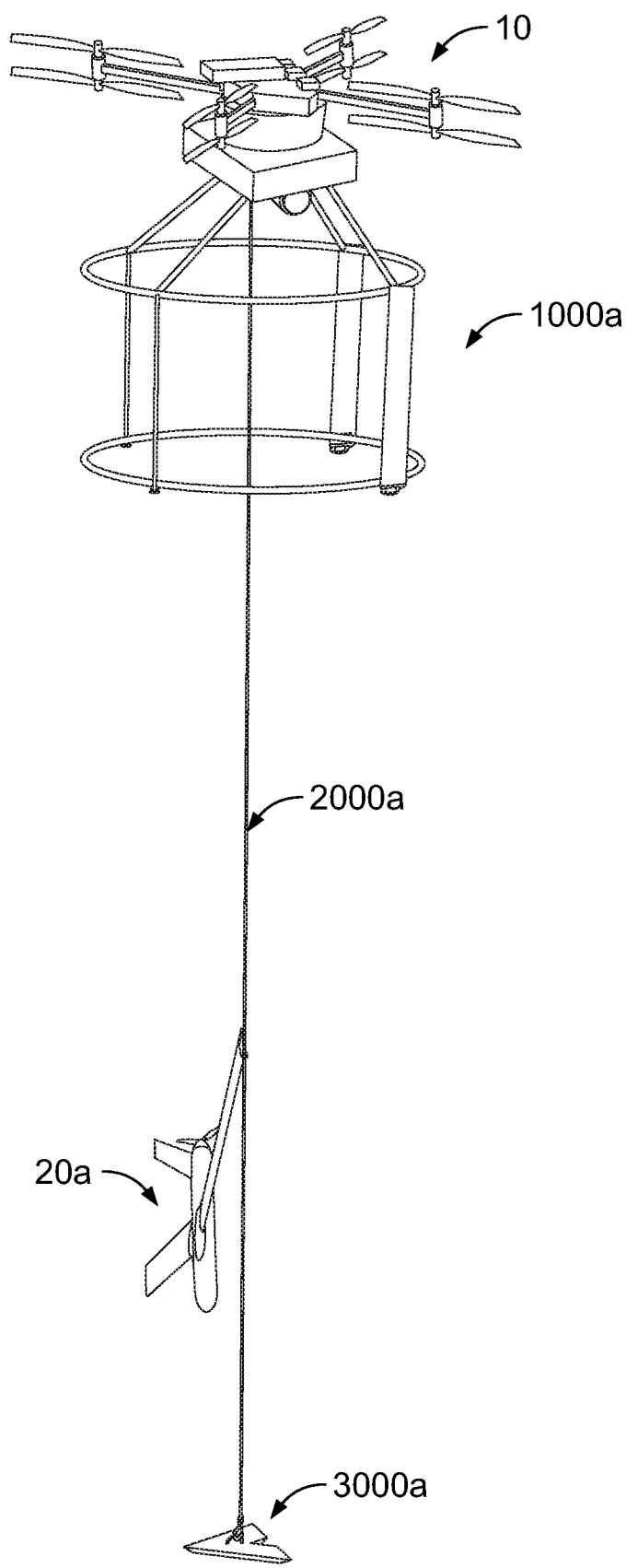
Figure 10D:
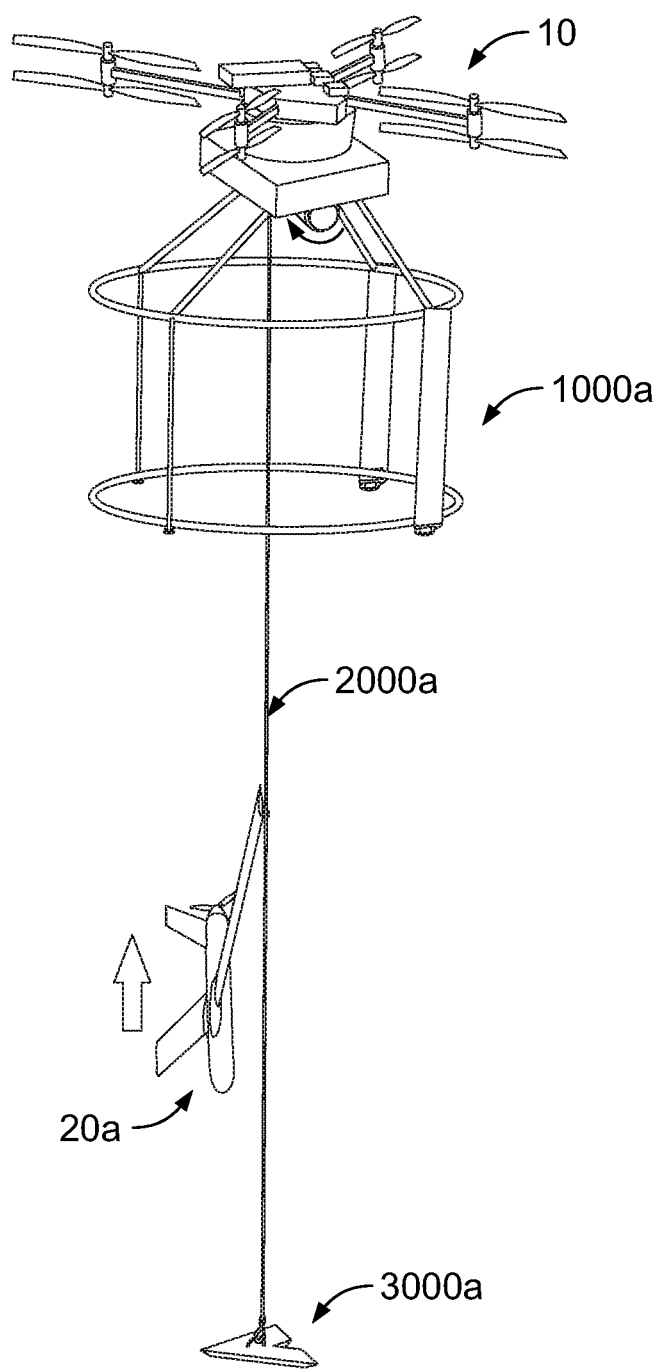
Figure 10E:
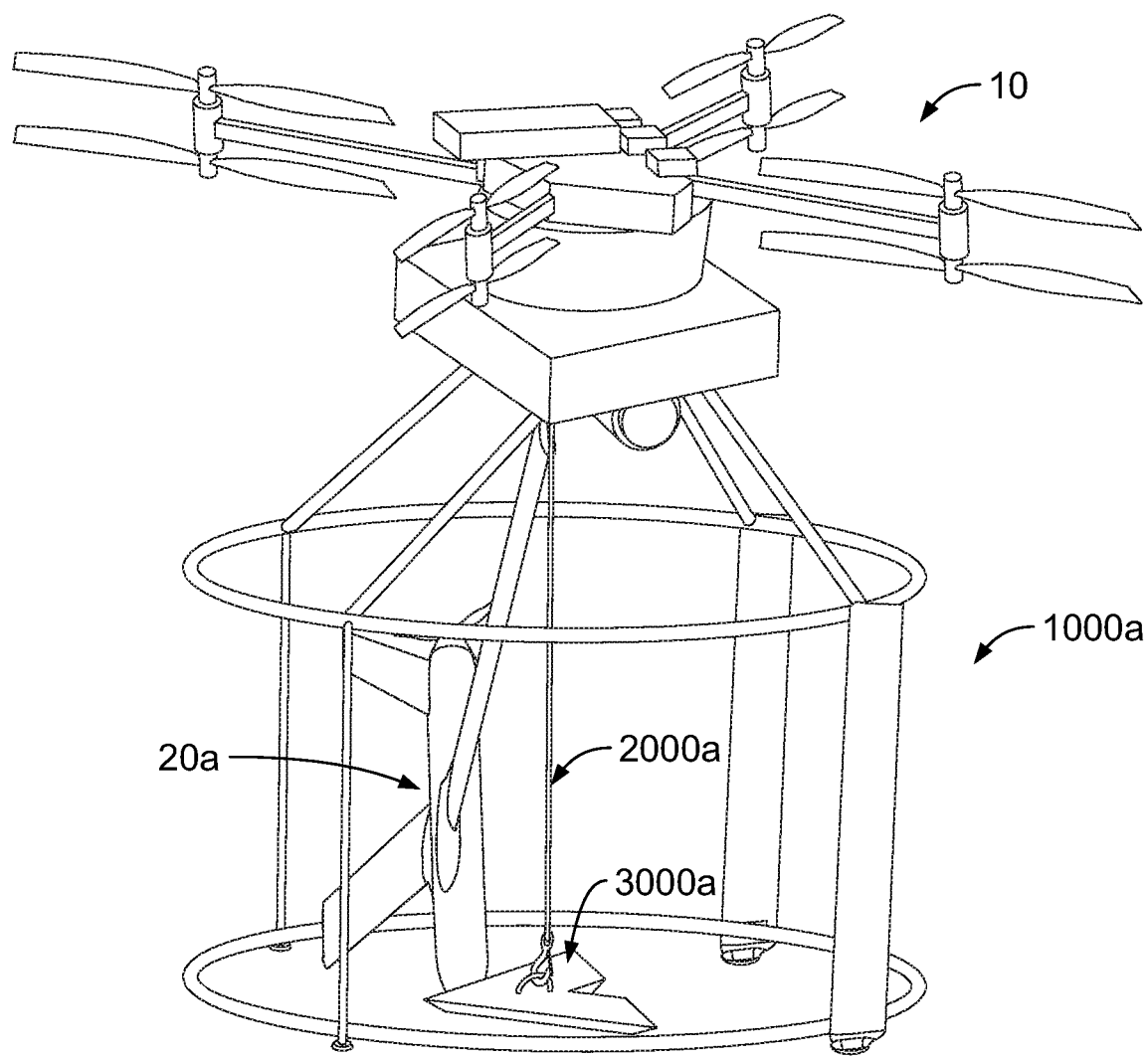

The multicopter 10 station-keeps in place until the fixed-wing aircraft 20a stops moving and hangs below the multicopter 10, as shown in FIG. 10C. At this point, operator remotely controls the motor of the winch to rotate the drum in the second direction to begin winding the flexible capture member 2000a back onto the drum. This draws the fixed-wing aircraft 20a toward the multicopter 10, as shown in FIG. 10D. The operator remotely controls the motor of the winch to stop rotating the drum once the fixed-wing aircraft is positioned within fixed-wing aircraft receiving volume that the retrieval assembly 1000a defines (or until the fixed-wing aircraft 20a reaches the drum). At this point, the front and rear landing gear and the upper and lower stabilizers surround and extend below the fixed-wing aircraft 20a. In some embodiments, the operator stops the motor of the winch at this point. In this embodiment, however, the operator remotely controls the motor of the winch to continue to rotate the drum in the second direction after the fixed-wing aircraft 20a reaches the winch to continue drawing the tensioning object toward the multicopter and into the fixed-wing aircraft receiving volume, as shown in FIG. 10E. In these embodiments, the winch pulls the flexible capture member through the capture device on the wing of the fixed-wing aircraft.

Figure 10F:
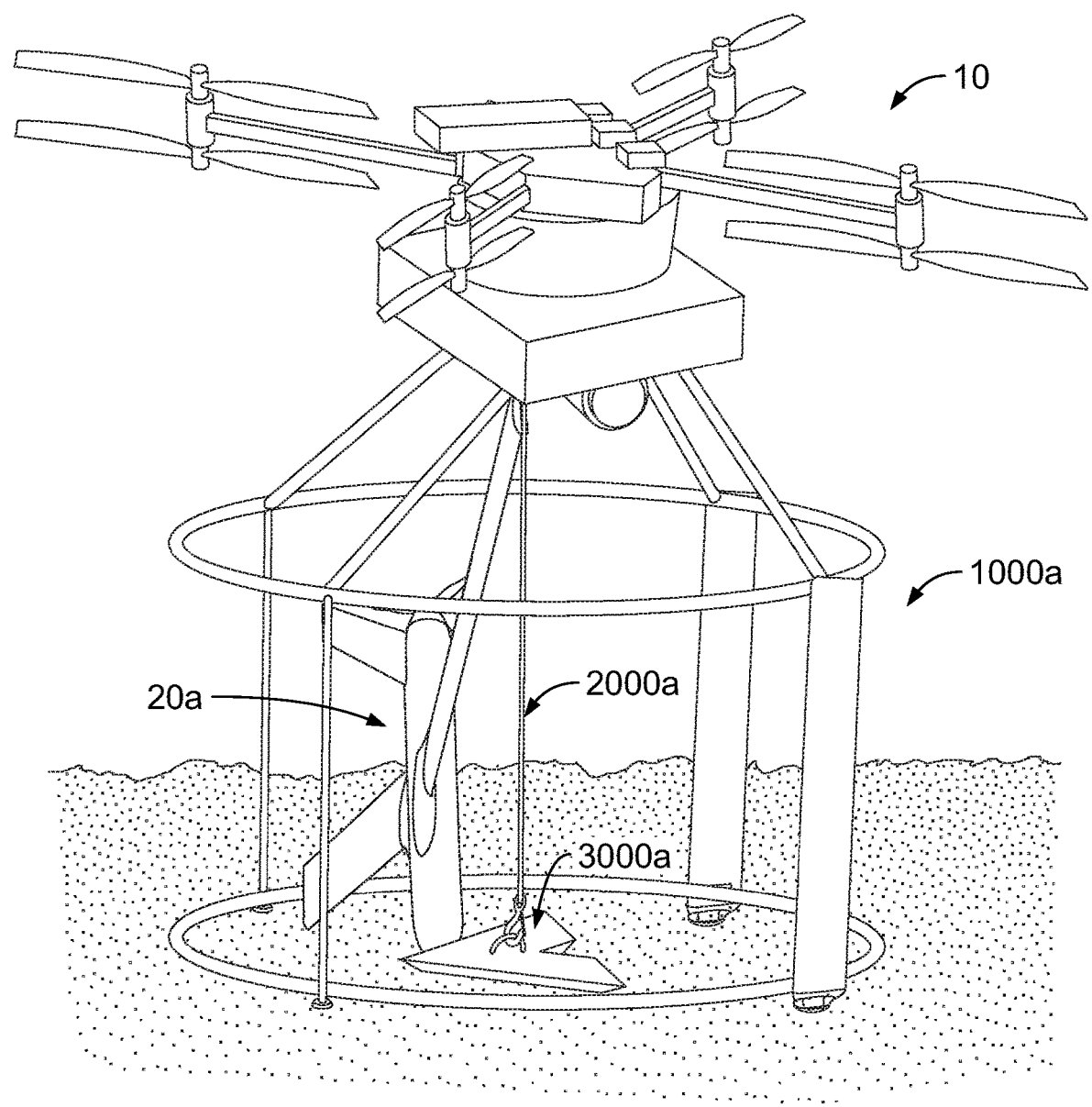

After capture, the operator remotely controls the multicopter 10 to land in a desired landing location. Since the internal height of the retrieval assembly is larger than the wingspan of the fixed-wing aircraft 20a, the fixed-wing aircraft 20a does not contact the ground during landing, as shown in FIG. 10F.

Figure 11:
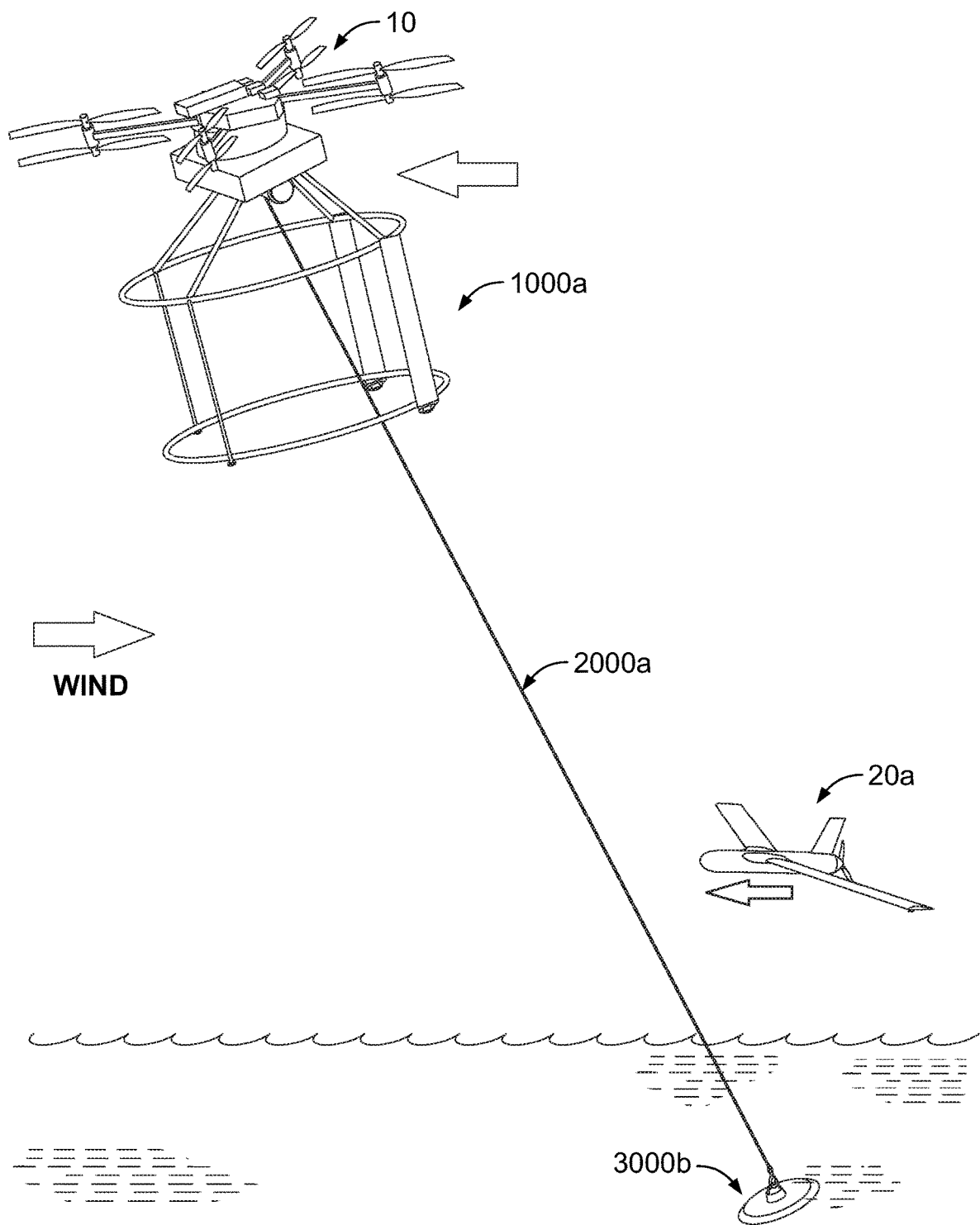
FIG. 11 is a diagrammatic view of a multicopter using the retrieval apparatus and the flexible capture member of FIGS. 9A and 9B and another embodiment of the tensioning object to retrieve a fixed-wing aircraft from wing-borne flight over a body of water.
Figure 12A:
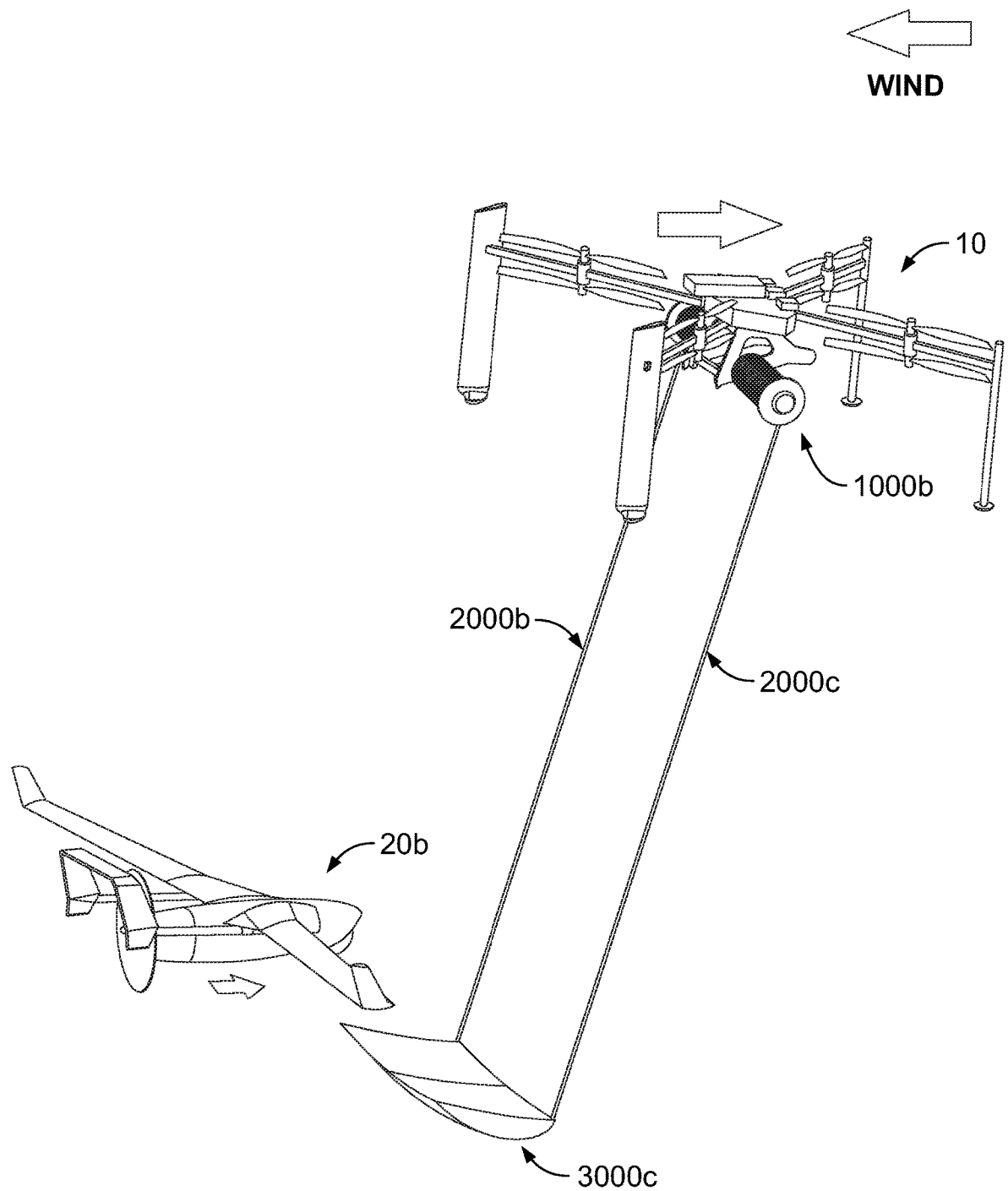
FIGS. 12A-12D are diagrammatic views of a multicopter using another embodiment of the retrieval apparatus, the flexible capture members, and the tensioning object of the present disclosure to retrieve a fixed-wing aircraft from wing-borne flight.
Figure 12B:
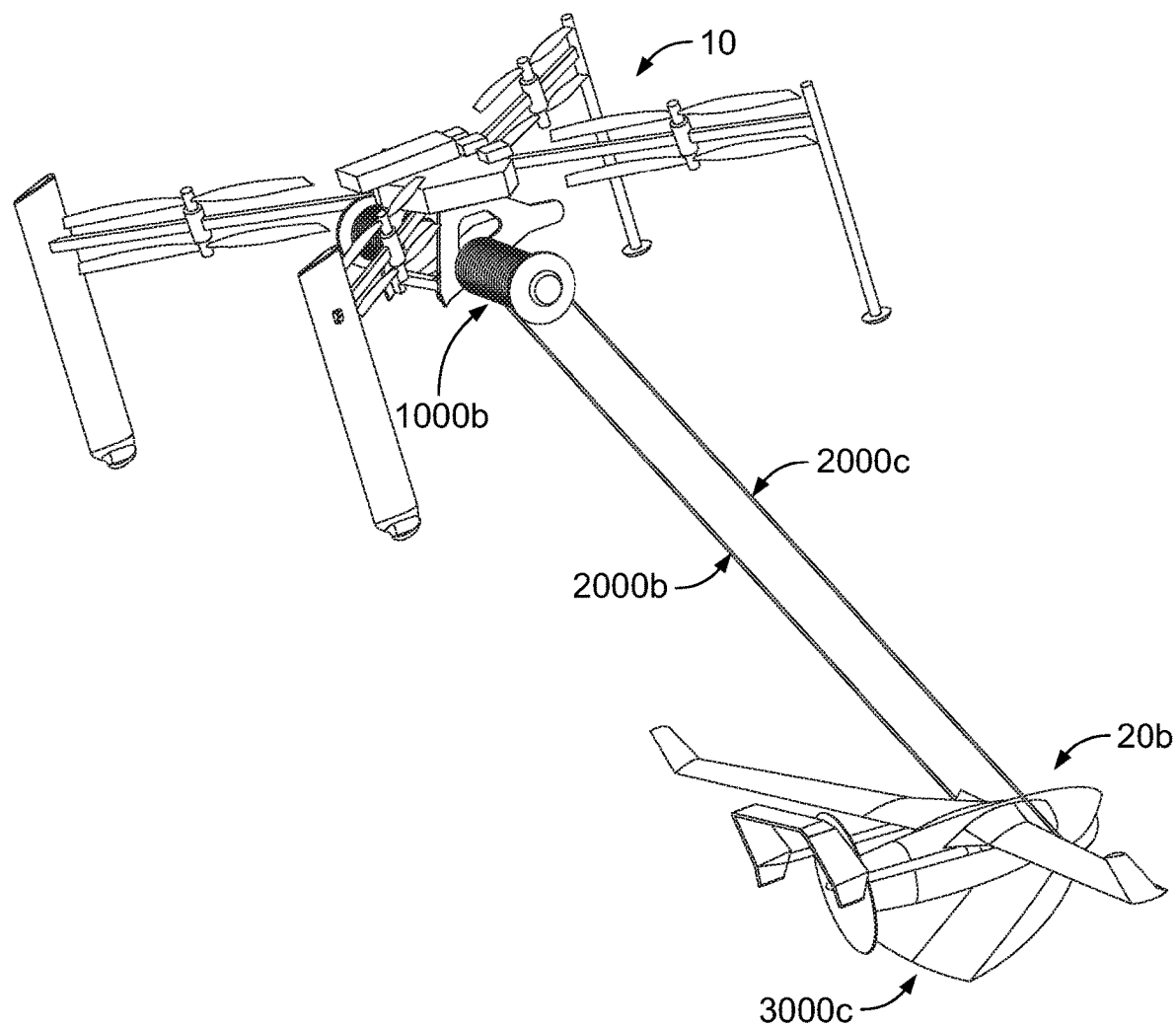
Figure 12C:
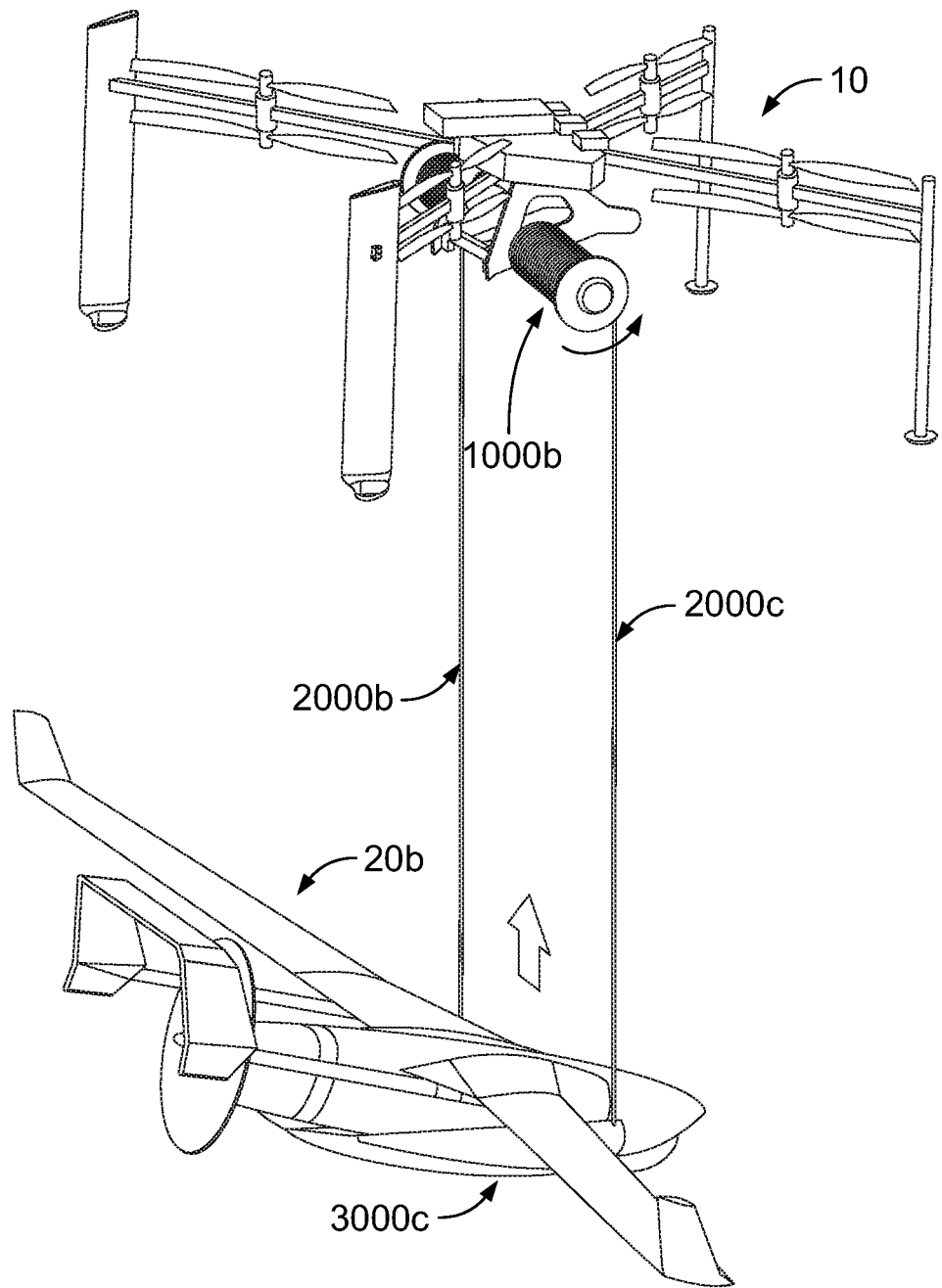
Figure 12D:
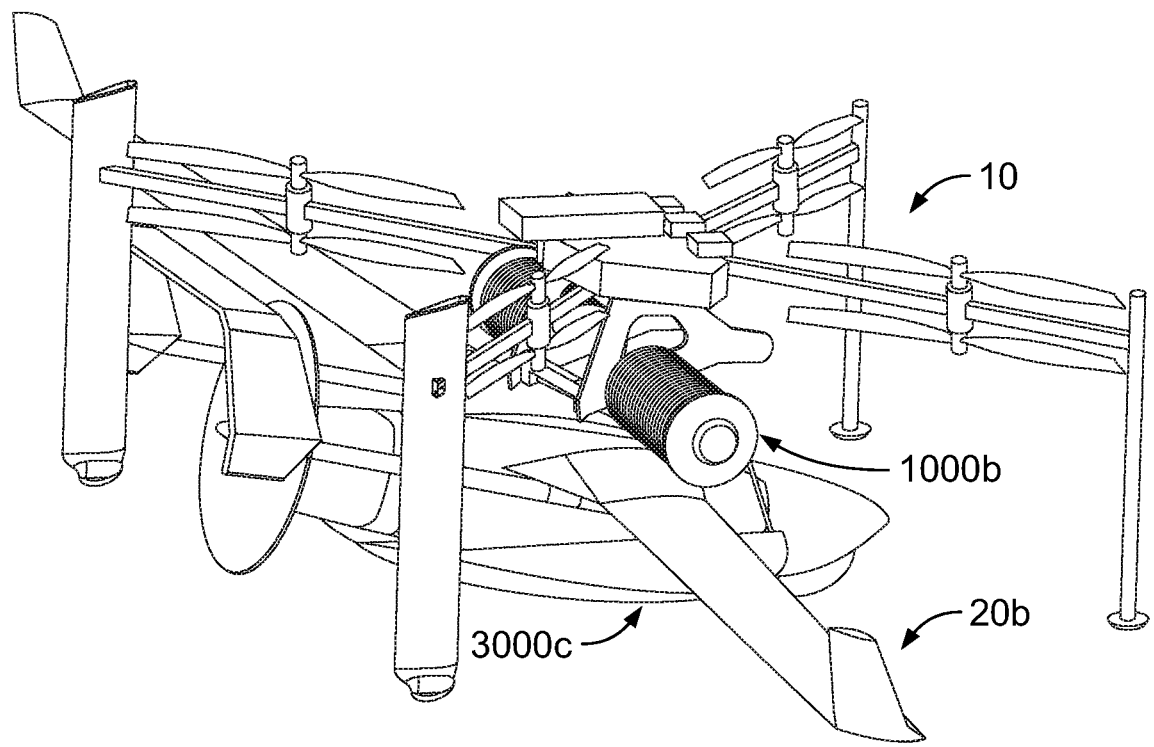

In other embodiments, the fixed-wing aircraft is retrieved while the multicopter is flying above a body of water. In these embodiments, as shown in FIG. 11, after the operator remotely controls the motor of the winch to rotate the drum in the first direction to pay out the first portion of the flexible capture member from the drum, the operator remotely controls the multicopter to fly such that a tensioning object 3000b is submerged in the body of water before the fixed-wing aircraft impacts and captures the part of the first portion of the flexible capture member. The hydrodynamic force imparted by the tensioning object 3000b ensures the flexible capture member is tensioned enough to prevent (or reduce the chances of) the flexible capture member from bouncing off of the wing of the fixed-wing aircraft and preventing retrieval. This hydrodynamic force includes a vector sum of lift and drag as the tensioning object is moved through the water. The quantity of energy dissipated into this damper is estimated as the tension force, multiplied by the stroke along the capture member axis. A well-tuned system may dissipate significant energy into this damper, to minimize the momentum exchange (and associated disturbance) into the multicopter.

The base may be attached to the multicopter in any other suitable manner, such as via fasteners, buckles, or lashing.

In certain embodiments, the landing gear is attachable to the landing gear extension modules of the multicopter. In these embodiments, to prepare the multicopter for retrieval, the operator replaces the multicopter's landing gear modules with the landing gear of the retrieval assembly.

FIGS. 12A-12D show one example method of retrieving a fixed-wing aircraft 20b from wing-borne flight using another embodiment of the retrieval assembly 1000b attached to a multicopter 10. The retrieval assembly 1000b includes a base 1100b attachable to the multicopter 10 and a winch 1200b attached to the base 1100b. One end of a first flexible capture member 2000b (such as a fibrous or wire rope) and one end of a second flexible capture member 2000c (such as a fibrous or wire rope) are attached to the drum of the winch 1200b, and the first and second flexible capture members 2000b and 2000c are wound around the drum.

The first and second flexible capture members 2000b and 2000c each terminate in a free end, and the free ends are attached to a tensioning object 3000c. The tensioning object 3000c includes a kite, though any suitable object may be employed.

In this example, as the fixed-wing aircraft 20b approaches the retrieval location, the operator remotely controls the multicopter 10 to climb to a pre-capture altitude. The operator also remotely controls the motor of the winch to rotate the drum in a first direction to wind a first portion of (such as a designated length of) the first flexible capture member 2000b and a first portion of the second flexible capture member 2000c off of the drum. Once the first portions of the first and second flexible capture members 2000b and 2000c are would off of the drum, the operator remotely controls the multicopter 10 to fly into the wind, as shown in FIG. 11A.

As shown in FIG. 11B, the fixed-wing aircraft 20b is flown toward the first and second flexible capture members 2000b and 2000c such that its nose enters the space between the first and second flexible capture members 2000b and 2000c and its wings contact the first and second flexible capture members 2000b and 2000c. As the fixed-wing aircraft 20b slows to match the speed of the multicopter 10, the fixed-wing aircraft 20b slides downward along the first and second flexible capture members 2000b and 2000c until it reaches the tensioning object 3000c.

The multicopter 10 station-keeps in place until the fixed-wing aircraft 20b stops moving and hangs below the multicopter 10, as shown in FIG. 11C. At this point, operator remotely controls the motor of the winch to rotate the drum in a second direction to begin winding the first and second flexible capture members 2000b and 2000c back onto the drum. This draws the fixed-wing aircraft 20b toward the multicopter 10. The operator remotely controls the motor of the winch to stop rotating the drum once the fixed-wing aircraft 20b reaches an aircraft-stabilizing component of the retrieval assembly 2000b or the multicopter 10 that contacts and retains the fixed-wing aircraft 20b in a generally level orientation.

After capture, the operator remotely controls the multicopter 10 to land in a desired landing location. Since the landing gear of the multicopter 10 extend below the fixed-wing aircraft 20b, neither the fixed-wing aircraft 20b nor the multicopter 10 contact the landing surface during landing.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A fixed-wing aircraft retrieval assembly comprising:
a base configured to be removably attached to a rotorcraft;
a drum attached to and rotatable relative to the base;
a motor operatively connected to the drum to rotate the drum; and
multiple landing gear attached to the base.

2. The fixed-wing aircraft retrieval assembly of claim 1, further comprising multiple arms, wherein each of the landing gear is attached to the base via a different one of the arms.

3. The fixed-wing aircraft retrieval assembly of claim 1, wherein each landing gear has a longitudinal axis, and the longitudinal axes of the landing gear are parallel to one another.

4. The fixed-wing aircraft retrieval assembly of claim 1, further comprising a rotorcraft attachment device attached to the base and configured to be removably attached to the rotorcraft.

5. The fixed-wing aircraft retrieval assembly of claim 4, wherein the rotorcraft attachment device comprises a hook.

6. The fixed-wing aircraft retrieval assembly of claim 1, wherein the landing gear comprise two front landing gear and two rear landing gear, and wherein the front and rear landing gear are shaped differently.

7. The fixed-wing aircraft retrieval assembly of claim 1, wherein the landing gear are circumferentially spaced apart.

8. A fixed-wing aircraft retrieval system comprising:
a retrieval assembly comprising:
a base configured to be removably attached to a rotorcraft;
a drum attached to and rotatable relative to the base;
a motor operatively connected to the drum to rotate the drum; and
multiple landing gear attached to the base;
a flexible capture member having one end attachable to the drum and an opposing free end; and
a tensioning object attachable to the free end of the flexible capture member.

9. The fixed-wing aircraft retrieval system of claim 8, wherein the flexible capture member comprises a rope.

10. The fixed-wing aircraft retrieval system of claim 8, wherein the tensioning object is aerodynamically shaped.

11. The fixed-wing aircraft retrieval system of claim 8, further comprising the rotorcraft.

12. The fixed-wing aircraft retrieval system of claim 8, further comprising a second flexible capture member having one end attachable to the drum and an opposing free end, wherein the tensioning object is also attachable to the free end of the second flexible capture member.

13. A method for retrieving a fixed-wing aircraft from wing-borne flight, the method comprising:
flying a rotorcraft to a retrieval location;
operating a motor drivingly engaged to a drum attached to the rotorcraft to rotate the drum to wind a first portion of a flexible capture member off of the drum; and
after a fixed-wing aircraft captures part of the first portion of the flexible capture member, operating the motor to rotate the drum to wind at least part of the first portion of the flexible capture member back onto the drum to draw the fixed-wing aircraft toward the rotorcraft.

14. The method of claim 13, wherein the motor and the drum are part of a retrieval assembly, the method further comprising attaching the retrieval assembly to the rotorcraft before flying the rotorcraft to the retrieval location.

15. The method of claim 13, further comprising operating the motor to stop rotating the drum responsive to part of the fixed-wing aircraft reaching the drum.

16. The method of claim 13, further comprising flying the rotorcraft so a tensioning object attached to a free end of the flexible capture member is airborne before the fixed-wing aircraft captures the part of the first portion of the flexible capture member.

17. The method of claim 13, further comprising flying the rotorcraft so a tensioning object attached to a free end of the flexible capture member is submerged in a body of water before the fixed-wing aircraft captures the part of the first portion of the flexible capture member.

18. A method for retrieving a fixed-wing aircraft from wing-borne flight, the method comprising:
flying a rotorcraft to a retrieval location;
operating a motor drivingly engaged to a drum attached to the rotorcraft to rotate the drum to wind a first portion of a first flexible capture member off of the drum and a first portion of a second flexible capture member off of the drum; and
after a first wing of a fixed-wing aircraft contacts the first flexible capture member, a second wing of the fixed-wing aircraft contacts the second flexible capture member, and the fixed-wing aircraft has slid down the first and second flexible capture members and contacted a tensioning object attached to the first and second flexible capture members, operating the motor to rotate the drum to wind at least part of the first portions of the first and second flexible capture members back onto the drum to draw the fixed-wing aircraft toward the rotorcraft.

19. The method of claim 18, wherein the motor and the drum are part of a retrieval assembly, the method further comprising attaching the retrieval assembly to the rotorcraft before flying the rotorcraft to the retrieval location.

20. The method of claim 18, further comprising operating the motor to stop rotating the drum responsive to part of the fixed-wing aircraft reaching the drum.

21. The method of claim 18, further comprising flying the rotorcraft so the tensioning object is airborne before the first and second wings of the fixed-wing aircraft contact the first portions of the first and second flexible capture members.

* * * * *